US008859714B1

(12) United States Patent
Marks et al.

(10) Patent No.: US 8,859,714 B1
(45) Date of Patent: Oct. 14, 2014

(54) POLYMERIC SEMICONDUCTORS AND RELATED DEVICES

(75) Inventors: Tobin J. Marks, Evanston, IL (US); Antonio Facchetti, Chicago, IL (US)

(73) Assignee: Northwestern University, Evanston, IL (US)

( * ) Notice: Subject to any disclaimer, the term of this patent is extended or adjusted under 35 U.S.C. 154(b) by 1082 days.

(21) Appl. No.: 12/827,146

(22) Filed: Jun. 30, 2010

Related U.S. Application Data

(60) Provisional application No. 61/222,257, filed on Jul. 1, 2009.

(51) Int. Cl.
*C08G 69/08* (2006.01)

(52) U.S. Cl.
USPC ............................................. 528/321

(58) Field of Classification Search
None
See application file for complete search history.

(56) References Cited

U.S. PATENT DOCUMENTS

| 7,605,394 | B2 | 10/2009 | Marks et al. | |
|---|---|---|---|---|
| 2011/0062426 | A1 | 3/2011 | Kirner et al. | 257/40 |
| 2011/0232764 | A1 | 9/2011 | Facchetti et al. | 136/263 |
| 2012/0097935 | A1 | 4/2012 | Kirner et al. | 257/40 |

FOREIGN PATENT DOCUMENTS

WO    WO 2009115413 A2 *  9/2009

OTHER PUBLICATIONS

Letizia et al., "n-Channel Polymers by Design: Optimizing the Interplay of Solubilizing Substituents, Crystal Packing, and Field-Effect Transistor Characteristics in Polymeric Bithiophene-Imide Semiconductors," *JACS*, 130(30): 9679-9694 (2008).
Wei, Y; Yang, Y; Yeh, J-M. Synthesis and Electronic Properties of Aldehyde End-Capped Thiophene Oligomers and Other α,ω-Substituted Sexithiophenes. Chem. Mater. 1996, vol. 8, No. 11, pp. 2659-2666.
Babel, A; Jenekhe, SA. High Electron Mobility in Ladder Polymer Field-Effect Transistors. J. Am. Chem. Soc., vol. 125, No. 45, 2003, pp. 13656-13657.
Letizia, JA; Facchetti A; Stern, CL; Ratner, MA; Marks, TJ. High Electron Mobility in Solution-Cast and Vapor-Deposited Phenacyl—Quarterthiophene-Based Field-Effect Transistors: Toward N-Type Polythiophenes. J. Am. Chem. Soc., vol. 127, No. 39, 2005, pp. 13476-13477.
Letizia, JA; Salata, MR; Tribout, CM; Facchetti, A; Ratner, MA; Marks, TJ. n-Channel Polymers by Design: Optimizing the Interplay of Solubilizing Substituents, Crystal Packing, and Field-Effect Transistor Characteristics in Polymeric Bithiophene-Imide Semiconductors. J. Am. Chem. Soc., vol. 130, No. 30, 2008, pp. 9679-9694.
Chen, Z; Zheng,Y; Yan, H; Facchetti, A. Naphthalenedicarboximide-vs Perylenedicarboximide-Based Copolymers. Synthesis and Semiconducting Properties in Bottom-Gate N-Channel Organic Transistors. J. Am. Chem. Soc., vol. 131, No. 1, 2009, pp. 8-9.
Chua, L-L; Zaumseil, J; Chang, J-F; OU, E C-W; HO, P K-H; Sirringhaus, H; Friend, RH. General observation of n-type field-effect behaviour in organic semiconductors. Nature, vol. 434, Mar. 10, 2005, pp. 194-199.
Yoon, M-H; Facchetti, A; Marks, TJ. σ-πmolecular dielectric multilayers for low-voltage organic thin-film transistors. PNAS, vol. 102, No. 13, Mar. 29, 2005, pp. 4678-4682.

* cited by examiner

*Primary Examiner* — Bijan Ahvazi
*Assistant Examiner* — Catherine S Branch
(74) *Attorney, Agent, or Firm* — Karen K. Chan

(57) ABSTRACT

Disclosed are new organic semiconductor materials prepared from polymers based on N-alkyl-2,2'-bithiophene-3,3'-dicarboximide (BTI) repeating units. Such polymers can exhibit desirable electronic properties and can possess processing advantages including solution-processability and/or good stability at ambient conditions.

21 Claims, 3 Drawing Sheets

POLYMERIC SEMICONDUCTORS AND RELATED DEVICES

This application claims priority from application Ser. No. 61/222,257 filed Jul. 1, 2009, the entirety of which is incorporated herein by reference.

This invention was made with government support under Grant No. DMR-0520513 awarded by the National Science Foundation (MRSEC) and Grant No. N00014-05-1-0766 awarded by the Office of Naval Research. The government has certain rights in the invention.

BACKGROUND

Interest in organic electronics is inspired by the promise of low-cost printed electronics and the significant scientific challenges that must be overcome for this goal to be realized. Potential applications enabled by the lower-cost processing methods and unique mechanical properties of organic electronics include lightweight flexible displays, RFID tags, and sensors. Many of these applications demand dielectrics, conductors, and semiconductors that are solution-processable under ambient conditions using conventional printing techniques. In addition to these processability requirements, important fundamental questions remain about long-range charge transport in organic solids, especially for polymeric semiconductors used in field-effect transistors (FETs).

Recent studies have demonstrated several robust, air-stable p-channel FETs using thiophene-based polymeric semiconductors. However, to the inventors' knowledge, only one family of n-type semiconducting polymers has been demonstrated with good transistor performance and good processing characteristics (vide infra). The scarcity of n-type polymeric semiconductors has limited developments in the field of organic electronics because both hole (p-type) and electron (n-type) materials and devices are required to achieve low-power consumption complementary organic circuitry (CMOS). In addition to such logic and switching applications, polymers exhibiting efficient electron transport and high electron affinities also should be useful as acceptor materials in organic photovoltaics and as electron transporting materials in polymer-based light-emitting diodes.

Limited progress has been made in developing polymer-based n-channel FETs. The first report of an n-channel FET-active polymer was benzimidazobenzophenanthroline (BBL), a ladder-type polymer processed from methane sulfonic acid. See Babel et al., *J. Am. Chem. Soc.*, 125: 13656-13657 (2003). In that report, an electron mobility ($\mu_e$) of 0.03 $cm^2V^{-1}s^{-1}$ and a current on-off ratio ($I_{on:off}$) of $10^5$ were achieved once residual acid was leached out (after annealing $\mu_e$=0.1 $cm^2V^{-1}s^{-1}$, $I_{on:off}$≈5). Recently, a perylene diimide-based copolymer FET using aluminum electrodes was reported to exhibit $\mu_e$=1.3×$10^{-2}$ $cm^2V^{-1}s^{-1}$ and $I_{on:off}$=$10^4$ under inert atmosphere. See Zhan et al., *J. Am. Chem. Soc.*, 129: 7246-7247 (2007). More recently, the inventors have demonstrated the superior performance in ambient of certain napthalene diimide-based copolymers $\mu_e$>0.1 $cm^2V^{-1}s^{-1}$ and $I_{on:off}$>$10^4$). See Chen et al., *J. Am. Chem. Soc.*, 131(1): 8-9 (2009). Other researchers achieved n-channel FET performance using poly(3-hexylthiophene) (P3HT) having a mobility of 6×$10^{-4}$ $cm^2V^{-1}s^{-1}$ by employing hydrophobic dielectric coatings (to minimize charge carrier trapping at the dielectric surface) and alkali metal electrodes to reduce contact resistance. However, these FETs were fabricated and characterized under inert atmosphere. See Chua et al., *Nature*, 434: 194-199 (2005). In addition, polymer-oligomer blends have been explored with reported performance as high as $\mu_e$=0.01 $cm^2V^{-1}s^{-1}$ and $I_{on:off}$>$10^4$. See Letizia et al., *J. Am. Chem. Soc.*, 127: 13476-13477 (2005). These reports and others have advanced the limits of n-channel polymer performance via the synthesis of novel materials and/or implementation of unconventional and inert atmosphere device fabrication techniques.

It is believed that high-performance polymeric semiconductors need to maintain a delicate balance between solubility and close, efficient π-π stacking for efficient charge transport. While several p-channel polymers for OFETs meet these requirements, achieving such performance in electron transporting polymers has proven to be significantly more challenging. Previous efforts to enable n-channel polymer charge transport using environmentally-sensitive materials and contacts or hazardous acidic solvents are not compatible with the low-cost, ambient-condition solution processing requirements essential for the realization of practical organic electronics. These studies have highlighted the need for materials that can have appreciable electron mobilities, that can be soluble in conventional organic solvents, can exhibit appropriate solution rheology for printing and spin-casting, and can have a sufficiently high electron affinity to avoid electron trapping by ambient species and surface states ($O_2$, $H_2O$, —OH).

The realization of n-channel polymers having the aforementioned characteristics remains a significant challenge for organic electronics, because aromatic systems with appropriate electron affinity and crystallinity are typically poorly soluble, lack open positions for further substitution, and are not readily polymerizable.

SUMMARY

In light of the foregoing, the present teachings provide a new class of polymeric semiconductors that can address various deficiencies and shortcomings of the prior art, including those outlined above. More specifically, the present teachings relate to semiconducting polymers (including homopolymers and copolymers) having identical or different repeating units of the formula:

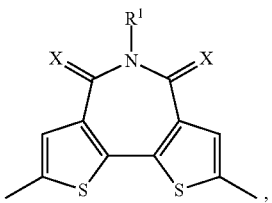

where $R^1$ and X are as defined herein, and semiconductor materials prepared from these polymers. Also provided are associated devices and related methods for the preparation and use of these polymers. The present polymers can exhibit properties such as excellent charge transport characteristics in ambient conditions, chemical stability, low-temperature processability, large solubility in common solvents, and processing versatility. As a result, field effect devices such as thin film transistors that incorporate one or more of the present polymers as the semiconductor layer can exhibit high performance in ambient conditions, for example, demonstrating one or more of large electron mobilities, low threshold voltages, and high current on-off ratios. Similarly, other organic semiconductor-based devices such as OPVs, OLETs, and OLEDs can be fabricated efficiently using the polymeric materials described herein.

The present teachings also provide methods of preparing such polymers and semiconductor materials, as well as various compositions, composites, and devices that incorporate the polymers and semiconductor materials disclosed herein.

The foregoing as well as other features and advantages of the present teachings will be more fully understood from the following figures, description, examples, and claims.

BRIEF DESCRIPTION OF DRAWINGS

It should be understood that the drawings described below are for illustration purpose only. The drawings are not necessarily to scale, with emphasis generally being placed upon illustrating the principles of the present teachings. The drawings are not intended to limit the scope of the present teachings in any way.

DETAILED DESCRIPTION

Figure 1:
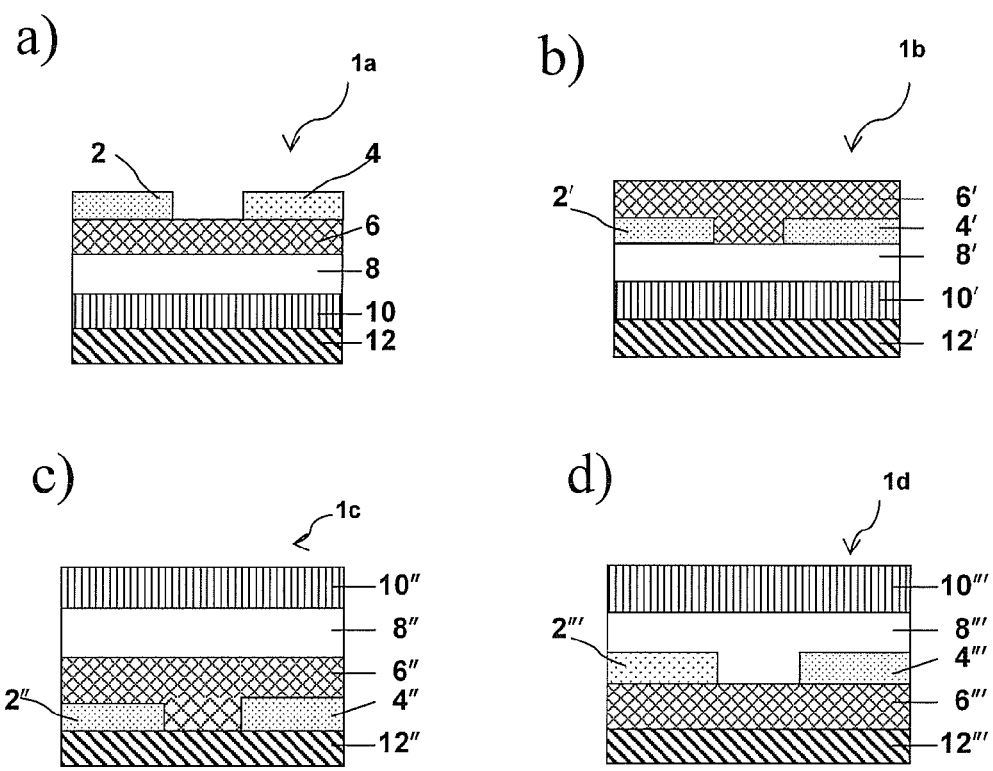
FIGS. 1a-d illustrate four different configurations of thin film transistors: bottom-gate top contact (FIG. 1a), bottom-gate bottom-contact (FIG. 1b), top-gate bottom-contact (FIG. 1c), and top-gate top-contact (FIG. 1d); each of which can be used to incorporate compounds of the present teachings.

The present teachings provide organic semiconductor materials prepared from polymeric compounds based upon N-alkyl-2,2'-bithiophene-3,3'-dicarboximide (BTI) repeating units (or chalcogen analogs thereof, e.g., the two oxygen atoms of the dicarboximide can be replaced by two sulfur atoms or two selenium atoms), and associated compositions, composites, and/or devices. The present polymeric compounds can exhibit semiconductor behavior such as high carrier mobility and/or good current modulation characteristics in a field-effect device, light absorption/charge separation in a photovoltaic device, and/or charge transport/recombination/light emission in a light-emitting device. In addition, the present compounds can possess certain processing advantages such as solution-processability and/or good stability (for example, air stability) in ambient conditions. The compounds of the present teachings can be used to prepare either p-type or n-type semiconductor materials, which in turn can be used to fabricate various organic electronic articles, structures and devices, including field-effect transistors, unipolar circuitries, complementary circuitries, photovoltaic devices, and light emitting devices.

Throughout the application, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions may be conducted simultaneously.

As used herein, a "polymeric compound" (or "polymer") refers to a molecule including a plurality of one or more repeating units connected by covalent chemical bonds. A polymeric compound can be represented by the general formula:

wherein M is the repeating unit or monomer, and n represents the degree of polymerization. The degree of polymerization can range from 2 to greater than about 10,000. In cases where the polymeric compound has a degree of polymerization ranging from 2 to 9, the polymeric compound can be alternatively referred as an "oligomeric compound" or an "oligomer." In most embodiments, a polymeric compound typically has a degree of polymerization of at least 4, such as from 4 to about 10,000, 5 to about 10,000, 10 to about 10,000, and so on. A polymeric compound can have only one type of repeating unit as well as two or more types of different repeating units. When a polymeric compound has only one type of repeating unit, it can be referred to as a homopolymer. When a polymeric compound has two or more types of different repeating units, the term "copolymer" or "copolymeric compound" can be used instead. The polymeric compound can be linear or branched. Branched polymers can include dendritic polymers, such as dendronized polymers, hyperbranched polymers, brush polymers (also called bottle-brushes), and the like. Unless specified otherwise, the assembly of the repeating units in the copolymer can be head-to-tail, head-to-head, or tail-to-tail. In addition, unless specified otherwise, the copolymer can be a random copolymer, an alternating copolymer, or a block copolymer. For example, the general formula:

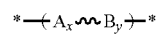

can be used to represent a copolymer of A and B having x mole fraction of A and y mole fraction of B in the copolymer, where the manner in which co-monomers A and B is repeated can be alternating, random, or in blocks.

As used herein, a "cyclic moiety" can include one or more (e.g., 1-6) carbocyclic or heterocyclic rings. The cyclic moiety can be a cycloalkyl group, a heterocycloalkyl group, an aryl group, or a heteroaryl group (i.e., can include only saturated bonds, or can include one or more unsaturated bonds regardless of aromaticity), each including, for example, 3-24 ring atoms and can be optionally substituted as described herein. In embodiments where the cyclic moiety is a "monocyclic moiety," the "monocyclic moiety" can include a 3-14 membered aromatic or non-aromatic, carbocyclic or heterocyclic ring. A monocyclic moiety can include, for example, a phenyl group or a 5- or 6-membered heteroaryl group, each of which can be optionally substituted as described herein. In embodiments where the cyclic moiety is a "polycyclic moiety," the "polycyclic moiety" can include two or more rings fused to each other (i.e., sharing a common bond) and/or connected to each other via a spiro atom, or one or more bridged atoms. A polycyclic moiety can include an 8-24 membered aromatic or non-aromatic, carbocyclic or heterocyclic ring, such as a $C_{8-24}$ aryl group or an 8-24 membered heteroaryl group, each of which can be optionally substituted as described herein.

As used herein, "halo" or "halogen" refers to fluoro, chloro, bromo, and iodo.

As used herein, "oxo" refers to a double-bonded oxygen (i.e., =O).

As used herein, "alkyl" refers to a straight-chain or branched saturated hydrocarbon group. Examples of alkyl groups include methyl (Me), ethyl (Et), propyl (e.g., n-propyl and iso-propyl), butyl (e.g., n-butyl, iso-butyl, sec-butyl, tert-butyl), pentyl groups (e.g., n-pentyl, iso-pentyl, neopentyl), hexyl groups, and the like. In various embodiments, an alkyl group can have 1 to 40 carbon atoms (i.e., $C_{1-40}$ alkyl group), for example, 1-20 carbon atoms (i.e., $C_{1-20}$ alkyl group). In some embodiments, an alkyl group can have 1 to 6 carbon atoms, and can be referred to as a "lower alkyl group." Examples of lower alkyl groups include methyl, ethyl, propyl (e.g., n-propyl and iso-propyl), and butyl groups (e.g., n-butyl, iso-butyl, sec-butyl, tert-butyl). In some embodiments, alkyl groups can be substituted as described herein. An alkyl group is generally not substituted with another alkyl group, an alkenyl group, or an alkynyl group.

As used herein, "haloalkyl" refers to an alkyl group having one or more halogen substituents. At various embodiments, a haloalkyl group can have 1 to 40 carbon atoms (i.e., $C_{1-40}$ haloalkyl group), for example, 1 to 20 carbon atoms (i.e., $C_{1-20}$ haloalkyl group). Examples of haloalkyl groups include $CF_3$, $C_2F_5$, $CHF_2$, $CH_2F$, $CCl_3$, $CHCl_2$, $CH_2Cl$, $C_2Cl_5$, and the like. Perhaloalkyl groups, i.e., alkyl groups where all of the hydrogen atoms are replaced with halogen atoms (e.g., $CF_3$ and $C_2F_5$), are included within the definition of "haloalkyl." For example, a $C_{1-40}$ haloalkyl group can have the formula $—C_zH_{2z+1-t}X^0_t$, where $X^0$, at each occurrence, is F, Cl, Br or I, z is an integer in the range of 1 to 40, and t is an integer in the range of 1 to 81, provided that t is less than or equal to 2z+1. Haloalkyl groups that are not perhaloalkyl groups can be substituted as described herein.

As used herein, "alkoxy" refers to —O-alkyl group. Examples of alkoxy groups include, but are not limited to, methoxy, ethoxy, propoxy (e.g., n-propoxy and isopropoxy), t-butoxy, pentoxyl, hexoxyl groups, and the like. The alkyl group in the —O-alkyl group can be substituted as described herein.

As used herein, "alkylthio" refers to an —S-alkyl group (which, in some cases, can be expressed as —S(O)$_w$-alkyl, wherein w is 0). Examples of alkylthio groups include, but are not limited to, methylthio, ethylthio, propylthio (e.g., n-propylthio and isopropylthio), t-butylthio, pentylthio, hexylthio groups, and the like. The alkyl group in the —S-alkyl group can be substituted as described herein.

As used herein, "arylalkyl" refers to an -alkyl-aryl group, where the arylalkyl group is covalently linked to the defined chemical structure via the alkyl group. An arylalkyl group is within the definition of a —Y—$C_{6-14}$ aryl group, where Y is as defined herein. An example of an arylalkyl group is a benzyl group (—$CH_2$—$C_6H_5$). An arylalkyl group can be optionally substituted, i.e., the aryl group and/or the alkyl group, can be substituted as disclosed herein.

As used herein, "alkenyl" refers to a straight-chain or branched alkyl group having one or more carbon-carbon double bonds. Examples of alkenyl groups include ethenyl, propenyl, butenyl, pentenyl, hexenyl, butadienyl, pentadienyl, hexadienyl groups, and the like. The one or more carbon-carbon double bonds can be internal (such as in 2-butene) or terminal (such as in 1-butene). In various embodiments, an alkenyl group can have 2 to 40 carbon atoms (i.e., $C_{2-40}$ alkenyl group), for example, 2 to 20 carbon atoms (i.e., $C_{2-20}$ alkenyl group). In some embodiments, alkenyl groups can be substituted as described herein. An alkenyl group is generally not substituted with another alkenyl group, an alkyl group, or an alkynyl group.

As used herein, "alkynyl" refers to a straight-chain or branched alkyl group having one or more triple carbon-carbon bonds. Examples of alkynyl groups include ethynyl, propynyl, butynyl, pentynyl, hexynyl, and the like. The one or more triple carbon-carbon bonds can be internal (such as in 2-butyne) or terminal (such as in 1-butyne). In various embodiments, an alkynyl group can have 2 to 40 carbon atoms (i.e., $C_{2-40}$ alkynyl group), for example, 2 to 20 carbon atoms (i.e., $C_{2-20}$ alkynyl group). In some embodiments, alkynyl groups can be substituted as described herein. An alkynyl group is generally not substituted with another alkynyl group, an alkyl group, or an alkenyl group.

As used herein, "cycloalkyl" refers to a non-aromatic carbocyclic group including cyclized alkyl, alkenyl, and alkynyl groups. In various embodiments, a cycloalkyl group can have 3 to 24 carbon atoms, for example, 3 to 20 carbon atoms (e.g., $C_{3-14}$ cycloalkyl group). A cycloalkyl group can be monocyclic (e.g., cyclohexyl) or polycyclic (e.g., containing fused, bridged, and/or spiro ring systems), where the carbon atoms are located inside or outside of the ring system. Any suitable ring position of the cycloalkyl group can be covalently linked to the defined chemical structure. Examples of cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcaryl, adamantyl, and spiro[4.5]decanyl groups, as well as their homologs, isomers, and the like. In some embodiments, cycloalkyl groups can be substituted as described herein.

As used herein, "heteroatom" refers to an atom of any element other than carbon or hydrogen and includes, for example, nitrogen, oxygen, silicon, sulfur, phosphorus, and selenium.

As used herein, "cycloheteroalkyl" refers to a non-aromatic cycloalkyl group that contains at least one ring heteroatom selected from O, S, Se, N, P, and Si (e.g., O, S, and N), and optionally contains one or more double or triple bonds. A cycloheteroalkyl group can have 3 to 24 ring atoms, for example, 3 to 20 ring atoms (e.g., 3-14 membered cycloheteroalkyl group). One or more N, P, S, or Se atoms (e.g., N or S) in a cycloheteroalkyl ring may be oxidized (e.g., morpholine N-oxide, thiomorpholine S-oxide, thiomorpholine S,S-dioxide). In some embodiments, nitrogen or phosphorus atoms of cycloheteroalkyl groups can bear a substituent, for example, a hydrogen atom, an alkyl group, or other substituents as described herein. Cycloheteroalkyl groups can also contain one or more oxo groups, such as oxopiperidyl, oxooxazolidyl, dioxo-(1H,3H)-pyrimidyl, oxo-2(1H)-pyridyl, and the like. Examples of cycloheteroalkyl groups include, among others, morpholinyl, thiomorpholinyl, pyranyl, imidazolidinyl, imidazolinyl, oxazolidinyl, pyrazolidinyl, pyrazolinyl, pyrrolidinyl, pyrrolinyl, tetrahydrofuranyl, tetrahydrothiophenyl, piperidinyl, piperazinyl, and the like. In some embodiments, cycloheteroalkyl groups can be substituted as described herein.

As used herein, "aryl" refers to an aromatic monocyclic hydrocarbon ring system or a polycyclic ring system in which two or more aromatic hydrocarbon rings are fused (i.e., having a bond in common with) together or at least one aromatic monocyclic hydrocarbon ring is fused to one or more cycloalkyl and/or cycloheteroalkyl rings. An aryl group can have 6 to 24 carbon atoms in its ring system (e.g., $C_{6-20}$ aryl group), which can include multiple fused rings. In some embodiments, a polycyclic aryl group can have 8 to 24 carbon atoms. Any suitable ring position of the aryl group can be covalently linked to the defined chemical structure. Examples of aryl groups having only aromatic carbocyclic ring(s) include phenyl, 1-naphthyl (bicyclic), 2-naphthyl (bicyclic), anthracenyl (tricyclic), phenanthrenyl (tricyclic), pentacenyl (pentacyclic), and like groups. Examples of polycyclic ring systems in which at least one aromatic carbocyclic ring is fused to one or more cycloalkyl and/or cycloheteroalkyl rings include, among others, benzo derivatives of cyclopentane (i.e., an indanyl group, which is a 5,6-bicyclic cycloalkyl/ aromatic ring system), cyclohexane (i.e., a tetrahydronaphthyl group, which is a 6,6-bicyclic cycloalkyl/aromatic ring system), imidazoline (i.e., a benzimidazolinyl group, which is a 5,6-bicyclic cycloheteroalkyl/aromatic ring system), and pyran (i.e., a chromenyl group, which is a 6,6-bicyclic cycloheteroalkyl/aromatic ring system). Other examples of aryl groups include benzodioxanyl, benzodioxolyl, chromanyl, indolinyl groups, and the like. In some embodiments, aryl groups can be substituted as described herein. In some embodiments, an aryl group can have one or more halogen substituents, and can be referred to as a "haloaryl" group. Perhaloaryl groups, i.e., aryl groups where all of the hydrogen atoms are replaced with halogen atoms (e.g., —$C_6F_5$), are included within the definition of "haloaryl." In certain embodiments, an aryl group is substituted with another aryl group and can be referred to as a biaryl group. Each of the aryl groups in the biaryl group can be substituted as disclosed herein.

As used herein, "heteroaryl" refers to an aromatic monocyclic ring system containing at least one ring heteroatom selected from oxygen (O), nitrogen (N), sulfur (S), silicon (Si), and selenium (Se) or a polycyclic ring system where at least one of the rings present in the ring system is aromatic and contains at least one ring heteroatom. Polycyclic heteroaryl groups include those having two or more heteroaryl rings fused together, as well as those having at least one monocyclic heteroaryl ring fused to one or more aromatic carbocyclic rings, non-aromatic carbocyclic rings, and/or non-aromatic cycloheteroalkyl rings. A heteroaryl group, as a whole, can have, for example, 5 to 24 ring atoms and contain 1-5 ring heteroatoms (i.e., 5-20 membered heteroaryl group). The heteroaryl group can be attached to the defined chemical structure at any heteroatom or carbon atom that results in a stable structure. Generally, heteroaryl rings do not contain O—O, S—S, or S—O bonds. However, one or more N or S atoms in a heteroaryl group can be oxidized (e.g., pyridine N-oxide, thiophene S-oxide, thiophene S,S-dioxide).

Examples of heteroaryl groups include, for example, the 5- or 6-membered monocyclic and 5-6 bicyclic ring systems shown below:

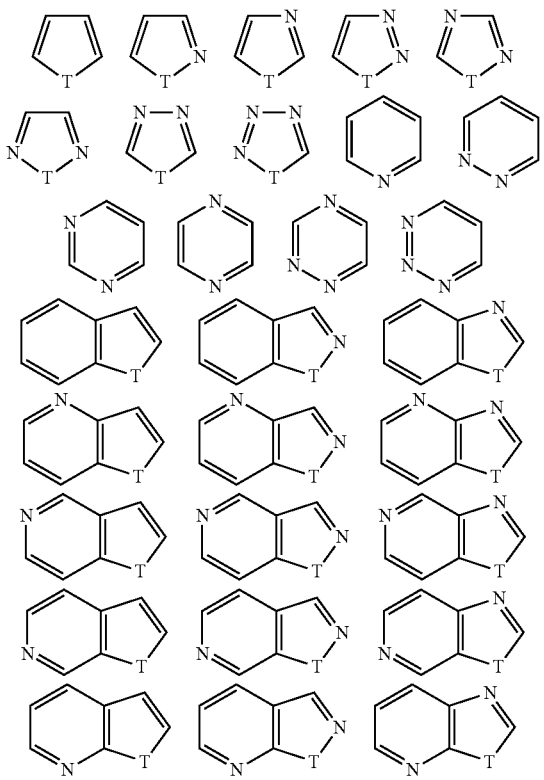

where T is O, S, NH, N-alkyl, N-aryl, N-(arylalkyl) (e.g., N-benzyl), $SiH_2$, SiH(alkyl), $Si(alkyl)_2$, SiH(arylalkyl), $Si(arylalkyl)_2$, or Si(alkyl)(arylalkyl). Examples of such heteroaryl rings include pyrrolyl, furyl, thienyl, pyridyl, pyrimidyl, pyridazinyl, pyrazinyl, triazolyl, tetrazolyl, pyrazolyl, imidazolyl, isothiazolyl, thiazolyl, thiadiazolyl, isoxazolyl, oxazolyl, oxadiazolyl, indolyl, isoindolyl, benzofuryl, benzothienyl, quinolyl, 2-methylquinolyl, isoquinolyl, quinoxalyl, quinazolyl, benzotriazolyl, benzimidazolyl, benzothiazolyl, benzisothiazolyl, benzisoxazolyl, benzoxadiazolyl, benzoxazolyl, cinnolinyl, 1H-indazolyl, 2H-indazolyl, indolizinyl, isobenzofuyl, naphthyridinyl, phthalazinyl, pteridinyl, purinyl, oxazolopyridinyl, thiazolopyridinyl, imidazopyridinyl, furopyridinyl, thienopyridinyl, pyridopyrimidinyl, pyridopyrazinyl, pyridopyridazinyl, thienothiazolyl, thienoxazolyl, thienoimidazolyl groups, and the like. Further examples of heteroaryl groups include 4,5,6,7-tetrahydroindolyl, tetrahydroquinolinyl, benzothienopyridinyl, benzofuropyridinyl groups, and the like. In some embodiments, heteroaryl groups can be substituted as described herein.

Polymers of the present teachings can include a "divalent group" defined herein as a linking group capable of forming a covalent bond with two other moieties. For example, polymers of the present teachings can include a divalent $C_{1-40}$ alkyl group (e.g., a methylene group), a divalent $C_{2-40}$ alkenyl group (e.g., a vinylyl group), a divalent $C_{2-40}$ alkynyl group (e.g., an ethynylyl group). a divalent $C_{6-14}$ aryl group (e.g., a phenylyl group); a divalent 3-14 membered cycloheteroalkyl group (e.g., a pyrrolidylyl), and/or a divalent 5-14 membered heteroaryl group (e.g., a thienylyl group). Generally, a chemical group (e.g., —Ar—) is understood to be divalent by the inclusion of the two bonds before and after the group.

The electron-donating or electron-withdrawing properties of several hundred of the most common substituents, reflecting all common classes of substituents have been determined, quantified, and published. The most common quantification of electron-donating and electron-withdrawing properties is in terms of Hammett σ values. Hydrogen has a Hammett σ value of zero, while other substituents have Hammett σ values that increase positively or negatively in direct relation to their electron-withdrawing or electron-donating characteristics. Substituents with negative Hammett σ values are considered electron-donating, while those with positive Hammett σ values are considered electron-withdrawing. See Lange's Handbook of Chemistry, 12th ed., McGraw Hill, 1979, Table 3-12, pp. 3-134 to 3-138, which lists Hammett σ values for a large number of commonly encountered substituents and is incorporated by reference herein.

It should be understood that the term "electron-accepting group" can be used synonymously herein with "electron acceptor" and "electron-withdrawing group". In particular, an "electron-withdrawing group" ("EWG") or an "electron-accepting group" or an "electron-acceptor" refers to a functional group that draws electrons to itself more than a hydrogen atom would if it occupied the same position in a molecule. Examples of electron-withdrawing groups include, but are not limited to, halogen or halo (e.g., F, Cl, Br, I), —NO$_2$, —CN, —NC, —S(R$^0$)$_2^+$, —N(R$^0$)$_3^+$, —SO$_3$H, —SO$_2$R$^0$, —SO$_3$R$^0$, —SO$_2$NHR$^0$, —SO$_2$N(R$^0$)$_2$, —COOH, —COR$^0$, —COOR$^0$, —CONHR$^0$, —CON(R$^0$)$_2$, $C_{1-40}$ haloalkyl groups, $C_{6-14}$ aryl groups, and 5-14 membered electron-poor heteroaryl groups; where R$^0$ is a $C_{1-40}$ alkyl group, a $C_{2-40}$ alkenyl group, a $C_{2-40}$ alkynyl group, a $C_{1-40}$ haloalkyl group, a $C_{1-40}$ alkoxy group, a $C_{6-14}$ aryl group, a $C_{3-14}$ cycloalkyl group, a 3-14 membered cycloheteroalkyl group, and a 5-14 membered heteroaryl group, each of which can be optionally substituted as described herein.

It should be understood that the term "electron-donating group" can be used synonymously herein with "electron donor". In particular, an "electron-donating group" or an "electron-donor" refers to a functional group that donates electrons to a neighboring atom more than a hydrogen atom would if it occupied the same position in a molecule. Examples of electron-donating groups include —OH, —OR$^0$, —NH$_2$, —NHR$^0$, —N(R$^0$)$_2$, 5-14 membered electron-rich heteroaryl groups, $C_{1-40}$ alkyl groups, $C_{2-40}$ alkenyl groups, $C_{2-40}$ alkynyl groups, $C_{1-40}$ alkoxy groups, where R$^0$ is a $C_{1-40}$ alkyl group, a $C_{2-40}$ alkenyl group, a $C_{2-40}$ alkynyl group, a $C_{6-14}$ aryl group, or a $C_{3-14}$ cycloalkyl group.

Various unsubstituted heteroaryl groups can be described as electron-rich (or π-excessive) or electron-poor (or π-deficient). Such classification is based on the average electron density on each ring atom as compared to that of a carbon atom in benzene. Examples of electron-rich systems include 5-membered heteroaryl groups having one heteroatom such as furan, pyrrole, and thiophene; and their benzofused counterparts such as benzofuran, benzopyrrole, and benzothiophene. Examples of electron-poor systems include 6-membered heteroaryl groups having one or more heteroatoms such as pyridine, pyrazine, pyridazine, and pyrimidine; as well as their benzofused counterparts such as quinoline, isoquinoline, quinoxaline, cinnoline, phthalazine, naphthyridine, quinazoline, phenanthridine, acridine, and purine. Mixed heteroaromatic rings can belong to either class depending on the type, number, and position of the one or more heteroatom(s) in the ring. See Katritzky, A. R and Lagowski, J. M., *Heterocyclic Chemistry* (John Wiley & Sons, New York, 1960).

At various places in the present specification, substituents are disclosed in groups or in ranges. It is specifically intended that the description include each and every individual subcombination of the members of such groups and ranges. For example, the term "$C_{1-6}$ alkyl" is specifically intended to individually disclose $C_1$, $C_2$, $C_3$, $C_4$, $C_5$, $C_6$, $C_{1}$-$C_6$, $C_{1}$-$C_5$, $C_{1}$-$C_4$, $C_{1}$-$C_3$, $C_{1}$-$C_2$, $C_{2}$-$C_6$, $C_{2}$-$C_5$, $C_{2}$-$C_4$, $C_{2}$-$C_3$, $C_{3}$-$C_6$, $C_{3}$-$C_5$, $C_{3}$-$C_4$, $C_{4}$-$C_6$, $C_{4}$-$C_5$, and $C_{5}$-$C_6$ alkyl. By way of other examples, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20. Additional examples include that the phrase "optionally substituted with 1-5 substituents" is specifically intended to individually disclose a chemical group that can include 0, 1, 2, 3, 4, 5, 0-5, 0-4, 0-3, 0-2, 0-1, 1-5, 1-4, 1-3, 1-2, 2-5, 2-4, 2-3, 3-5, 3-4, and 4-5 substituents.

Compounds described herein can contain an asymmetric atom (also referred as a chiral center) and some of the compounds can contain two or more asymmetric atoms or centers, which can thus give rise to optical isomers (enantiomers) and diastereomers (geometric isomers). The present teachings include such optical isomers and diastereomers, including their respective resolved enantiomerically or diastereomerically pure isomers (e.g., (+) or (−) stereoisomer) and their racemic mixtures, as well as other mixtures of the enantiomers and diastereomers. In some embodiments, optical isomers can be obtained in enantiomerically enriched or pure form by standard procedures known to those skilled in the art, which include, for example, chiral separation, diastereomeric salt formation, kinetic resolution, and asymmetric synthesis. The present teachings also encompass cis- and trans-isomers of polymers containing alkenyl moieties (e.g., alkenes, azo, and imines). It also should be understood that the polymers of the present teachings encompass all possible regioisomers in pure form and mixtures thereof. In some embodiments, the preparation of the present polymers can include separating such isomers using standard separation procedures known to those skilled in the art, for example, by using one or more of column chromatography, thin-layer chromatography, simulated moving-bed chromatography, and high-performance liquid chromatography. However, mixtures of regioisomers can be used similarly to the uses of each individual regioisomer of the present teachings as described herein and/or known by a skilled artisan.

It is specifically contemplated that the depiction of one regioisomer includes any other regioisomers and any regioisomeric mixtures unless specifically stated otherwise.

As used herein, a "leaving group" ("LG") refers to a charged or uncharged atom (or group of atoms) that can be displaced as a stable species as a result of, for example, a substitution or elimination reaction. Examples of leaving groups include, but are not limited to, halogen (e.g., Cl, Br, I), azide (N$_3$), thiocyanate (SCN), nitro (NO$_2$), cyanate (CN), water (H$_2$O), ammonia (NH$_3$), and sulfonate groups (e.g., OSO$_2$—R, wherein R can be a $C_{1-10}$ alkyl group or a $C_{6-14}$ aryl group each optionally substituted with 1-4 groups independently selected from a $C_{1-10}$ alkyl group and an electron-withdrawing group) such as tosylate (toluenesulfonate, OTs), mesylate (methanesulfonate, OMs), brosylate (p-bromobenzenesulfonate, OBs), nosylate (4-nitrobenzenesulfonate, ONs), and triflate (trifluoromethanesulfonate, OTf).

As used herein, a "p-type semiconductor material" or a "p-type semiconductor" refers to a semiconductor material having holes as the majority current carriers. In some embodiments, when a p-type semiconductor material is deposited on a substrate, it can provide a hole mobility in excess of about $10^{-5}$ cm$^2$/Vs. In the case of field-effect devices, a p-type semiconductor can also exhibit a current on/off ratio of greater than about 10.

As used herein, an "n-type semiconductor material" or an "n-type semiconductor" refers to a semiconductor material having electrons as the majority current carriers. In some embodiments, when an n-type semiconductor material is deposited on a substrate, it can provide an electron mobility in excess of about $10^{-5}$ cm$^2$/Vs. In the case of field-effect devices, an n-type semiconductor can also exhibit a current on/off ratio of greater than about 10.

As used herein, "field effect mobility" refers to a measure of the velocity with which charge carriers, for example, holes (or units of positive charge) in the case of a p-type semiconductor material and electrons in the case of an n-type semiconductor material, move through the material under the influence of an electric field.

As used herein, a compound can be considered "ambient stable" or "stable at ambient conditions" when a transistor incorporating the compound as its semiconducting material exhibits a carrier mobility that is maintained at about its initial measurement when the compound is exposed to ambient conditions, for example, air, ambient temperature, and humidity, over a period of time. For example, a compound can be described as ambient stable if a transistor incorporating the compound shows a carrier mobility that does not vary more than 20% or more than 10% from its initial value after exposure to ambient conditions, including, air, humidity and temperature, over a 3 day, 5 day, or 10 day period.

As used herein, "solution-processable" refers to compounds (e.g., polymers), materials, or compositions that can be used in various solution-phase processes including spin-coating, printing (e.g., inkjet printing, screen printing, pad printing, offset printing, gravure printing, flexographic printing, lithographic printing, mass-printing and the like), spray coating, electrospray coating, drop casting, dip coating, and blade coating.

Throughout the specification, structures may or may not be presented with chemical names. Where any question arises as to nomenclature, the structure prevails.

In one aspect, the present teachings relate to polymeric compounds based upon 2,2'-bithiophene-3,3'-dicarboximide (BTI) repeating units or chalcogen analogs thereof, for example, compounds including 2, 3, 4 or more of such repeating units. More generally, in various embodiments, the present teachings relate to polymeric compounds including in their backbone two or more identical or different repeating units of the formula:

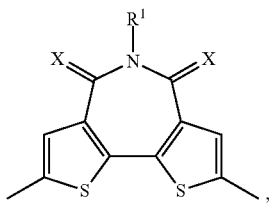

where X is selected from O, S, and Se; and $R^1$ is H or a substituent as described herein.

For example, in various embodiments, $R^1$, at each occurrence, independently can be H or a substituent which can impart improved desirable properties to the compound as a whole. For example, certain substituents including one or more electron-withdrawing or electron-donating moieties can modulate the electronic properties of the compound, while substituents that include one or more aliphatic chains can improve the solubility of the compound in organic solvents.

Accordingly, in certain embodiments, $R^1$ can be a linear or branched $C_{3-40}$ alkyl group, examples of which include an n-hexyl group, an n-octyl group, an n-dodecyl group, a 1-methylpropyl group, a 1-methylbutyl group, a 1-methylpentyl group, a 1-methylhexyl group, a 1-ethylpropyl group, a 1-ethylbutyl group, a 1,3-dimethylbutyl group, a 2-ethylhexyl group, a 2-hexyloctyl group, a 2-octyldodecyl group, and a 2-decyltetradecyl group. In certain embodiments, $R^1$ can be a linear or branched $C_{3-40}$ alkenyl group (such as the linear or branched $C_{3-40}$ alkyl groups specified above but with one or more saturated bonds replaced by unsaturated bonds). In particular embodiments, $R^1$ can be a branched $C_{3-20}$ alkyl group or a branched $C_{3-20}$ alkenyl group.

In certain embodiments, $R^1$, at each occurrence, can be a linear or branched $C_{6-40}$ alkyl or alkenyl group, an arylalkyl group (e.g., a benzyl group) substituted with a linear or branched $C_{6-40}$ alkyl or alkenyl group, an aryl group (e.g., a phenyl group) substituted with a linear or branched $C_{6-40}$ alkyl or alkenyl group, or a biaryl group (e.g., a biphenyl group) substituted with a linear or branched $C_{6-40}$ alkyl or alkenyl group, wherein each of these groups optionally can be substituted with 1-5 halo groups (e.g., F). In some embodiments, $R^1$ can be a biaryl group wherein the two aryl groups are covalently linked via a linker. For example, the linker can be a divalent $C_{1-40}$ alkyl group wherein one or more non-adjacent CH$_2$ groups optionally can be replaced by —O—, —S—, or —Se—, i.e., O, S, and/or Se atoms are not linked directly to one another. The linker can include other heteroatoms and/or functional groups as described herein.

More generally, $R^1$, at each occurrence, independently can be selected from H, a $C_{1-40}$ alkyl group, a $C_{2-40}$ alkenyl group, a $C_{2-40}$ alkynyl group, a $C_{1-40}$ haloalkyl group, and 1-4 cyclic moieties, wherein:

each of the $C_{1-40}$ alkyl group, the $C_{2-40}$ alkenyl group, the $C_{2-40}$ alkynyl group, and the $C_{1-40}$ haloalkyl group optionally can be substituted with 1-10 substituents independently selected from a halogen. —CN, NO$_2$, OH, —NH$_2$, —NH($C_{1-40}$ alkyl), —N($C_{1-40}$ alkyl)$_2$, —S(O)$_2$OH, —CHO, —C(O)—$C_{1-40}$ alkyl, —C(O) OH, —C(O)—O$C_{1-40}$ alkyl, —C(O)NH$_2$, —C(O)NH—$C_{1-40}$ alkyl, —C(O)N($C_{1-40}$ alkyl)$_2$, —O$C_{1-40}$ alkyl, —SiH$_3$, —SiH($C_{1-40}$ alkyl)$_2$, —SiH$_2$($C_{1-40}$ alkyl), and —Si($C_{1-40}$ alkyl)$_3$;

each of the $C_{1-40}$ alkyl group, the $C_{2-40}$ alkenyl group, the $C_{2-40}$ alkynyl group, and the $C_{1-40}$ haloalkyl group can be covalently bonded to the imide nitrogen atom via an optional linker; and each of the 1-4 cyclic moieties can be the same or different, can be bonded covalently to each other or the imide nitrogen via an optional linker, and optionally can be substituted with 1-5 substituents independently selected from a halogen, —CN, oxo, NO$_2$, OH, =C(CN)$_2$, —NH$_2$, —NH($C_{1-40}$ alkyl), —N($C_{1-40}$ alkyl)$_2$, —S(O)$_2$OH, —CHO, —C(O)OH, —C(O)—$C_{1-40}$ alkyl, —C(O)—O$C_{1-40}$ alkyl, —C(O)NH$_2$, —C(O) NH—$C_{1-40}$ alkyl, —C(O)N($C_{1-40}$ alkyl)$_2$, —SiH$_3$, —SiH($C_{1-40}$ alkyl)$_2$, —SiH$_2$($C_{1-40}$ alkyl), —Si($C_{1-40}$ alkyl)$_3$, —O—$C_{1-40}$ alkyl, a $C_{1-40}$ alkyl group, a $C_{2-40}$ alkenyl group, a C$_{2-40}$ alkynyl group, and a C$_{1-40}$ haloalkyl group; wherein each of the C$_{1-40}$ alkyl group, the C$_{2-40}$ alkenyl group, the C$_{2-40}$ alkynyl group, and the C$_{1-40}$ haloalkyl group optionally can be substituted with 1-5 substituents independently selected from a halogen, —CN, NO$_2$, OH, —NH$_2$, —NH(C$_{1-6}$ alkyl), —N(C$_{1-6}$ alkyl)$_2$, —S(O)$_2$OH, —CHO, —C(O)—C$_{1-6}$ alkyl, —C(O)OH, —C(O)—OC$_{1-6}$ alkyl, —C(O)NH$_2$, —C(O)NH—C$_{1-6}$ alkyl, —C(O)N(C$_{1-6}$ alkyl)$_2$, —OC$_{1-6}$ alkyl, —SiH$_3$, —SiH(C$_{1-6}$ alkyl)$_2$, —SiH$_2$(C$_{1-6}$ alkyl), and —Si(C$_{1-6}$ alkyl)$_3$.

To further illustrate, in certain embodiments, R$^1$, at each occurrence, independently can be selected from H or -L-R$^a$, where R$^a$ is selected from a C$_{1-40}$ alkyl group, a C$_{2-40}$ alkenyl group, a C$_{2-10}$ alkynyl group, and a C$_{1-40}$ haloalkyl group, each of which optionally can be substituted with 1-10 substituents independently selected from a halogen, —CN, NO$_2$, OH, —NH$_2$, —NH(C$_{1-40}$ alkyl), —N(C$_{1-40}$ alkyl)$_2$, —S(O)$_2$OH, —CHO, —C(O)—C$_{1-40}$ alkyl, —C(O)OH, —C(O)—OC$_{1-40}$ alkyl, —C(O)NH$_2$, —C(O)NH—C$_{1-40}$ alkyl, —C(O)N(C$_{1-40}$ alkyl)$_2$, —OC$_{1-40}$ alkyl, —SiH$_3$, —SiH(C$_{1-40}$ alkyl)$_2$, —SiH$_2$(C$_{1-40}$ alkyl), and —Si(C$_{1-40}$ alkyl)$_3$; and L is a covalent bond or a linker comprising one or more heteroaioms. For example, L can be a linker selected from —Y—O—Y—, —Y—[S(O)$_w$]—Y—, —Y—C(O)—Y—, —Y—[NR$^c$C(O)]—Y—, —Y—[C(O)NR$^c$]—, —Y—NR$^c$—Y—, —Y—[SoR$^c{}_2$]—Y—, where Y, at each occurrence, independently is selected from a divalent C$_{1-40}$ alkyl group, a divalent C$_{2-40}$ alkenyl group, a divalent C$_{1-40}$ haloalkyl group, and a covalent bond; R$^c$ is selected from H, a C$_{1-6}$ alkyl group, a C$_{6-14}$ aryl group, and a —C$_{1-6}$ alkyl-C$_{6-14}$ aryl group; and w is 0, 1, or 2. In some embodiments, R$^1$, at each occurrence, independently can be selected from H, a C$_{3-40}$ alkyl group, a C$_{4-40}$ alkenyl group, a C$_{4-40}$ alkynyl group, and a C$_{3-40}$ haloalkyl group, and an —O—C$_{3-40}$ alkyl group, where each of these groups can be linear or branched, and can be optionally substituted as described herein.

In other embodiments, R$^1$ can include one or more cyclic moieties. For example, R$^1$, at each occurrence, independently can be selected from -L'-Cy$^1$, -L'-Cy$^1$-L'-Cy$^2$, -L'-Cy$^1$-L'-Cy$^2$-Cy$^2$, -L'-Cy$^1$-Cy$^1$, -L'-Cy$^1$-Cy$^1$-L'-Cy$^2$, -L'-Cy$^1$-Cy$^1$-L'-Cy$^2$-Cy$^2$, -L'-Cy$^1$-L-R$^a$, -L'-Cy$^1$-L'-Cy$^2$-L-R$^a$, -L'-Cy$^1$-L'-Cy$^2$-Cy$^2$-L-R$^a$, -L'-Cy$^1$-Cy$^1$-L-R$^a$, and -L'-Cy$^1$-Cy$^1$-L'-Cy$^2$L-R$^a$; wherein:

Cy$^1$ and Cy$^2$ independently are selected from a C$_{6-14}$ aryl group, a 5-14 mcmbered heteroaryl group, a C$_{3-14}$ cycloalkyl group, and a 3-14 membered cyclohctcroalkyl group, each of which optionally can be substituted with 1-5 substituents independently selected from a halogen, —CN, oxo, =C(CN)$_2$, a C$_{1-6}$ alkyl group, a C$_{1-6}$ alkoxy group, and a C$_{1-6}$ haloalkyl group;

L', at each occurrence, independently is a covalcnt bond or a linker selected from —Y—O—Y—, —Y—[S(O)$_w$]—Y—, —Y—C(O)—Y—, —Y—[NR$^c$C(O)]—Y—, —Y—[C(O)NR$^c$]—, —Y—NR$^c$—Y—, —Y—[SiR$^c{}_2$]—Y—, a divalent C$_{1-40}$ alkyl group, a divalent C$_{2-40}$ alkenyl group, and a divalent C$_{1-40}$ haloalkyl group, where Y, R$^c$, and w are as defined above;

R$^a$ is selected from a C$_{1-40}$ alkyl group, a C$_{2-40}$ alkenyl group, a C$_{2-40}$ alkynyl group, and a C$_{1-40}$ haloalkyl group, each of wrhich optionally can be substituted with 1-10 substituents independently selected from a halogen, —CN, N)$_2$, OH, —NH$_2$, —NH(C$_{1-40}$ alkyl), —N(C$_{1-40}$ alkyl)$_2$, —S(O)$_2$OH, —CHO, —C(O)—C$_{1-40}$ alkyl, —C(O)OH, —C(O)—OC$_{1-40}$ alkyl, —C(O)NH$_2$, —C(O)NH—C$_{1-40}$ alkyl, —(O)N(C$_{1-40}$ alkyl)$_2$, —OC$_{1-40}$ alkyl, —SiH$_3$, —SiH(C$_{1-40}$ alkyl)$_2$, —SiH$_2$(C$_{1-40}$ alkyl), and —Si(C$_{1-40}$ alkyl)$_3$.

Further examples of R$^1$ include:

1) linear or branched C$_{1-40}$ alkyl groups and C$_{2-40}$ alkenyl groups such as:

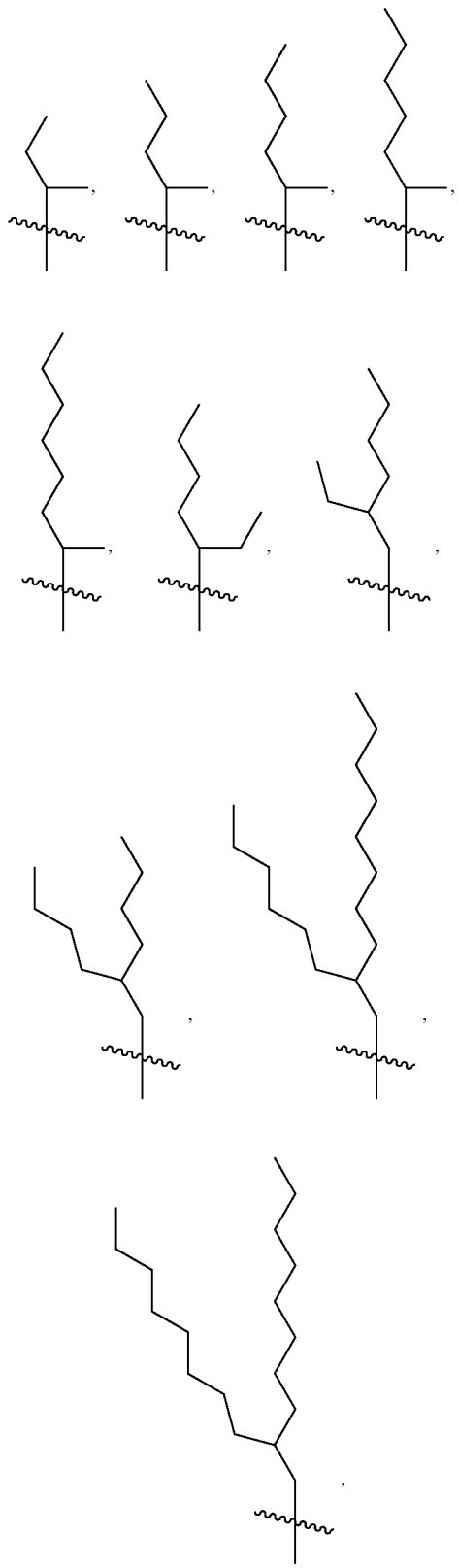

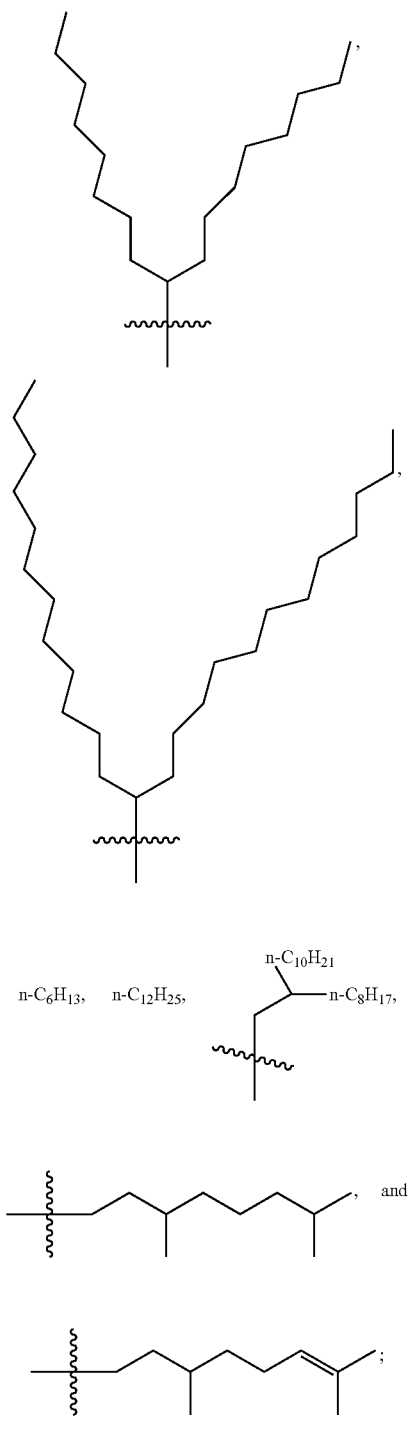
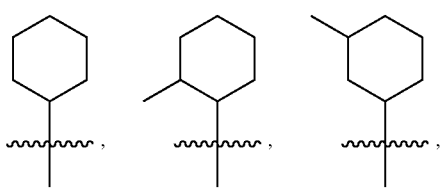
2) optionally substituted cycloalkyl groups such as:
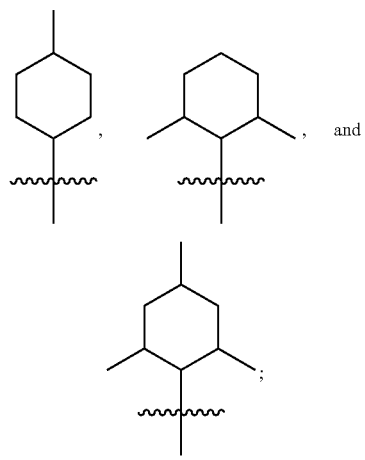
and
3) optionally substituted aryl groups, arylalkyl groups, biaryl groups, biarylalkyl groups such as:
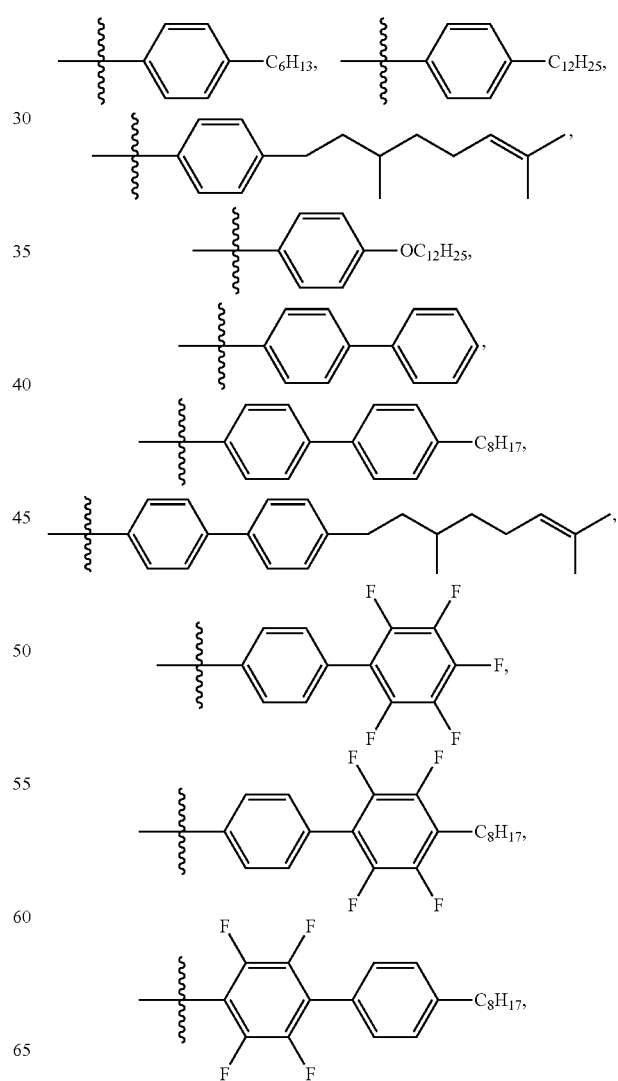

-continued

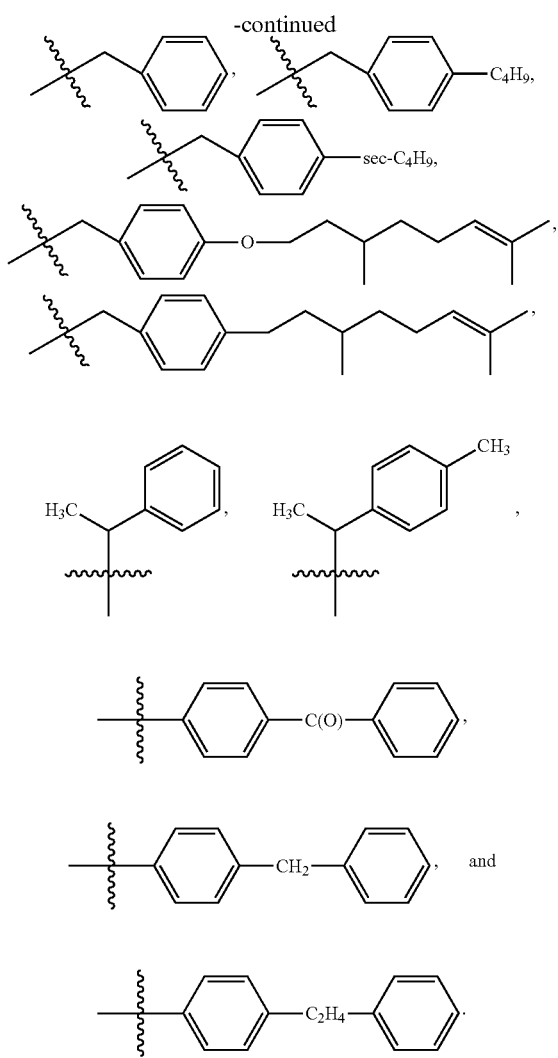

The present polymeric compounds can have a degree of polymerization (n) ranging from 2 to about 10,000. For example, in certain embodiments, the degree of polymerization can range from 2 to 9, in which case, the compounds can be alternatively referred as oligomeric compounds. In other embodiments, the degree of polymerization can range from 10 to 10,000. In most embodiments, the present polymeric compounds can have a degree of polymerization of at least 3, at least 4, at least 5, at least 8, or at least 10. For example, the degree of polymerization can range from 3 to 10,000, 3 to 5,000, 3 to 1,000, 3 to 500, 4 to 10,000, 4 to 5,000, 4 to 1,000, 4 to 500, 5 to 10,000, 5 to 5,000, 5 to 1,000, 5 to 500, 8 to 10,000, 8 to 5,000, 8 to 1,000, 8 to 500, 10 to 10,000, 10 to 5,000, 10 to 1,000, 10 to 500, and so on.

In certain embodiments, the present polymeric compounds can be homopolymers including only repeating units of the formula:

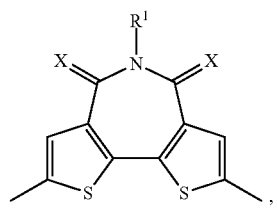

referred herein as $M^1$, where $R^1$ and X are as described herein. For embodiments where X is O, such homopolymers can be represented by the formula:

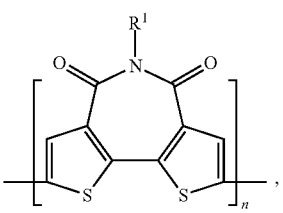

where n can be an integer between 4 and 5,000, and $R^1$ is as defined herein. For example, $R^1$ can be a linear or branched $C_{3-40}$ alkyl group. Non-limiting examples of these embodiments include:

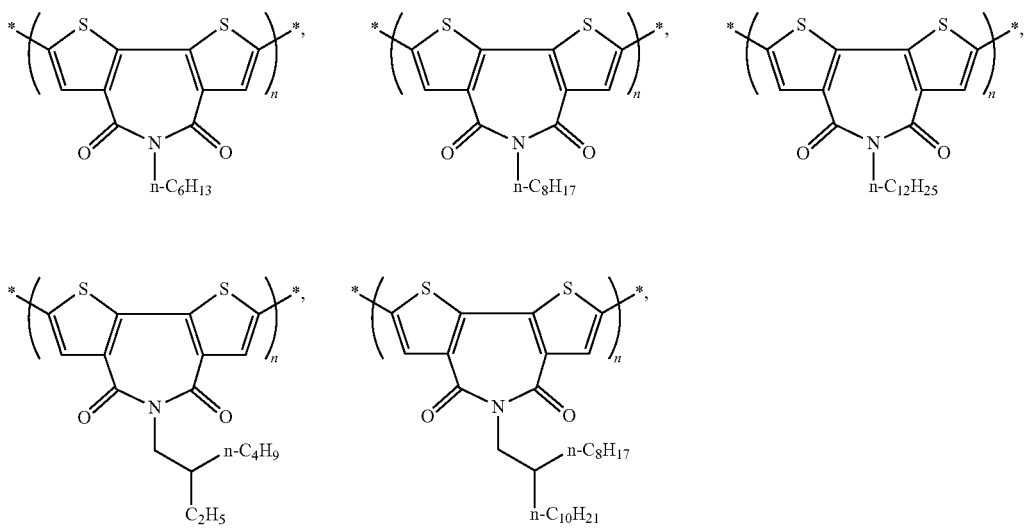

-continued

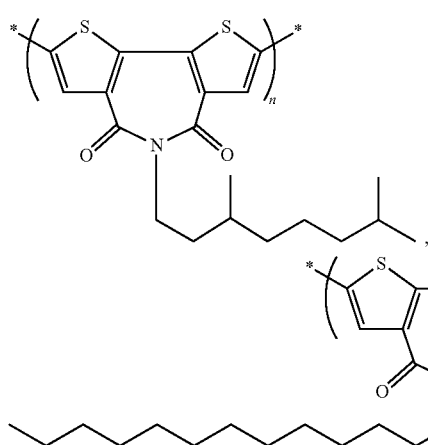, 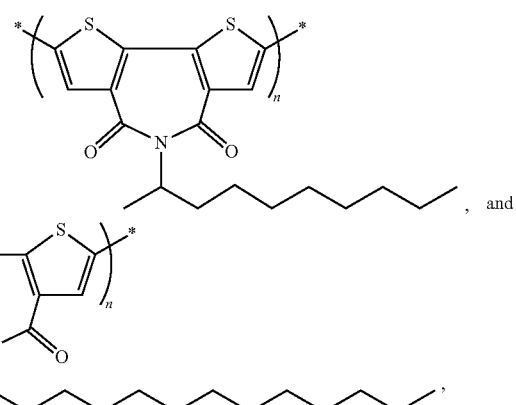, and

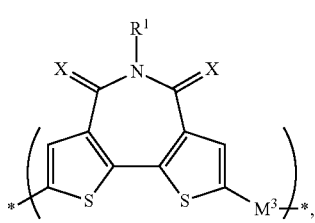, where n can be an integer between 4 and 5,000.

In various embodiments, the present polymeric compounds can include other units in addition to the repeating units $M^1$. In such embodiments, the repeating units $M^1$ and the other units can be repeated in a regular (e.g., alternating) or random manner. If the other unit is substituted, the copolymers can be regioregular or regiorandom in terms of the orientation of the various units relative to each other. Accordingly, the present polymeric compounds can be generally represented by the formula:

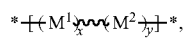, where x represents the mole fraction of $M^1$ in the polymeric compound; $M^2$, in this case, represents one or more additional units that are different from $M^1$; and y represents the mole fraction of each $M^2$ in the polymeric compound; wherein $0 < x \leq 1$, $0 \leq y < 1$, and the sum of x and y is about 1. Without wishing to be bound by any particular theory, it is believed that the present polymeric compounds can retain desirable properties even when the mole fraction of the $M^1$ repeating unit varies from as low as 0.02 to 0.50 or greater.

In certain embodiments, the present polymeric compounds can include a repeating unit of the formula:

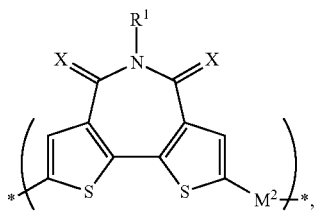, and optionally a repeating unit of the formula:

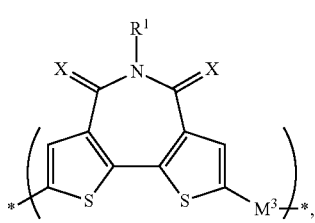, wherein $M^2$ and $M^3$ are different from each other and do not have the formula:

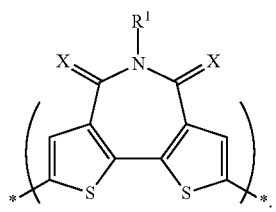.

In various embodiments, co-monomers such as $M^2$ and $M^3$ typically include at least one cyclic moiety, at least one conjugated linker (which includes one or more unsaturated bonds), or in some embodiments, at least one cyclic moiety and at least one conjugated linker. The cyclic moiety can be highly conjugated and can be carbocyclic or heterocyclic, further optionally substituted or functionalized with one or more electron-withdrawing or electron-donating groups.

To illustrate, the co-monomer unit(s) independently can be selected from:

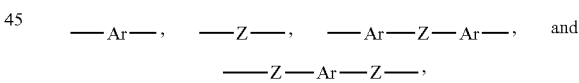

wherein:

Ar, at each occurrence, independently comprises 1-6 optionally substituted monocyclic aryl or heteroaryl moieties; and Z, at each occurrence, independently is a linear linker or a cyclic moiety different from Ar and $M^1$.

In various embodiments, Ar, at each occurrence, independently can include 1-6 optionally substituted monocyclic aryl or heteroaryl moieties independently selected from:

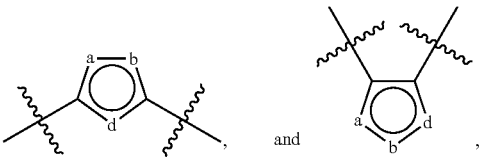

wherein:

a, b, and d independently can be selected from —O—, —S—, —Se—, —CH=, —CR⁷=, —C(O)—, —C(C(CN)₂)—, —N=, —NH— and —NR⁷—;

R⁷, at each occurrence, independently can be selected from a) halogen, b) —CN, c) —NO₂, d) —OH, e) —CHO, f) —C(O)—$C_{1-40}$ alkyl, g) —C(O)—$C_{6-14}$ aryl, h) —C(O)OH, i) —C(O)—O$C_{1-40}$ alkyl, j) —C(O)—O$C_{6-14}$ aryl, k) —C(O)NH₂, l) —C(O)NH—$C_{1-40}$ alkyl, m) —C(O)N($C_{1-40}$ alkyl)₂, n) —C(O)NH—$C_{6-14}$ aryl, o) —C(O)N($C_{1-40}$ alkyl)-$C_{6-14}$ aryl, p) —C(O)N($C_{6-14}$ aryl)₂, q) a $C_{1-40}$ alkyl group, r) a $C_{2-40}$ alkenyl group, s) a $C_{2-40}$ alkynyl group, t) a $C_{1-40}$ alkoxy group, u) a $C_{1-40}$ alkylthio group, v) a $C_{1-40}$ haloalkyl group, w) a —Y—$C_{3-14}$ cycloalkyl group, x) a —Y—$C_{6-14}$ aryl group, y) a —Y-3-14 membered cycloheteroalkyl group, and z) a —Y-5-14 membered heteroaryl group, wherein each of the $C_{1-40}$ alkyl group, the $C_{2-40}$ alkenyl group, the $C_{2-40}$ alkynyl group, the $C_{3-14}$ cycloalkyl group, the $C_{6-14}$ aryl group, the 3-14 membered cycloheteroalkyl group, and the 5-14 membered heteroaryl group optionally can be substituted with 1-5 substituents independently selected from halogen, —CN, a $C_{1-6}$ alkyl group, a $C_{1-6}$ alkoxy group, and a $C_{1-6}$ haloalkyl group; and Y can be selected from a divalent $C_{1-40}$ alkyl group, a divalent $C_{2-40}$ alkenyl group, a divalent $C_{1-40}$ haloalkyl group, and a covalent bond.

In certain embodiments, each Ar can include 1-6 phenyl groups, thienyl groups, furyl groups, pyrrolyl groups, isothiazolyl groups, thiazolyl groups, 1,2,4-thiadiazolyl groups, 1,3,4-thiadiazolyl groups, 1,2,5-thiadiazolyl groups, or combinations thereof, wherein each group can be divalent or monovalent, and optionally can be substituted with 1-4 substituents independently selected from a halogen, —CN, an oxo group, a $C_{1-40}$ alkyl group, a $C_{1-40}$ alkoxy group, a $C_{1-40}$ haloalkyl group, NH₂, NH($C_{1-40}$ alkyl) and N($C_{1-40}$ alkyl)₂. In particular embodiments, each Ar can include 1-6 thienyl groups, isothiazolyl groups, thiazolyl groups, 1,2,4-thiadiazolyl groups, 1,3,4-thiadiazolyl groups, 1,2,5-thiadiazolyl groups, phenyl groups, pyrrolyl groups, or combinations thereof, wherein each group optionally can be substituted with 1-2 substituents independently selected from a halogen, —CN, an oxo group, a $C_{1-20}$ alkyl group, a $C_{1-20}$ alkoxy group, a $C_{1-20}$ haloalkyl group, NH₂, NH($C_{1-20}$ alkyl) and N($C_{1-20}$ alkyl)₂. In some embodiments, Ar can include only unsubstituted groups. In some embodiments, Ar can include only substituted groups, wherein the substituent(s) on each substituted group can be the same or different. In some embodiments, Ar can include a combination of unsubstituted and substituted groups, wherein the substituent(s) on the substituted group(s) can be the same or different. In certain embodiments, Ar can include 2, 4 or 6 thienyl groups, isothiazolyl groups, thiazolyl groups, 1,2,4-thiadiazolyl groups, 1,3,4-thiadiazolyl groups, and 1,2,5-thiadiazolyl groups, wherein each group independently optionally can be substituted with 1-2 $C_{1-20}$ alkyl groups. In particular embodiments, each Ar can be a biaryl or biheteroaryl group optionally having head-to-head substituents.

By way of example, Ar can be selected from:

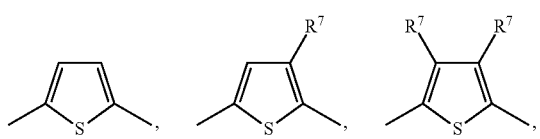

-continued

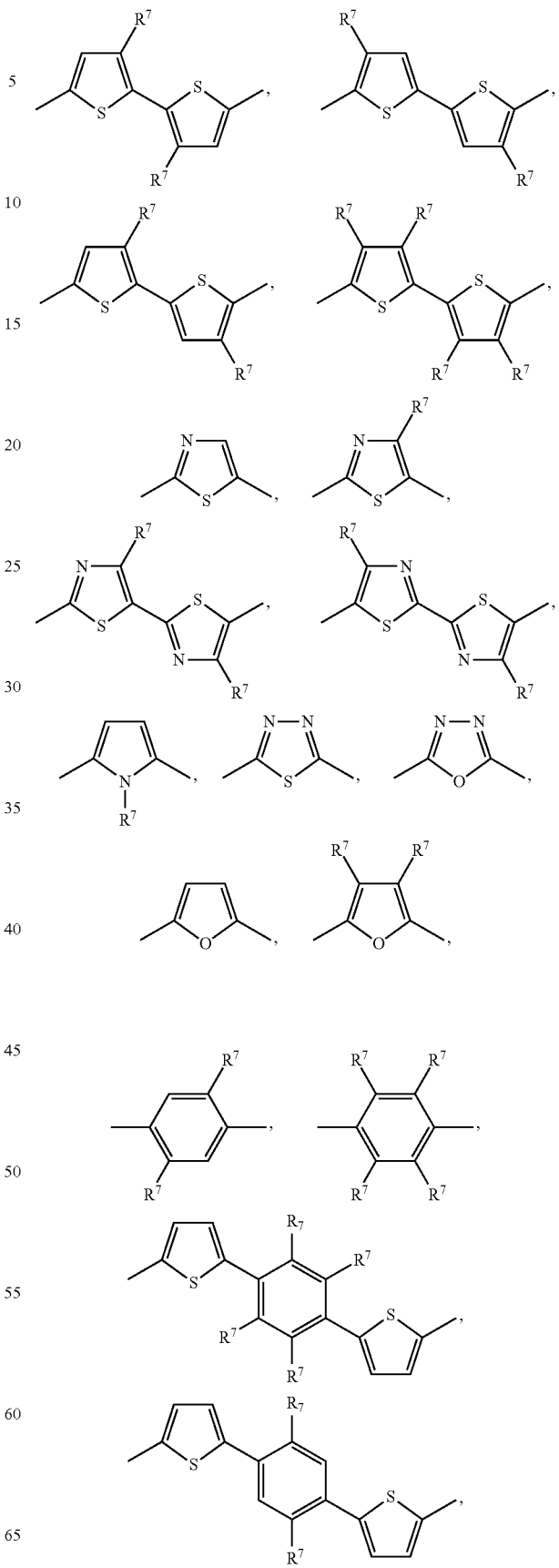

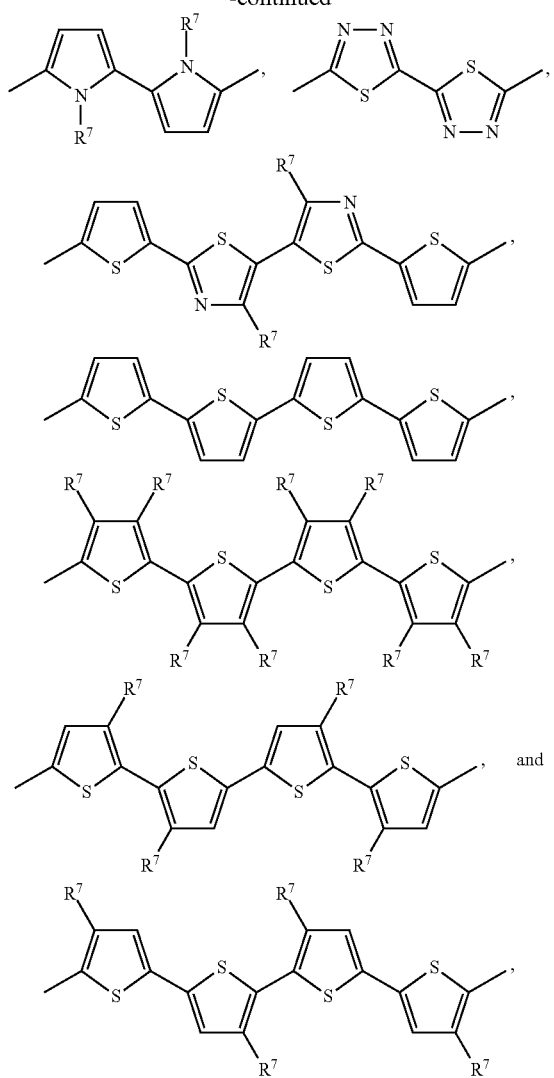

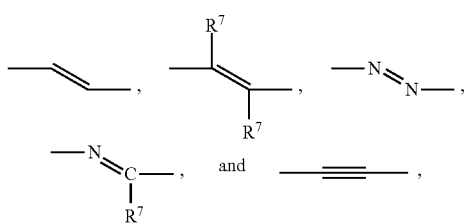

wherein R[7] is as defined herein.

In various embodiments, Z can be a conjugated system by itself (e.g., including two or more double or triple bonds) or can form a conjugated system with its neighboring components. For example, in embodiments where Z is a linear linker, Z can be a divalent ethenyl group (i.e., having one double bond), a divalent ethynyl group (i.e., having one tripe bond), a $C_{4-40}$ alkenyl or alkynyl group that includes two or more conjugated double or triple bonds, or some other non-cyclic conjugated systems that can include heteroatoms such as Si, N, P, and the like. For example, Z can be selected from:

wherein R[7] is as defined herein. In certain embodiments, Z can be selected from:

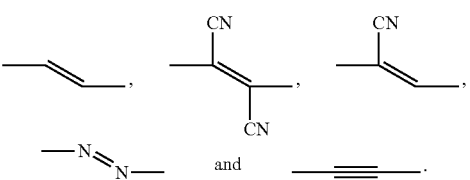

In embodiments where Z is a cyclic moiety different from Ar and M[1], Z can be an optionally substituted $C_{6-20}$ aryl group or an optionally substituted 6-20 membered heteroaryl group. For example, Z can include a planar and highly conjugated cyclic moiety which can be optionally substituted as disclosed herein. Examples of suitable cyclic moieties include benzene, naphthalene, anthracene, tetracene, pentacene, perylene, pyrene, coronene, fluorene, indacene, indenofluorene, and tetraphenylene, as well as their analogs in which one or more carbon atoms can be replaced with a heteroatom such as O, S, Si, Se, N, or P.

In some embodiments, Z can be selected from:

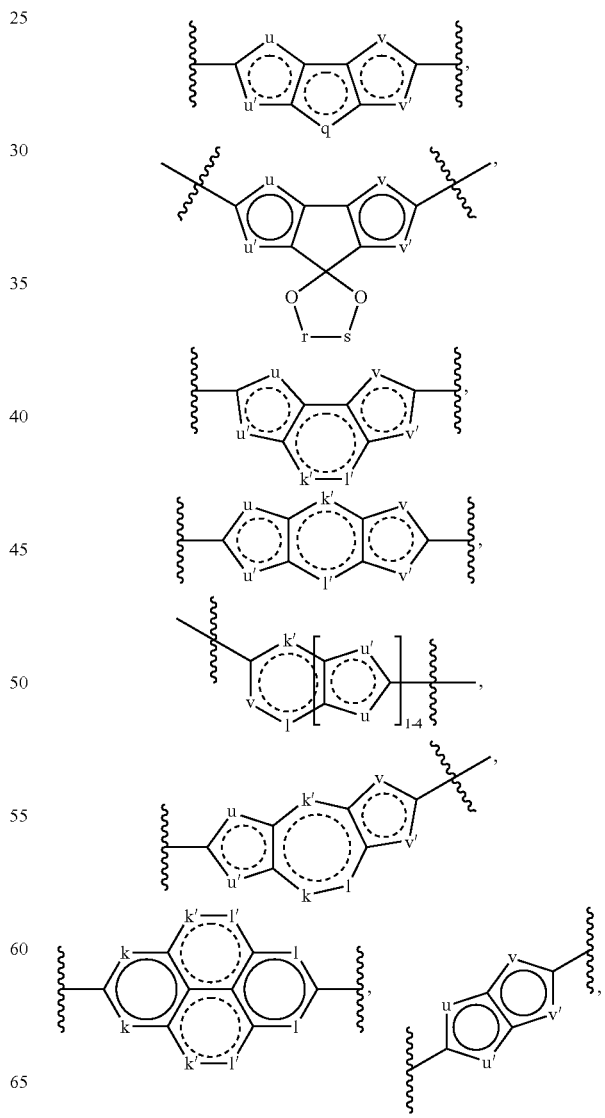

-continued

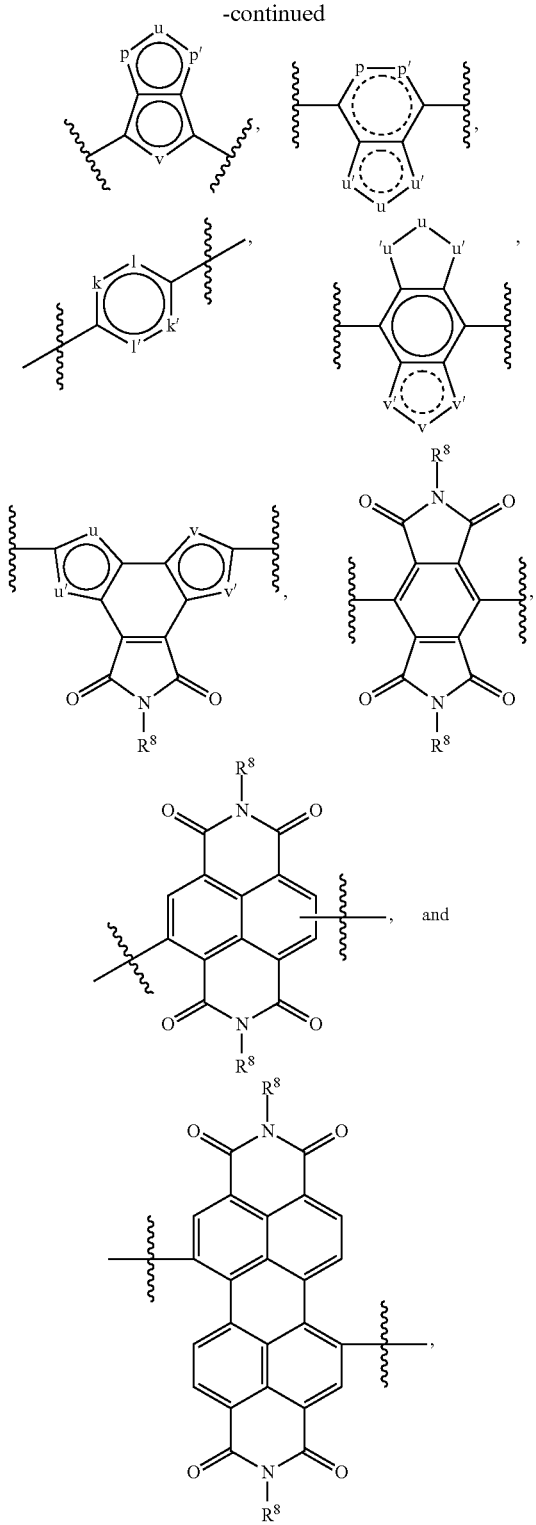

wherein:
k, k', l and l' independently can be selected from —CR⁸═, —C(O)—, and —C(C(CN)₂)—;
p, p', q and q' independently can be selected from —CR⁸═, —C(O)—, —C(C(CN)₂)—, —S—, —N═, —SiR⁸═, and —SiR⁸R⁸—;
r and s independently can be selected from —CR⁸R⁸— and —C(C(CN)₂)—;

u, u', v and v' independently can be selected from —CR⁸═, —C(O)—, —C(C(CN)₂)—, —S—, —N═, —SiR⁸═, —SiR⁸R⁸—, and —CR⁸═CR⁸—; and R⁸, at each occurrence, independently can be selected from H, a halogen, —CN, a $C_{1-40}$ alkyl group, a $C_{1-40}$ alkoxy group, and a $C_{1-40}$ haloalkyl group.

In certain embodiments, Z can be selected from:

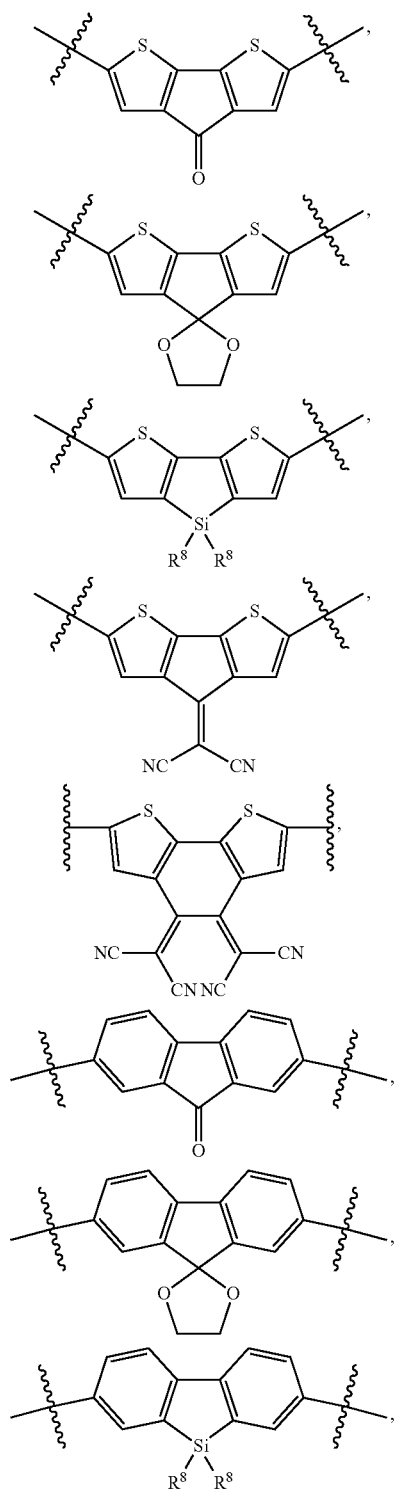

-continued
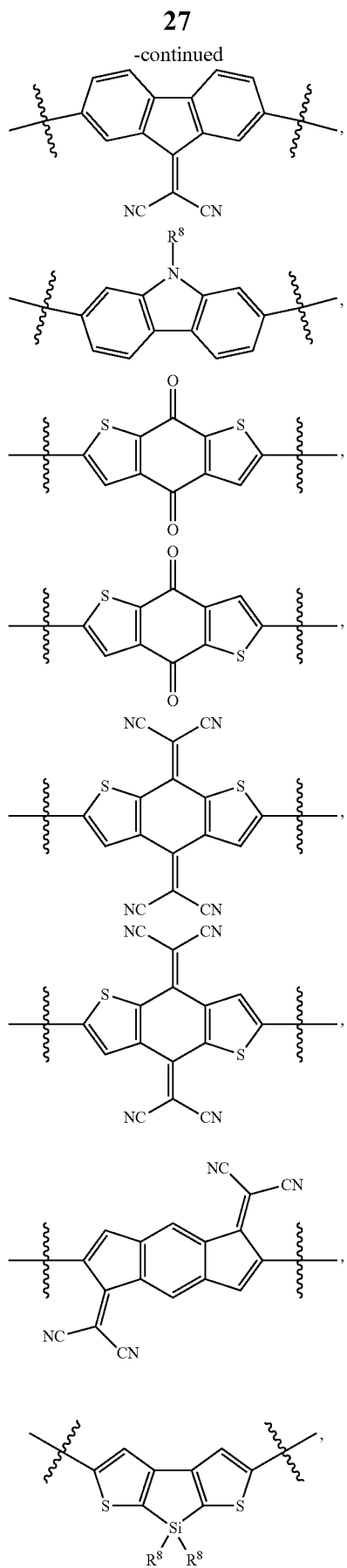
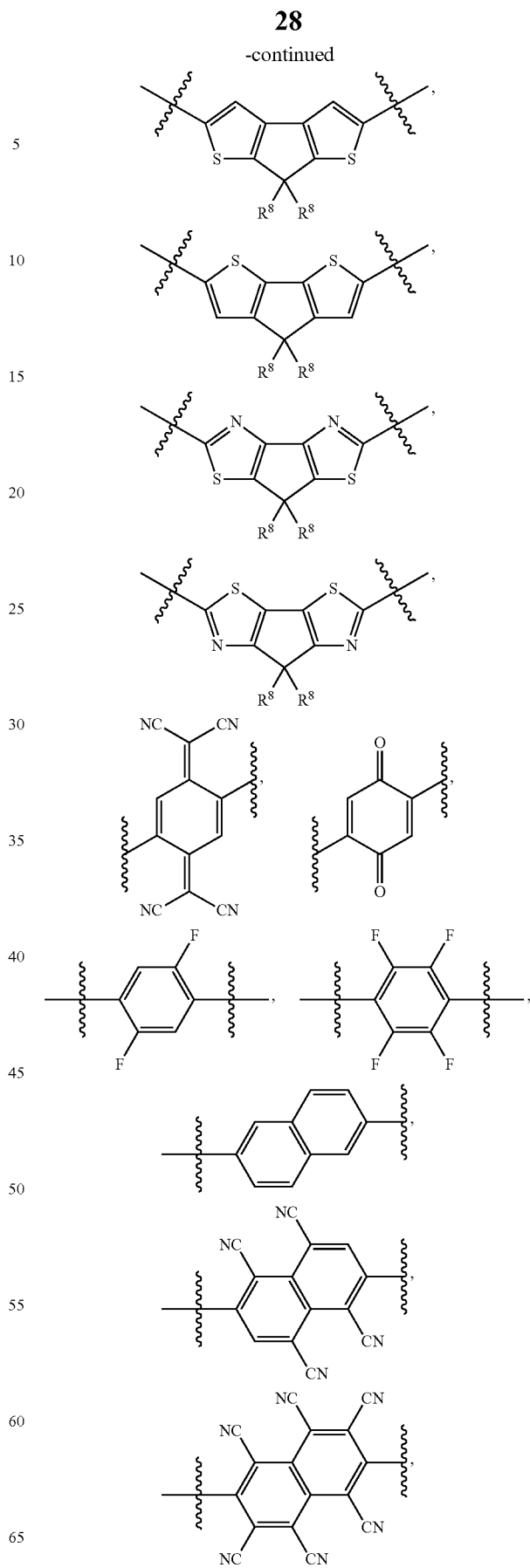

29
-continued
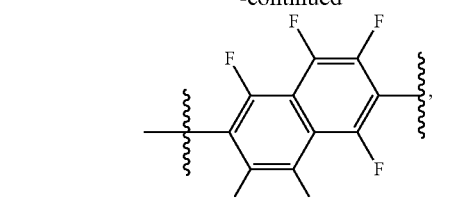
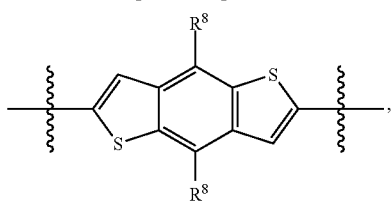
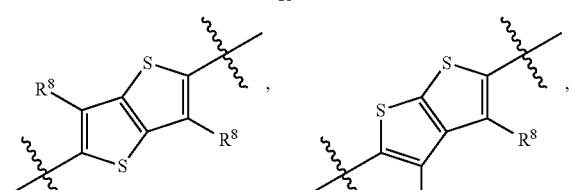
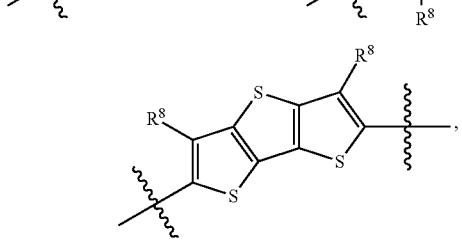
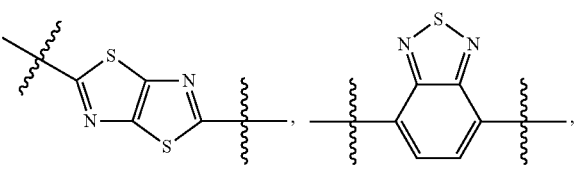
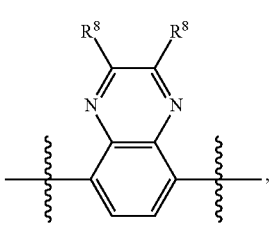
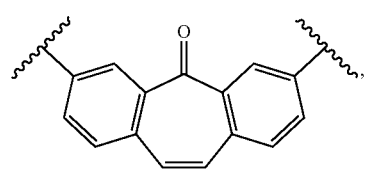
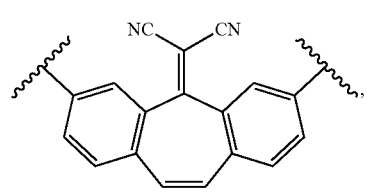
30
-continued
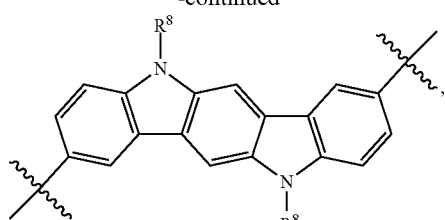
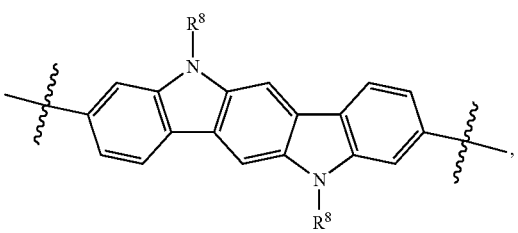
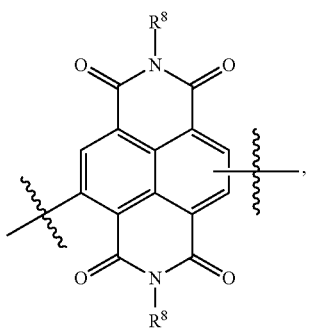
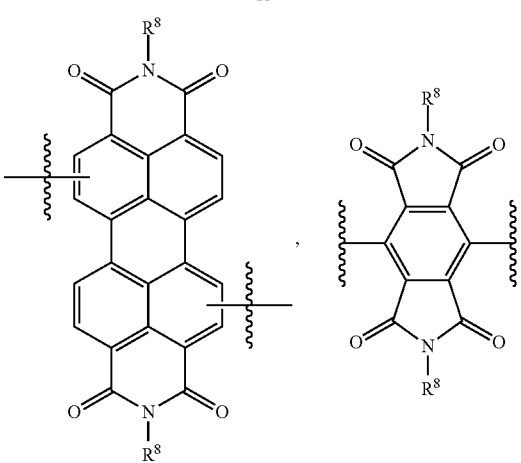
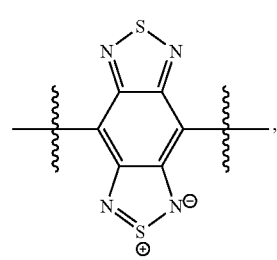
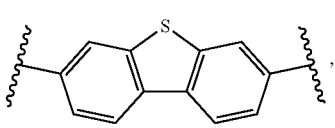

-continued

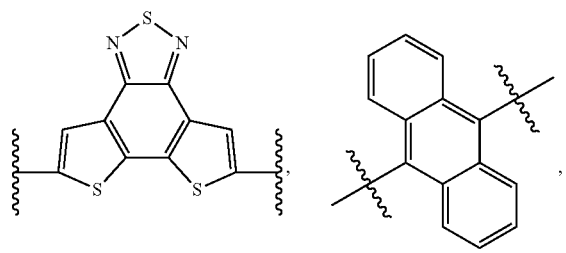

and

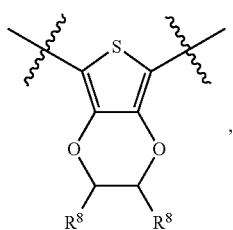

wherein R⁸ is as defined herein. For example, R⁸, at each occurrence, independently can be selected from a $C_{1-40}$ alkyl group, a $C_{1-40}$ alkoxy group, and a $C_{1-40}$ haloalkyl group.

Certain embodiments of the present polymeric compounds can be represented by the formula:

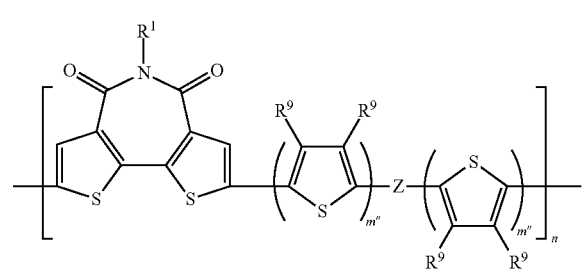

wherein:

R⁹, at each occurrence, independently can be selected from H, halogen, a $C_{1-40}$ alkyl group, a $C_{1-40}$ alkoxy group, and a $C_{1-40}$ haloalkyl group;

m″, at each occurrence, can be 1, 2, 3 or 4; and

R¹, Z, and n are as defined herein.

Non-limiting examples of certain embodiments of the present polymeric compounds include:

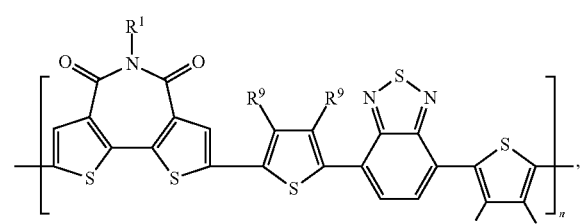

-continued

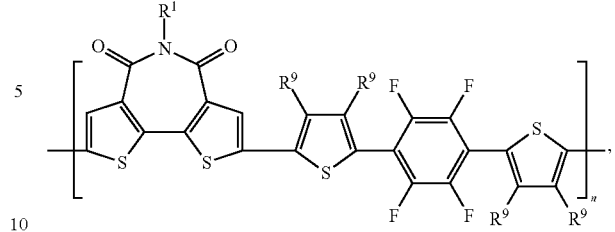

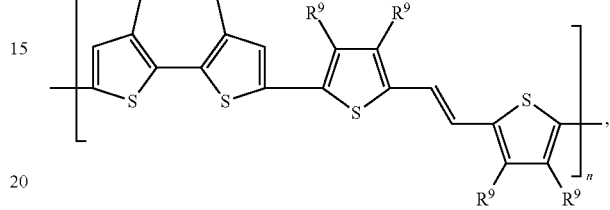

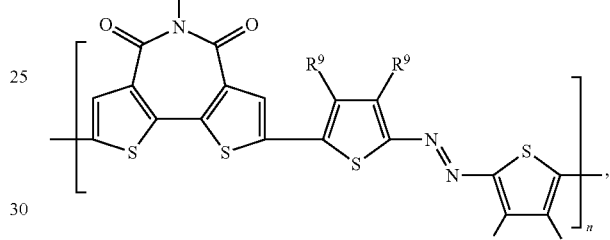

and

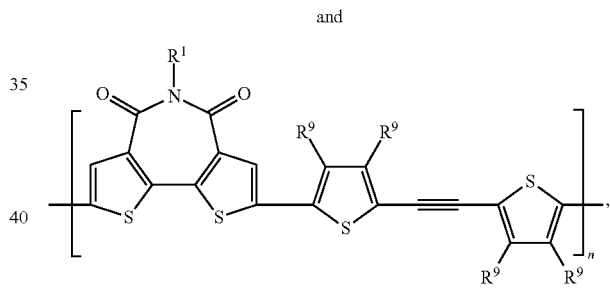

wherein R¹, R⁹, and n are as defined herein.

In various embodiments, the pairing of the M¹ unit and the one or more co-monomers, the imide position functionalization of the M¹ unit, and any functionalization on the co-monomer(s) will be determined by the application of the polymeric compounds. For example, for electronic, optical, and optoelectronic devices, the composition of the polymeric compounds can be affected by one or more of the following considerations: 1) the electron-withdrawing capability for semiconductor processing in air and stable charge transport operation; 2) modulation of the majority carrier type depending on the electronic structure of the monomers; 3) regiochemistry of the polymerization possibly affording regioregular polymers; 4) the core planarity and linearity of the polymer chain; 5) the capability of additional functionalization of the π-conjugated core; 6) the potential for increased solubility of the polymer for solution processing; 7) achieving strong π-π interactions/intermolecular electronic coupling; and 8) bandgap modulation via electron donor-acceptor coupling of electron-poor (acceptor) and electron-rich (donor) A-B or B-A repeating units.

Accordingly, in certain embodiments, M¹ can be copolymerized with an electron-poor M² repeating unit (M^p) to provide a copolymer having n-type semiconducting activity. These embodiments can be represented by the formula:

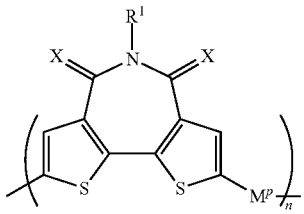

wherein $M^p$ can be an electron-poor conjugated system selected from:

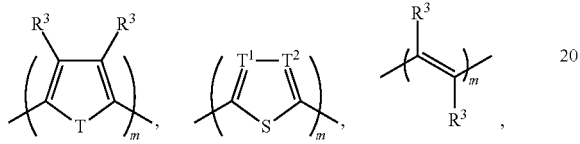

and a polycyclic group comprising 1-6 electron-withdrawing groups;
wherein:
T can be selected from O, S, and NH;
$T^1$ and $T^2$ independently can be selected from N, CH, and $CR^3$, provided that at least one of $T^1$ and $T^2$ is N;
$R^3$, at each occurrence, independently can be an electron-withdrawing group; and
m can be 1, 2, 3, 4, 5 or 6; and
$R^1$, X, and n are as defined herein.
In particular embodiments, $M^p$ can be selected from:

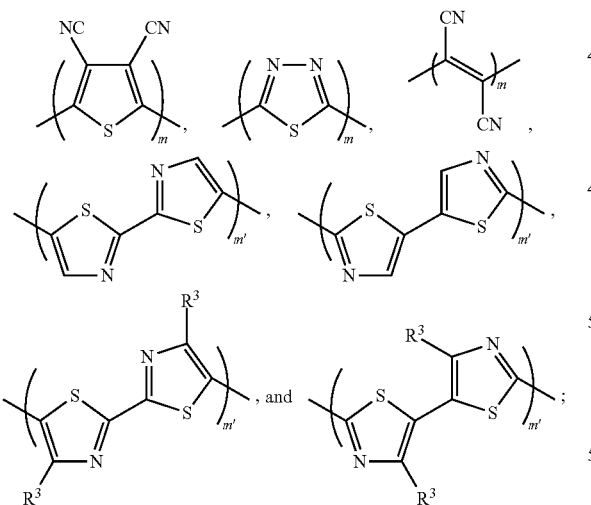

wherein:
$R^3$, at each occurrence, independently can be selected from F and CN;
m can be 1, 2, 3, 4, 5 or 6; and
m' can be 1, 2 or 3.
In particular embodiments, $M^p$ can be a polycyclic group comprising 1-6 electron-withdrawing groups independently selected from oxo, F, CN, and =C(CN)$_2$. For example, $M^p$ can be selected from:

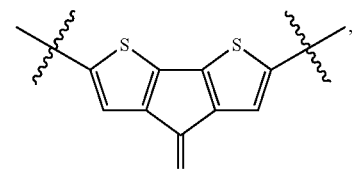

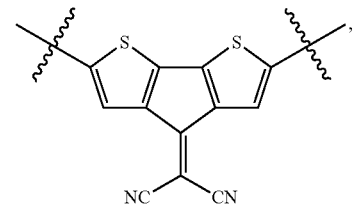

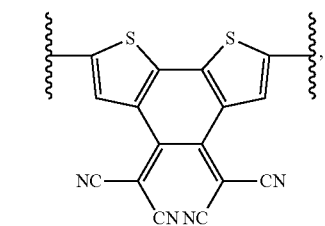

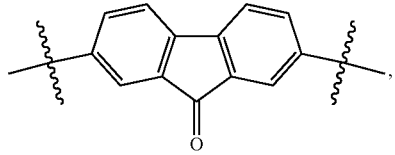

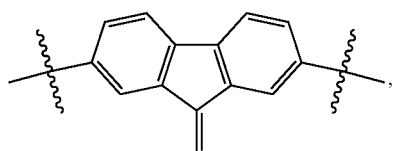

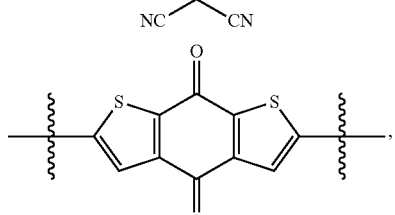

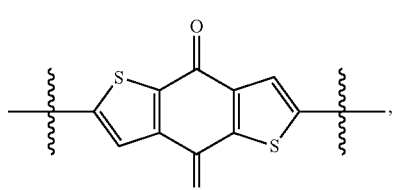

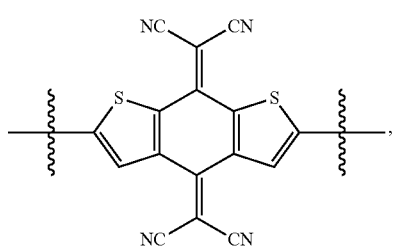

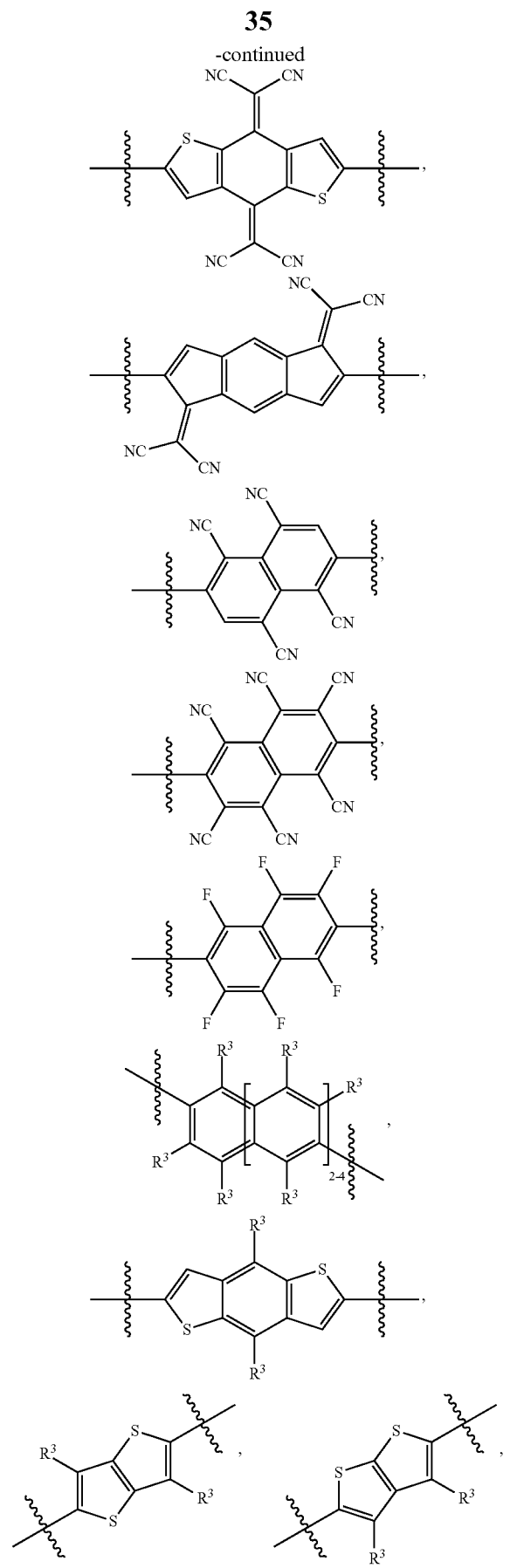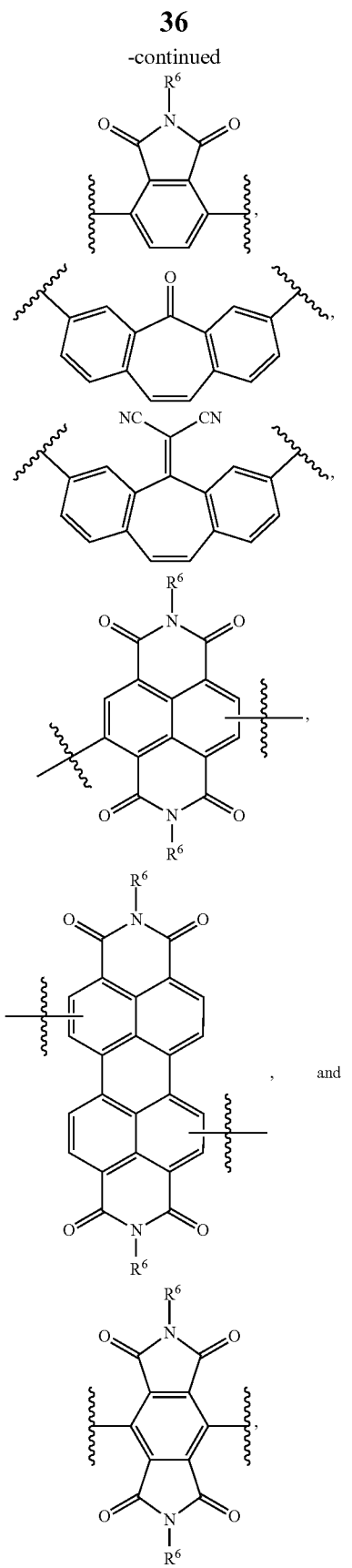
wherein $R^3$, at each occurrence, independently can be selected from F and CN; and $R^6$ is a $C_{1-40}$ alkyl group.

In certain embodiments, $M^1$ can be copolymerized with an electron-rich $M^2$ repeating unit ($M^r$). These copolymers can enable a push-pull structure and provide broad optical absorption (extinction coefficient), which can make them suitable for light-emitting transistor and/or organic photovoltaic applications. Particular embodiments of these copolymers can exhibit ambipolar activity. Copolymers according to these embodiments can be represented by the formula:

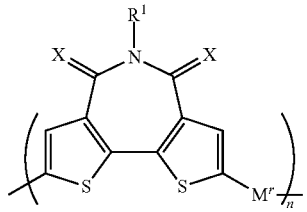

wherein $M^r$ can be an electron-rich conjugated system selected from:

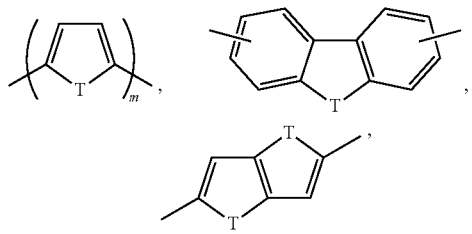

and wherein each group optionally can be substituted with 1-6 electron-donating groups; T can be selected from O, S, and $NR^2$; $R^2$ is H or an electron-donating group; and m can be 1, 2, 3, 4, 5 or 6.

In particular embodiments, $M^r$ can be selected from:

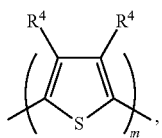

wherein $R^4$, at each occurrence, independently can be selected from H, a $C_{1-40}$ alkyl group, and a $C_{1-40}$ alkoxyl group; and m is 1, 2, 3, 4, 5 or 6. In some embodiments, $M^r$ can include one or more substituted thienyl groups. For example, $M^r$ can be selected from:

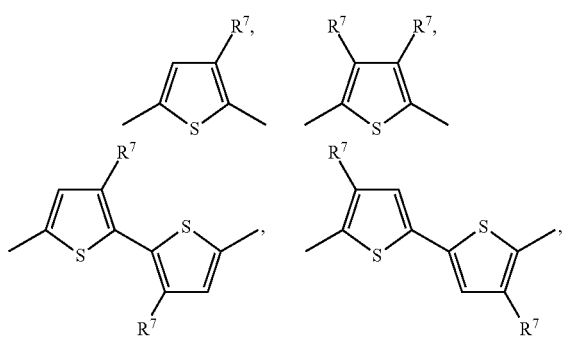

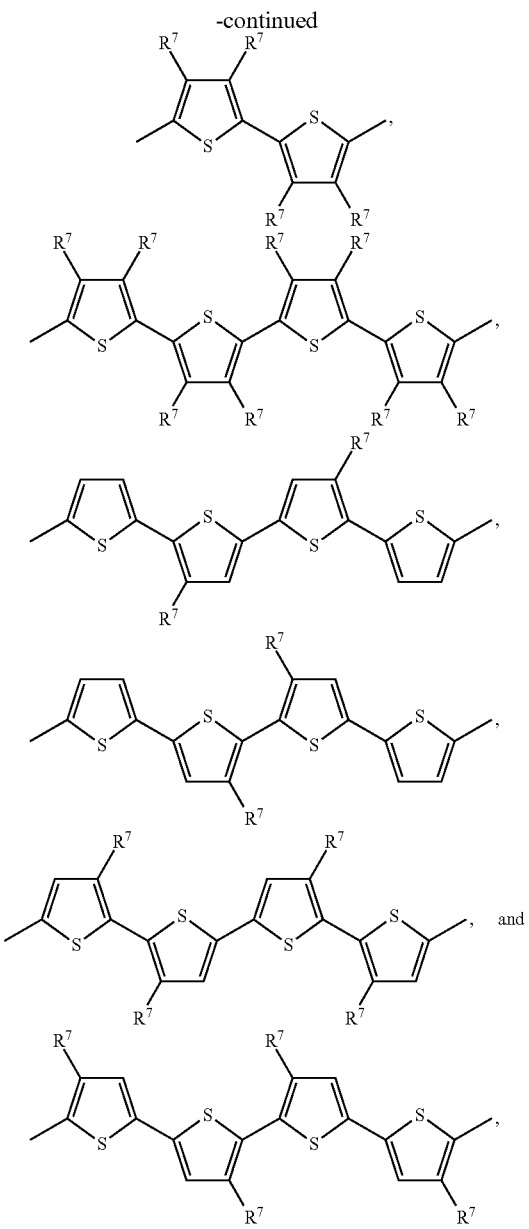

wherein $R^7$, at each occurrence, can be selected from a $C_{1-40}$ alkyl group and a $C_{1-40}$ alkoxy group.

In some embodiments, $M^r$ can include one or more unsubstituted thienyl groups. For example, certain embodiments of the present polymeric compounds can have the formula:

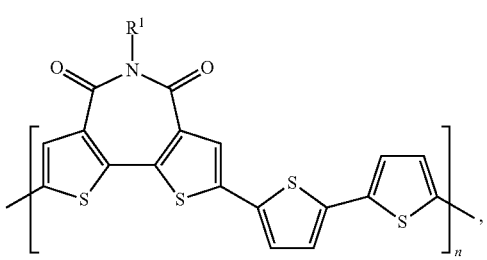

wherein $R^1$ can be a $C_{1-40}$ alkyl group, and n can be an integer between 4 and 5,000.

In some embodiments, M^r can be selected from:

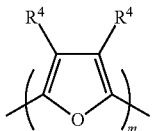 and 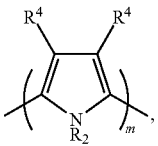, $R^2$ can be H or a $C_{1-10}$ alkyl group;

$R^4$, at each occurrence, independently can be selected from H, a $C_{1-40}$ alkyl group, and a $C_{1-40}$ alkoxyl group; and m can be 1, 2, 3, 4, 5 or 6.

In some embodiments, M^r can be selected from:

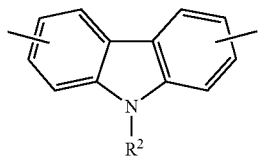 and 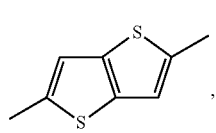, wherein each group optionally can be substituted with 1-6 groups independently selected from a $C_{1-40}$ alkyl group and a $C_{1-40}$ alkoxyl group; and $R^2$ can be H or a $C_{1-40}$ alkyl group.

In certain embodiments, $M^1$ can be copolymerized with an electron-neutral $M^2$ repeating unit (M″). These copolymers can be suitable for light-emitting transistor and/or organic photovoltaic applications. Certain embodiments of these copolymers can enable ambipolar transport. Copolymers according to these embodiments can be represented by the formula:

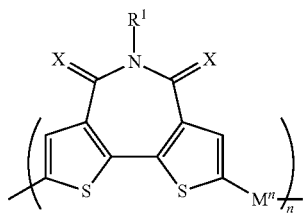

wherein M″ can be an electron-neutral conjugated system selected from:

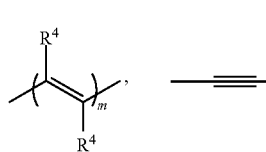, 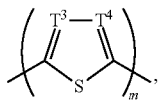, 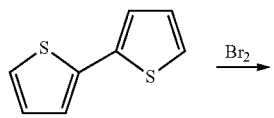,

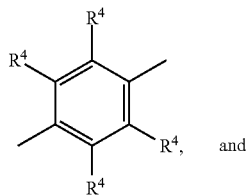, and

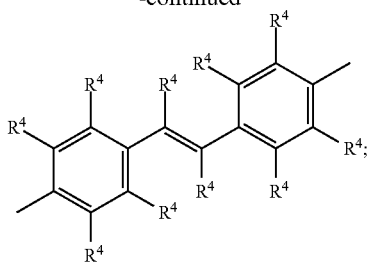

wherein:

$T^3$ and $T^4$ independently can be selected from N and $CR^4$, provided that at least one of $T^3$ and $T^4$ is N;

$R^4$, at each occurrence, independently can be H or an electron-donating group; and m can be 1, 2, 3, 4, 5 or 6.

In particular embodiments, M″ can be selected from:

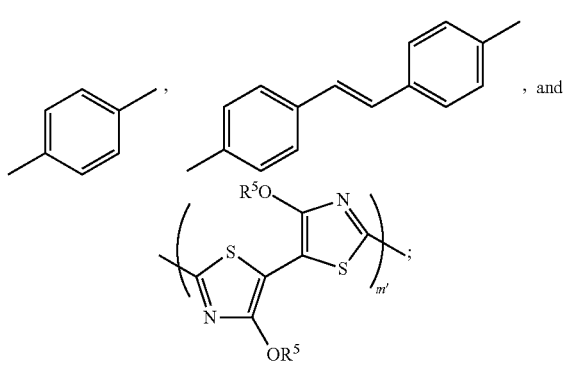

wherein $R^5$, at each occurrence, independently can be a $C_{1-40}$ alkyl group; and m' can be 1, 2 or 3.

The present polymers can be prepared from suitable monomers functionalized with various polymerizable groups known in the art. Self-polymerization and co-polymerization can be effected via various polymerization schemes including metal-catalyzed coupling reactions such as Stille coupling, Suzuki coupling, Negishi coupling, Kumada coupling, and Yamamoto coupling.

By way of example, polymers according to the present teachings can be prepared in accordance with the procedures outlined in Schemes 1-3 below:

Scheme 1

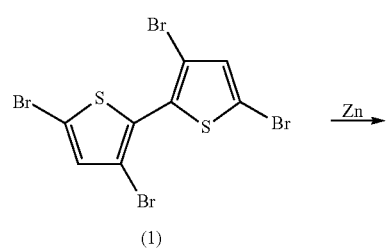

-continued

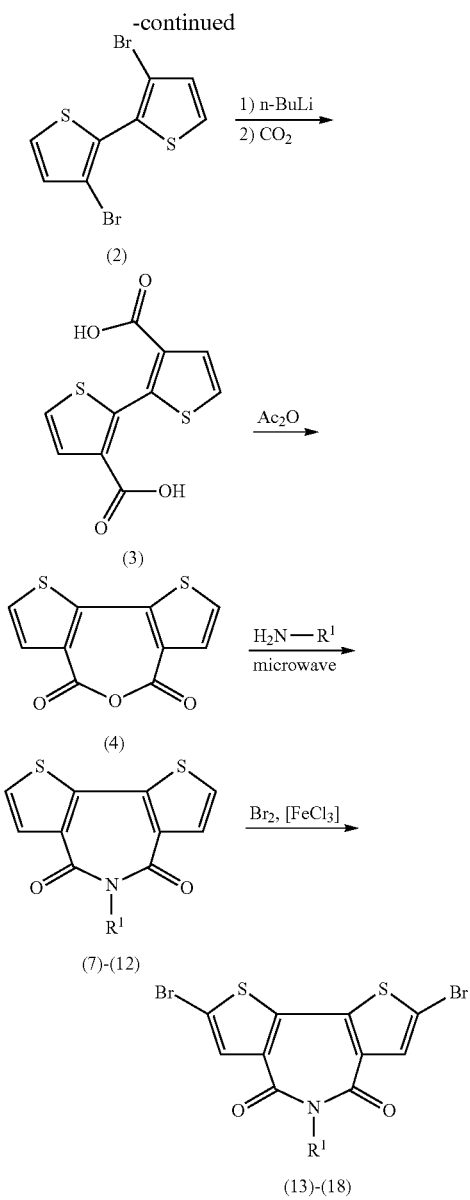

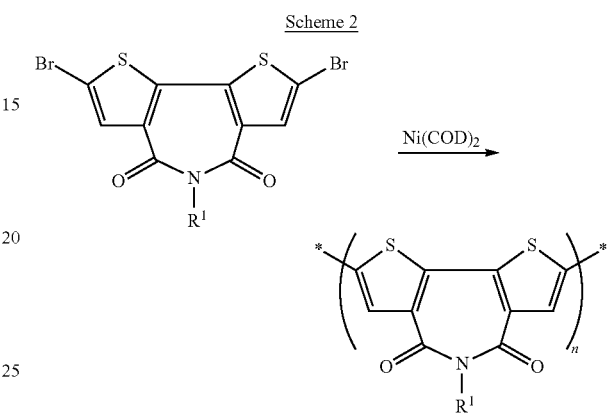

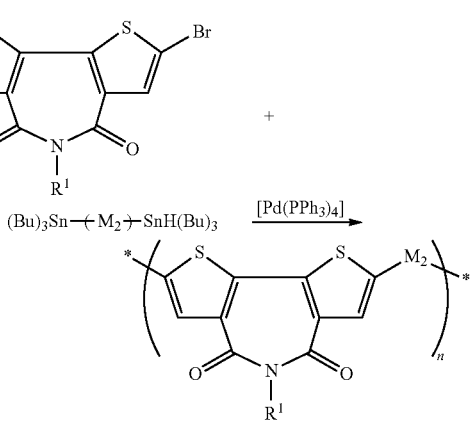

Referring to Scheme 1 above, 2,2'-bithiophene can be first tetrabrominated by refluxing with bromine ($Br_2$) in a mixture of chloroform and acetic acid to give 3,5,3',5'-tetrabromo-2,2'-bithiophene (1), which then can be selectively debrominated with zinc (Zn) to yield 3,3'-dibromo-2,2'-bithiophene (2). To obtain the corresponding dicarboxylic acid, 3,3'-dibromo-2,2'-bithiophene (2) can be added to a dilute solution of n-butyl lithium (n-BuLi) followed by quenching of the dilithium salt with dry carbon dioxide to afford the dilithium salt of 3,3'-dicarboxylate-2,2'-bithiophene. Diacid (3) can be obtained upon acidification of the solid and can be used without further purification. Condensation/cyclization of diacid (3) can be carried out in refluxing acetic anhydride to yield the novel key intermediate 2,2'-bithiophene-3,3'-dicarboxylic anhydride (4) from 2,2'-bithiophene. Various imides such as compounds (7)-(12) (vide infra) can be synthesized by condensation of the anhydride (4) with the appropriate primary amines, wherein $R^1$ is as defined herein.

Imide condensations of the novel seven-membered anhydride (4) with primary alkyl amines can be achieved by microwave irradiation for 2 hours in toluene with a catalytic amount of 4-(dimethylamino)pyridine at a temperature of 220° C. Column chromatography can be used to provide purified products in reasonable yields (ranging from 72% for n-alkyl amines to 37% for branched-alkyl primary amines). Finally, the dibromo-functionalized monomers (e.g., compounds (13)-(18), vide infra) can be synthesized in quantitative yield by addition of $Br_2$ to a solution of the imides in dichloromethane containing a catalytic amount of ferric chloride.

Referring to Scheme 2 above, homopolymers of BTI can be obtained by Yamamoto polycondensation of the dibromo-functionalized imide for 48 hours in dimethylformamide (DMF) at 60° C. in a procedure similar to previous reports using electron-deficient bromo-functionalized heterocycles. See Yamamoto et al., *Chem. Lett.,* 25: 127-128 (1996). The homopolymers can be isolated by filtration after quenching the reaction mixture with acidic methanol, and purified by multiple precipitations from chloroform with methanol.

Referring to Scheme 3, above, copolymers according to the present teachings (e.g., BTI copolymerized with a second monomer $M_2$ such as bithiophene) can be synthesized by Stille coupling using either standard polymerization conditions (90° C., 24 hours) or milder reaction conditions (30° C., 1 hour to 12 hours). Crude reaction precipitates can be isolated by filtration, followed by redissolution of the polymer in chlorobenzene.

Alternatively, the present polymers can be prepared from commercially available starting materials, compounds known in the literature, or via other readily prepared intermediates, by employing standard synthetic methods and procedures known to those skilled in the art. Standard synthetic methods and procedures for the preparation of organic molecules and functional group transformations and manipulations can be readily obtained from the relevant scientific literature or from standard textbooks in the field. It will be appreciated that where typical or preferred process conditions (i.e., reaction temperatures, times, mole ratios of reactants, solvents, pressures, etc.) are given, other process conditions can also be used unless otherwise stated. Optimum reaction conditions can vary with the particular reactants or solvent used, but such conditions can be determined by one skilled in the art by routine optimization procedures. Those skilled in the art of organic synthesis will recognize that the nature and order of the synthetic steps presented can be varied for the purpose of optimizing the formation of the polymers described herein.

The processes described herein can be monitored according to any suitable method known in the art. For example, product formation can be monitored by spectroscopic means, such as nuclear magnetic resonance spectroscopy (NMR, e.g., $^1$H or $^{13}$C), infrared spectroscopy (IR), spectrophotometry (e.g., UV-visible), mass spectrometry (MS), or by chromatography such as high pressure liquid chromatograpy (HPLC), gas chromatography (GC), gel-permeation chromatography (GPC), or thin layer chromatography (TLC).

The reactions or the processes described herein can be carried out in suitable solvents which can be readily selected by one skilled in the art of organic synthesis. Suitable solvents typically are substantially nonreactive with the reactants, intermediates, and/or products at the temperatures at which the reactions are carried out, i.e., temperatures that can range from the solvent's freezing temperature to the solvent's boiling temperature. A given reaction can be carried out in one solvent or a mixture of more than one solvent. Depending on the particular reaction step, suitable solvents for a particular reaction step can be selected.

Certain embodiments disclosed herein can be stable in ambient conditions ("ambient stable") and soluble in common solvents. As used herein, a compound can be considered electrically "ambient stable" or "stable at ambient conditions" when a transistor (e.g., organic thin film transistor, OTFT) incorporating the compound as its semiconducting material exhibits a carrier mobility that is maintained at about its initial measurement when the compound is exposed to ambient conditions, for example, air, ambient temperature, and humidity, over a period of time. For example, a compound according to the present teachings can be described as ambient stable if a transistor incorporating the compound shows a carrier mobility that does not vary more than 20% or more than 10% from its initial value after exposure to ambient conditions, including, air, humidity and temperature, over a 3 day, 5 day, or 10 day period. In addition, a compound can be considered ambient stable if the optical absorption of the corresponding film does not vary more than 20% (preferably, does not vary more than 10%) from its initial value after exposure to ambient conditions, including air, humidity and temperature, over a 3 day, 5 day, or 10 day period.

OTFTs based on the present polymers can have long-term operability and continued high-performance in ambient conditions. For example, OTFTs based on certain embodiments of the present polymers can maintain satisfactory device performance in highly humid environment. Certain embodiments of the present polymers also can exhibit excellent thermal stability over a wide range of annealing temperatures. Photovoltaic devices can maintain satisfactory power conversion efficiencies over an extended period of time.

As used herein, a compound can be considered soluble in a solvent when at least 0.1 mg of the compound can be dissolved in 1 mL of the solvent. Examples of common organic solvents include petroleum ethers; acetonitrile; aromatic hydrocarbons such as benzene, toluene, xylene, and mesitylene; ketones such as acetone, and methyl ethyl ketone; ethers such as tetrahydrofuran, dioxane, bis(2-methoxyethyl) ether, diethyl ether, di-isopropyl ether, and t-butyl methyl ether; alcohols such as methanol, ethanol, butanol, and isopropyl alcohol; aliphatic hydrocarbons such as hexanes; esters such as methyl acetate, ethyl acetate, methyl formate, ethyl formate, isopropyl acetate, and butyl acetate; amides such as dimethylformamide and dimethylacetamide; sulfoxides such as dimethylsulfoxide; halogenated aliphatic and aromatic hydrocarbons such as dichloromethane, chloroform, ethylene chloride, chlorobenzene, dichlorobenzene, and trichlorobenzene; and cyclic solvents such as cyclopentanone, cyclohexanone, and 2-methypyrrolidone.

The present compounds can be fabricated into various articles of manufacture using solution processing techniques in addition to other more expensive processes such as vapor deposition. Various solution processing techniques have been used with organic electronics. Common solution processing techniques include, for example, spin coating, drop-casting, zone casting, dip coating, blade coating, or spraying. Another example of solution processing technique is printing. As used herein, "printing" includes a noncontact process such as inkjet printing, microdispensing and the like, and a contact process such as screen-printing, gravure printing, offset printing, flexographic printing, lithographic printing, pad printing, microcontact printing and the like.

Polymers of the present teachings can be used alone or in combination with other compounds to prepare semiconductor materials (e.g., compositions and composites), which in turn can be used to fabricate various articles of manufacture, structures, and devices. In some embodiments, semiconductor materials incorporating one or more compounds of the present teachings can exhibit n-type semiconductor activity, p-type semiconductor activity, ambipolar activity, light absorption, and/or light emission.

The present teachings, therefore, further provide methods of preparing a semiconductor material. The methods can include preparing a composition that includes one or more polymers disclosed herein dissolved or dispersed in a liquid medium such as a solvent or a mixture of solvents, depositing the composition on a substrate to provide a semiconductor material precursor, and processing (e.g., heating) the semiconductor precursor to provide a semiconductor material (e.g., in the form of a thin film or thin film semiconductor) that includes a polymer disclosed herein. In various embodiments, the liquid medium can be an organic solvent, an inorganic solvent such as water, or combinations thereof In some embodiments, the composition can further include one or more additives independently selected from viscosity modulators, detergents, dispersants, binding agents, compatiblizing agents, curing agents, initiators, humectants, antifoaming agents, wetting agents, pH modifiers, biocides, and bacteriostats. For example, surfactants and/or polymers (e.g., polystyrene, polyethylene, poly-alpha-methylstyrene, polyisobutene, polypropylene, polymethylmethacrylate, and the like) can be included as a dispersant, a binding agent, a compatiblizing agent, and/or an antifoaming agent. In some embodiments, the depositing step can be carried out by printing, including inkjet printing and various contact printing techniques (e.g., screen-printing, gravure printing, offset printing, pad printing, lithographic printing, flexographic printing, and microcontact printing). In other embodiments, the depositing step can be carried out by spin coating, drop-casting, zone casting, dip coating, blade coating, or spraying.

Various articles of manufacture including electronic devices, optical devices, and optoelectronic devices, such as thin film semiconductors, field effect transistors (e.g., thin film transistors), photovoltaics, photodetectors, organic light emitting devices such as organic light emitting diodes (OLEDs) and organic light emitting transistors (OLETs), complementary metal oxide semiconductors (CMOSs), complementary inverters, diodes, capacitors, sensors, D flip-flops, rectifiers, and ring oscillators, that make use of the polymers disclosed herein are within the scope of the present teachings as are methods of making the same. The present polymers can offer processing and operation advantages in the fabrication and/or the use of these devices.

For example, articles of manufacture such as the various devices described herein can include a composite having a semiconductor material of the present teachings and a substrate component and/or a dielectric component. The substrate component can be selected from doped silicon, an indium tin oxide (ITO), ITO-coated glass, ITO-coated polyimide or other plastics, aluminum or other metals alone or coated on a polymer or other substrate, a doped polythiophene, and the like. The dielectric component can be prepared from inorganic dielectric materials such as various oxides (e.g., $SiO_2$, $Al_2O_3$, $HfO_2$), organic dielectric materials such as various polymeric materials (e.g., polycarbonate, polyester, polystyrene, polyhaloethylene, polyacrylate), and self-assembled superlattice/self-assembled nanodielectric (SAS/SAND) materials (e.g., as described in Yoon, M-H. et al., *PNAS*, 102 (13): 4678-4682 (2005), the entire disclosure of which is incorporated by reference herein), as well as hybrid organic/inorganic dielectric materials (e.g., described in U.S. patent application Ser. No. 11/642,504, the entire disclosure of which is incorporated by reference herein). In some embodiments, the dielectric component can include the crosslinked polymer blends described in U.S. patent application Ser. Nos. 11/315,076, 60/816,952, and 60/861,308, the entire disclosure of each of which is incorporated by reference herein. The composite also can include one or more electrical contacts. Suitable materials for the source, drain, and gate electrodes include metals (e.g., Au, Al, Ni, Cu), transparent conducting oxides (e.g., ITO, IZO, ZITO, GZO, GIO, GITO), and conducting polymers (e.g., poly(3,4-ethylenedioxythiophene) poly(styrenesulfonate) (PEDOT:PSS), polyaniline (PANI), polypyrrole (PPy)). One or more of the composites described herein can be embodied within various organic electronic, optical, and optoelectronic devices such as organic thin film transistors (OTFTs), specifically, organic field effect transistors (OFETs), as well as sensors, capacitors, unipolar circuits, complementary circuits (e.g., inverter circuits), and the like.

Accordingly, an aspect of the present teachings relates to methods of fabricating an organic field effect transistor that incorporates a semiconductor material of the present teachings. The semiconductor materials of the present teachings can be used to fabricate various types of organic field effect transistors including top-gate top-contact capacitor structures, top-gate bottom-contact capacitor structures, bottom-gate top-contact capacitor structures, and bottom-gate bottom-contact capacitor structures.

FIGS. 1a-d illustrates the four common types of OFET structures: (FIG. 1a) bottom-gate top-contact structure 1a, (FIG. 1b) bottom-gate bottom-contact structure 1b, (FIG. 1c) top-gate bottom-contact structure 1c, and (FIG. 1d) top-gate top-contact structure 1d. As shown in FIGS. 1a-d, an OFET can include a dielectric layer (e.g., shown as 8, 8', 8", and 8'''), a semiconductor layer (e.g., shown as 6, 6', 6", and 6'''), a gate contact (e.g., shown as 10, 10', 10", and 10'''), a substrate (e.g., shown as 12, 12', 12", and 12'''), and source and drain contacts (e.g., shown as 2, 2', 2", 2''', 4, 4', 4", and 4''').

In certain embodiments, OTFT devices can be fabricated with the present polymers on doped silicon substrates, using $SiO_2$ as the dielectric, in top-contact geometries. In particular embodiments, the active semiconductor layer which incorporates at least a polymer of the present teachings can be deposited at room temperature or at an elevated temperature. In other embodiments, the active semiconductor layer which incorporates at least one polymer of the present teachings can be applied by spin-coating or printing as described herein. For top-contact devices, metallic contacts can be patterned on top of the films using shadow masks.

In certain embodiments, OTFT devices can be fabricated with the present polymers on plastic foils, using polymers as the dielectric, in top-gate bottom-contact geometries. In particular embodiments, the active semiconducting layer which incorporates at least a polymer of the present teachings can be deposited at room temperature or at an elevated temperature. In other embodiments, the active semiconducting layer which incorporates at least a polymer of the present teachings can be applied by spin-coating or printing as described herein. Gate and source/drain contacts can be made of Au, other metals, or conducting polymers and deposited by vapor-deposition and/or printing.

Other articles of manufacture in which polymers of the present teachings are useful include photovoltaics or solar cells. Polymers of the present teachings can exhibit broad optical absorption and/or a tuned redox properties and bulk carrier mobilities, making them desirable for such applications. Accordingly, the polymers described herein can be used as an acceptor (n-type) semiconductor or a donor (p-type) semiconductor depending on the nature of the $M_2$ unit in a photovoltaic design, which includes an adjacent p-type or n-type semiconductor material, respectively, that forms a p-n junction. The polymers can be in the form of a thin film semiconductor, which can be deposited on a substrate to form a composite. Exploitation of polymers of the present teachings in such devices is within the knowledge of a skilled artisan.

Figure 2:
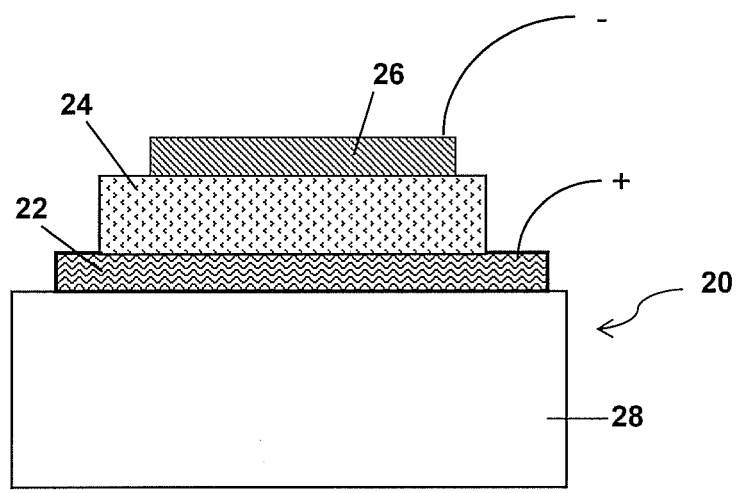
FIG. 2 illustrates a representative structure of a bulk-heterojunction organic photovoltaic device (also known as solar cell) which can incorporate one or more compounds of the present teachings as the donor and/or acceptor materials.
Figure 3:
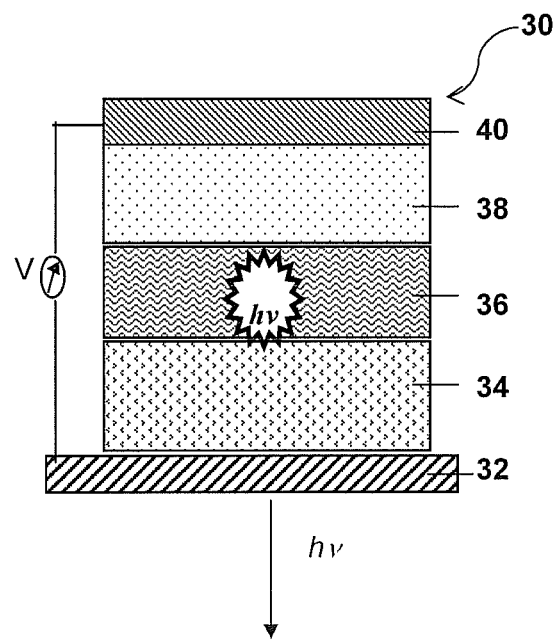
FIG. 3 illustrates a representative structure of an organic light-emitting device which can incorporate one or more compounds of the present teachings as electron-transporting and/or emissive and/or hole-transporting materials.
Figure 4:
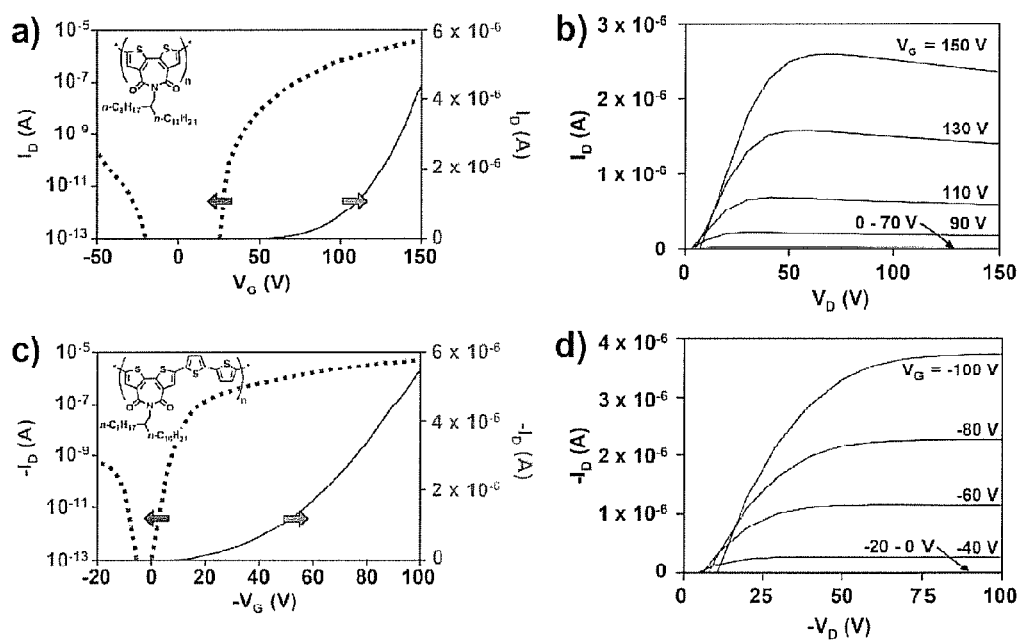
FIGS. 4a-d show transfer (FIGS. 4a and 4c) and output (FIGS. 4b and 4d) plots of two polymers of the present teachings spin-cast onto an HMDS treated substrate and annealed at 240° C. for 2 hours and at 180° C. for 30 minutes, respectively.

Accordingly, another aspect of the present teachings relates to methods of fabricating an organic light-emitting transistor, an organic light-emitting diode (OLED), or an organic photovoltaic device that incorporates one or more semiconductor materials of the present teachings. FIG. 2 illustrates a representative structure of a bulk-heterojunction organic photovoltaic device (also known as solar cell) 20 which can incorporate one or more polymers of the present teachings as the donor and/or acceptor materials. As shown, a representative solar cell generally includes an anode 22 (e.g., ITO), a cathode 26 (e.g., aluminium or calcium), and an active layer 24 between the anode and the cathode which can incorporate one or more polymers of the present teachings as the electron donor (p-channel) and/or electron acceptor (n-channel) materials on a substrate 28 (e.g., glass). FIG. 3 illustrates a representative structure of an OLED 30 which can incorporate one or more polymers of the present teachings as electron-transporting and/or emissive and/or hole-transporting materials. As shown, an OLED generally includes a substrate (not shown), a transparent anode 32 (e.g., ITO), a cathode 40 (e.g., metal), and one or more organic layers which can incorporate one or more polymers of the present teachings as hole-transporting (n-channel) (layer 34 as shown) and/or emissive (layer 36 as shown) and/or electron-transporting (p-channel) materials (layer 38 as shown).

The following examples are provided to illustrate further and to facilitate the understanding of the present teachings and are not in any way intended to limit the invention. Additional experimental procedures, data, and analysis can be found in Letizia et al., *J. Am. Chem. Soc.*, 130: 9679-9694 (2008), the disclosure of which is incorporated by reference herein in its entirety.

All reagents were purchased from commercial sources and used without further purification unless otherwise noted. Anhydrous diethyl ether and THF were distilled from Na/benzophenone and toluene was distilled from Na. $CO_2$ gas was obtained by warming dry ice and dried over $P_2O_5$ before use. The Stille reagent 5,5'-bis(tributylstannyl)-2,2'-bithiophene was synthesized according to the procedure reported in Wei, Y. et al., *Chem. Mater.*, 8: 2659-2668 (1996). Conventional Schlenk techniques were used and reactions were carried out under $N_2$ unless otherwise noted. Microwave- assisted reactions were run in sealed vessels using a CEM Discover microwave reactor in the temperature-controlled mode. UV-visible spectra were recorded on a Cary Model 1 UV-visible spectrophotometer. NMR spectra were recorded on a Varian Unity Plus 500 spectrometer ($^1$H, 500 MHz). Electrochemistry was performed on a C3 Cell Stand electrochemical station with BAS Epsilon software (Bioanalytical Systems, Inc., Lafayette, Ind.).

EXAMPLE 1

Polymer Synthesis

The following examples describe the preparation of certain polymers of the present teachings and related intermediates.

EXAMPLE 1A

Synthesis of 3,3',5,5'-tetrabromo-2,2'-bithiophene (1)

Bromine (288 g, 1.8 mol) was added slowly over 1 hour to a stirred solution of 2,2'-bithiophene (60.0 g, 0.361 mol) in 280 mL of chloroform containing 120 mL of glacial acetic acid in a 1 L round bottom flask fitted with a reflux condenser. The mixture was then stirred at reflux for 12 h. Upon cooling to room temperature, a colorless precipitate was isolated by filtration and washed with methanol. The filtrate was then concentrated and a second crop of tan precipitate was collected and washed with methanol. The combined solids were dissolved in methylene chloride (500 mL), washed four times with 200 mL of water, once with 100 mL of brine, and dried over anhydrous $MgSO_4$. The organic solution was then filtered, and the solvent was removed by evaporation to give 157 g (90% yield) of a colorless powder. $^1$H NMR ($CDCl_3$): δ 7.06 (s, 2H) ppm.

EXAMPLE 1B

Synthesis of 3,3'-dibromo-2,2'-bithiophene (2)

Zn powder (31.7 g, 0.485 mol) was added in portions to a vigorously stirred refluxing mixture of bithiophene (1) (77.9 g, 0.162 mol) in 400 mL of ethanol containing 40 mL of water, 100 mL of glacial acetic acid, and 8 mL of 3 M HCl (aq). After refluxing for 2 h, the mixture was filtered hot and upon cooling to 0° C., yellow crystals were collected by filtration. The crystals were dissolved in diethyl ether, washed three times with 200 mL of water, once with 100 mL of brine, and dried over anhydrous $MgSO_4$. The organic solution was filtered and the solvent was removed by evaporation to give 49.4 g (94% yield) of a light yellow powder. Anal. Calcd. for $C_8H_4Br_2S_2$: C, 29.65; H, 1.24. Found: C, 29.59; H, 1.14; $^1$H NMR ($CDCl_3$): 7.41 (d, J=5.3 Hz, 2H), 7.09 (d, J=5.3 Hz, 2H) ppm.

EXAMPLE 1C

Synthesis of 2,2'-bithiophene-3,3'-dicarboxylic acid (3)

A solution of bithiophene (2) (19.44 g, 60.0 mmol) in 150 mL of diethyl ether was added dropwise over 1 hour to a stirring solution of n-BuLi (82.5 mL, 1.6 M in hexanes) in 900 mL of ethyl ether at −78° C. The reaction was then allowed to stir for 1 hour at −78° C. before dry $CO_2$ was bubbled into the reaction mixture for 30 min. The reaction mixture was then allowed to stir for an additional 30 minutes before 1 mL of methanol was added and the reaction mixture was filtered cold to afford a colorless solid. The solid was dried overnight in vacuo at 100° C., dissolved in 200 mL water, acidified with 6 M HCl (aq), and the resulting colorless precipitate isolated by filtration. This diacid was dried overnight in vacuo at 100° C. to yield 14.1 g (92% yield) of a colorless powder. Anal. Calcd. for $C_{10}H_6O_4S_2$: C, 47.23; H, 2.38. Found: C, 47.19; H, 2.45; $^1$H NMR ($CDCl_3$): 7.45 (d, J=4.0 Hz, 2H), 7.10 (d, J=4.5 Hz, 2H); m.p. 194-198° C.; MS (EI): m/z (%) 253.79 (100) [M$^+$].

EXAMPLE 1D

Synthesis of 2,2'-bithiophene-3,3'-dicarboxylic anhydride (4)

Diacid (3) (12.6 g, 49.4 mmol) was stirred in 100 mL of acetic anhydride at reflux for 6 h. Upon cooling to 0° C., the solid was collected by filtration, washed with 20 mL of cold acetic anhydride, and dried in vacuo at 120° C. overnight. The resulting light yellow crystals (11.4 g, 98% yield) were used without further purification. Anal. Calcd. for $C_{10}H_4O_3S_2$: C, 50.84; H, 1.71. Found: C, 50.78; H, 1.66; 1H NMR ($CDCl_3$): 7.68 (d, J=4.0 Hz, 2H), 7.40 (d, J=5.0 Hz, 2H); m.p. 260-263° C.; MS (EI): m/z (%) 235.96 (100) [M$^+$].

EXAMPLE 1E

Synthesis of 1-iodo-2-octyldodecane (5)

Iodine (6.06 g, 23.9 mmol) was added to a solution of 2-octyl-1-dodecanol (6.20 g, 20.8 mmol), triphenylphosphine (6.53 g, 24.9 mmol), and imidazole (1.69 g, 24.9 mmol) in 40 mL of dichloromethane at 0° C. After stirring for 15 min, the reaction mixture was allowed to warm to room temperature over 2 hours before 5 mL of sat. $Na_2SO_3$ (aq) was added. The organics were next concentrated by evaporation and the mixture was taken up in 200 mL of pentane, washed three times with 100 mL of water, once with 70 mL of brine, passed through a 3 cm silica gel plug, and dried over $Mg_2SO_4$. The organics were concentrated by evaporation to give a light yellow oil (8.22 g, 97% yield). Anal. Calcd. for $C_{20}H_{41}I$: C, 58.81; H, 10.12. Found: C, 58.70; H, 9.97; $^1$H NMR ($CDCl_3$): 2.60 (d, J=5.0 Hz, 2H), 2.00 (t, J=5.0 Hz, 1H), 1.30-1.20 (b, 32H), 0.89 (t, J=7.5 Hz, 6H); MS (EI): m/z (%) 408.23 (100) [M$^+$].

EXAMPLE 1F

Synthesis of 2-octyldodecylamine (6)

Iodoalkane 5 (5.90 g, 14.5 mmol) and potassium phthalimide (2.94 g, 15.9 mmol) were taken up in 25 mL of DMF and vigorously stirred for 72 hours at 25° C. The reaction mixture was then taken up in 200 mL of pentane, washed four times with 100 mL of water, passed through a 3 cm silica gel plug, and concentrated to give a colorless oil. The oil was next taken up in 150 mL of ethanol, 4 mL of hydrazine hydrate was added, and the mixture was heated at reflux overnight. The resulting precipitate was collected by filtration, dissolved in 100 mL of water, and the solution was made alkaline by the addition of 6 M NaOH (aq). The resulting mixture was then taken up in 200 mL of pentane, washed four times with 100 mL of water, once with 70 mL of brine, and concentrated to give a colorless oil (3.08 g, 72% yield). Anal. Calcd. for $C_{20}H_{43}N$: C, 80.73; H, 14.57. Found: C, 80.78; H, 14.52; $^1H$ NMR ($CDCl_3$): 2.60 (d, J=5.0 Hz, 2H), 2.00 (t, J=5.0 Hz, 1H), 1.30-1.20 (b, 32H), 0.89 (t, J=7.5 Hz, 6H); MS (EI): m/z (%) 297.34 (100) [M+].

EXAMPLE 1G

Synthesis of N-(2-octyldodecyl)-2,2'-bithiophene-3,3'-dicarboximide (7)

A dry 8 mL microwave reaction tube was charged with a micro-stirbar, anhydride (4) (354 mg, 1.50 mmol), 4-(dimethylamino)pyridine (61 mg, 0.50 mmol), and 5 mL of toluene. Next, 2-octyldodecylamine (446 mg, 1.5 mmol) was added dropwise to the suspension over 15 minutes and the reaction was allowed to stir for an additional 15 minutes until no solid remained. The reaction tube was then irradiated with microwaves ($P_{MAX}$=300 W) for 2 hours at a constant temperature of 220° C. This procedure was repeated four more times and the five reaction mixtures were combined in 250 mL of diethyl ether, washed six times with 150 mL of water, one time with 100 mL of brine, and the organics dried over $Mg_2SO_4$. After filtration, the solvent was removed by evaporation to afford a yellow oil (90% pure by $^1H$ NMR) that was purified by column chromatography on silica gel with a mixture of diethyl ether (10%) and hexane (90%) as the eluent. A light yellow oil (1.45 g, 37% yield) was obtained upon concentration of the main fractions.

Anal. Calcd. for $C_{30}H_{45}NO_2S_2$: C, 69.85; H, 8.79. Found: C, 69.79; H, 8.71; $^1H$ NMR ($CDCl_3$): 7.76 (d, J=5.5 Hz, 2H), 7.24 (d, J=5.5 Hz, 2H), 4.20 (t, J=7.5 Hz, 2H), 1.71 (m, 1H), 1.37 (m, 4H), 1.26 (b, 28H), 0.89 (t, J=7.0 Hz, 6H); MS (EI): m/z (%) 515.29 (100) [M+]. The same procedure was followed for the synthesis of compounds 8-12 as described below.

EXAMPLE 1H

Synthesis of N-hexyl-2,2'-bithiophene-3,3'-dicarboximide (8)

A light yellow solid (1.65 g, 69% yield) was obtained upon concentration of the main fractions. Anal. Calcd. for $C_{16}H_{17}NO_2S_2$: C, 60.16; H, 5.36. Found: C, 60.05; H, 5.41; $^1H$ NMR ($CDCl_3$): 7.76 (d, J=4.5 Hz, 2H), 7.24 (d, J=5.5 Hz, 2H), 4.20 (t, J=7.5 Hz, 2H), 1.71 (m, J=8.0 Hz, 2H), 1.40 (m, 2H), 1.34 (m, 4H), 0.90 (t, J=7.5 Hz, 3H); m.p. 90-91° C.; MS (EI): m/z (%) 319.4 (100) [M+].

EXAMPLE 1I

Synthesis of N-octyl-2,2'-bithiophene-3,3'-dicarboximide (9)

A light yellow solid (1.87 g, 72% yield) was obtained upon concentration of the main fractions. Anal. Calcd. for $C_{18}H_{21}NO_2S_2$: C, 62.21; H, 6.09. Found: C, 62.18; H, 3.90; $^1H$ NMR ($CDCl_3$): 7.76 (d, J=4.5 Hz, 2H), 7.24 (d, J=5.5 Hz, 2H), 4.20 (t, J=7.5 Hz, 2H), 1.71 (m, J=8.0 Hz, 2H), 1.40 (m, 2H), 1.36-1.28 (b, 10H), 0.89 (t, J=7.5 Hz, 3H); m.p. 71-72° C.; MS (EI): m/z (%) 346.9 (100) [M+].

EXAMPLE 1J

Synthesis of N-dodecyl-2,2'-bithiophene-3,3'-dicarboximide (10)

A light yellow solid (1.79 g, 59% yield) was obtained upon concentration of the main fractions. Anal. Calcd. for $C_{22}H_{29}NO_2S_2$: C, 65.47; H, 7.24. Found: C, 65.31; H, 7.41; $^1H$ NMR ($CDCl_3$): 7.76 (d, J=5.5 Hz, 2H), 7.24 (d, J=5.5 Hz, 2H), 4.24 (m, 2H), 1.69 (m, 2H), 1.56 (m, 4H), 1.37 (m, 2H), 1.26 (b, 2H), 1.17 (m, 2H), 1.00 (d, J=6.5 Hz, 3H), 0.87 (d, J=6.5 Hz, 6H); m.p. 60-61° C.; MS (EI): m/z (%) 403.3 (100) [M+].

EXAMPLE 1K

Synthesis of N-(4,8-dimethylnonyl)-2,2'-bithiophene-3,3'-dicarboximide (11)

A light yellow solid (1.78 g, 61% yield) was obtained upon concentration of the main fractions. Anal. Calcd. for $C_{21}H_{27}NO_2S_2$: C, 64.74; H, 6.99. Found: C, 64.68; H, 7.01; $^1H$ NMR ($CDCl_3$): 7.76 (d, J=5.5 Hz, 2H), 7.25 (d, J=5.5 Hz, 2H), 4.20 (t, J=7.5 Hz, 2H), 1.71 (m, 1H), 1.37 (m, 2H), 1.26 (b, 16H), 0.89 (t, J=7.0 Hz, 9H); m.p. 52-54° C.; MS (EI): m/z (%) 389.3 (100) [M+].

EXAMPLE 1L

Synthesis of N-(2-ethylhexyl)-2,2'-bithiophene-3,3'-dicarboximide (M1, 12)

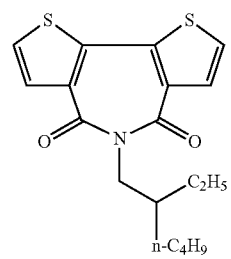

M1

A light yellow solid (1.10 g, 42% yield) was obtained upon concentration of the main fractions. Anal. Calcd. for $C_{19}H_{21}NO_2S_2$: C, 62.21; H, 6.09. Found: C, 62.09; H, 6.02; $^1H$ NMR ($CDCl_3$): 7.69 (d, J=5.5 Hz, 2H), 7.25 (d, J=5.5 Hz, 2H), 4.20 (t, J=7.5 Hz, 2H), 1.80 (m, J=8.0 Hz, 1H), 1.29 (b, 8H), 0.89 (t, J=7.5 Hz, 6H); m.p. 54-56° C.; MS (EI): m/z (%) 347.1 (100) [M+].

EXAMPLE 1M

Synthesis of N-(2-octyldodecyl)-5-5'dibromo-2,2'-bithiophene-3,3'-dicarboximide (13)

Bromine (1.41 g, 8.84 mmol) was added to a solution of imide (7) (1.14 g, 2.21 mmol) in 30 mL of dichloromethane followed by the addition of ferric chloride (7.2 mg, 0.044 mmol). The reaction mixture was allowed to stir in the dark for 6 h before 5 mL of sat. $Na_2SO_3$ (aq) was added and stirring continued for 0.5 hour. The reaction mixture was then poured into 150 mL of dichloromethane, washed three times with 100 mL of water, once with 70 mL of brine, and dried over $Mg_2SO_4$. The organic solution was next filtered and concentrated by evaporation to give a light yellow solid (1.40, 94% yield). Anal. Calcd. for $C_{30}H_{43}Br_2NO_2S_2$: 53.49; H, 6.43. Found: C, 53.36; H, 6.40; $^1$H NMR ($CDCl_3$): 7.68 (s, 2H), 4.18 (d, J=7.5 Hz, 2H), 1.86 (m, 1H), 1.34-1.20 (b, 32H), 0.89 (t, J=7.5 Hz, 6H); m.p. 44-46° C. The same procedure was followed for compounds 14-18 as described below.

EXAMPLE 1N

Synthesis of N-hexyl-5-5'dibromo-2,2'-bithiophene-3,3'-dicarboximide (14)

A light yellow solid (84% yield) was obtained upon concentration. Anal. Calcd. for $C_{16}H_{15}Br_2NO_2S_2$: C, 40.27; H, 3.17. Found: C, 40.30; H, 3.13; $^1$H NMR ($CDCl_3$): 7.72 (s, 2H), 4.16 (t, J=7.0 Hz, 2H), 1.69 (m, J=7.0 Hz, 2H), 1.33-1.27 (b, 6H), 0.89 (t, J=7.5 Hz, 3H); m.p. 149-150° C.; MS (EI): m/z (%) 319.0 (100) [M$^+$].

EXAMPLE 1O

Synthesis of N-octyl-5-5'dibromo-2,2'-bithiophene-3,3'-dicarboximide (15)

A light yellow solid (95% yield) was obtained upon concentration. Anal. Calcd. for $C_{18}H_{19}Br_2NO_2S_2$: C, 42.79; H, 3.79. Found: C, 42.66; H, 3.82; $^1$H NMR ($CDCl_3$): 7.70 (s, 2H), 4.15 (t, J=7.0 Hz, 2H), 1.67 (m, J=7.0 Hz, 2H), 1.35-1.25 (b, 10H), 0.89 (t, J=7.5 Hz, 3H); m.p. 133-135° C.; MS (EI): m/z (%) 347.1 (100) [M$^+$].

EXAMPLE 1P

Synthesis of N-dodecyl-5-5'dibromo-2,2'-bithiophene-3,3'-dicarboximide (16)

A light yellow solid (98% yield) was obtained upon concentration. Anal. Calcd. for $C_{22}H_{27}Br_2NO_2S_2$: C, 47.07; H, 4.85. Found: C, 47.05; H, 4.77; $^1$H NMR ($CDCl_3$): 7.70 (s, 2H), 4.15 (t, J=7.0 Hz, 2H), 1.66 (m, 2H), 1.35-1.27 (b, 18H), 0.89 (t, J=7.0 Hz, 3H); m.p. 117-119° C.; MS (EI): m/z (%) 403.3 (100) [M$^+$].

EXAMPLE 1Q

Synthesis of N-(4,8-dimethylnonyl)-5-5'dibromo-2,2'-bithiophene-3,3'-dicarboximide (17)

A light yellow solid (92% yield) was obtained upon concentration. Anal. Calcd. for $C_{21}H_{25}Br_2NO_2S_2$: C, 46.08; H, 4.60. Found: C, 45.99; H, 4.65; $^1$H NMR ($CDCl_3$): 7.71 (s, J=5.5 Hz, 2H), 4.15 (t, J=7.5 Hz, 2H), 1.73 (m, 1H), 1.34 (m, 2H), 1.29 (b, 16H), 0.89 (t, J=7.0 Hz, 9H); m.p. 127-130° C.; MS (EI): m/z (%) 389.0 (100) [M$^+$].

EXAMPLE 1R

Synthesis of N-(2-ethylhexyl)-5-5'dibromo-2,2'-bithiophene-3,3'-dicarboximide (18)

A light yellow solid (95% yield) was obtained upon concentration. Anal. Calcd. for $C_{19}H_{19}Br_2NO_2S_2$: C, 42.79; H, 3.79. Found: C, 42.57; H, 3.84; $^1$H NMR ($CDCl_3$): 7.69 (s, 2H), 4.19 (d, J=7.0 Hz, 2H), 1.90 (m, 1H), 1.36-1.22 (b, 8H), 0.89 (m, 6H); m.p. 154-147° C.; MS (EI): m/z (%) 347.1 (100) [M$^+$].

EXAMPLE 1S

Synthesis of poly(N-(2-octyldodecyl)-2,2'-bithiophene-3,3'-dicarboximide) (P1)

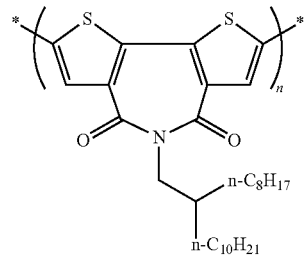

A solution of imide (13) (1.21 g, 1.80 mmol) in 70 mL of DMF was added to a solution of bis(1,5-cyclooctadiene)nickel(0) (0.594 g, 2.16 mmol), 1,5-cyclooctadiene (0.195 g, 1.80 mmol), and 2,2'-bipyridine (0.337 g, 2.16 mmol) which had been stirring for 20 minutes in 10 mL of DMF. The reaction mixture was then heated at 60° C. for 48 hours before bromobenzene (2.83 g, 18.0 mmol) was added and the reaction mixture was allowed to stir for an additional 12 hours. The mixture was then allowed to cool to room temperature, poured into 200 mL of methanol containing 20 mL of 12 M HCl (aq), and stirred for 6 hours. The precipitate was collected by filtration, and dried overnight in vacuo at 120° C. to give 0.970 g of a solid. The crude product was next dissolved in 40 mL of toluene, filtered through a 0.45 μm filter, precipitated with 400 mL of methanol, collected by filtration, and dried as before to give 0.912 g of a dark red powder. This precipitation procedure was repeated four more times to give 0.821 g of a dark red powder which was placed in a microscale Soxhlet extractor and extracted for 48 hours with methanol, 24 hours with pentane, and recovered by extraction with dichloromethane. The dichloromethane solution was filtered through a 0.22 μm filter and the polymer precipitated with 300 mL of methanol to give P1 as a red powder (0.634 g) after drying in vacuo at 120° C. Anal. Calcd. for $C_{30}H_{43}NO_2S_2$: C, 70.13; H, 8.44; N, 2.73. Found: C, 69.94; H, 8.69; N, 2.89; $^1$H NMR ($CDCl_3$): 7.71 (b, 2H), 4.25 (b, 2H), 1.88 (b, 1H), 1.4-1.2 (b, 32H), 0.89 (t, J=7.5 Hz, 6H); GPC (150° C., TCB, vs. PS): $M_w$=7.9×10$^3$; PDI=2.2.

EXAMPLE 1T

Synthesis of poly(N-(2-octyldodecyl)-2,2':5',2":5", 2'''-quaterthiophene-3,3'-dicarboximide) (P2)

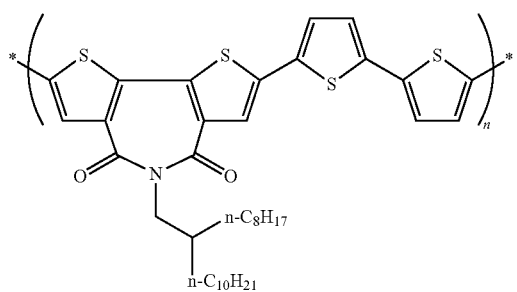

Imide (13) (0.674 g, 1.00 mmol), 2,5'-bis(tributylstannyl)-2,2'-bithiophene (0.744 g, 1.00 mmol), and Pd(PPh$_3$)$_4$ (0.045 g, 0.050 mmol) in anhydrous DMF (20 mL) were heated at 90° C. under nitrogen for 24 hours. The reaction mixture was then allowed to cool to room temperature, poured into 300 mL of methanol, and the precipitate was collected by filtration to give 0.621 g of a black solid. The crude material was placed in a microscale Soxhlet extractor and extracted for 48 hours with methanol, 24 hours with pentane, and recovered by extraction with chlorobenzene. The chlorobenzene solution was passed through a 0.22 μm filter and the polymer was precipitated with 200 mL of methanol to give P2 as a purple solid (0.107 g, 16% yield) after drying in vacuo at 120° C. Anal. Calcd. for (C$_{38}$H$_{47}$NO$_2$S$_4$)$_n$: C, 67.31; H, 6.99; N, 2.07. Found: C, 67.04; H, 7.11; N, 1.99; $^1$H NMR (C$_2$D$_4$Cl$_4$): 8.09 (b, 2H), 7.20 (b, 4H), 4.32 (b, 2H), 2.05 (b, 1H), 1.35 (b, 32H), 0.96 (b, 6H); GPC (150° C., TCB, vs. PS): $M_w$=2.5×10$^3$; PDI=1.38.

EXAMPLE 1U

Synthesis of N-hexyl-2,2':5',2":5",2'''-quaterthiophene-4',3"-dicarboximide (19)

A dry 8 mL microwave reaction tube was charged with a micro-stirbar, imide (14) (0.416 g, 0.871 mmol), 2-(tributylstannyl)thiophene (0.650 g. 1.74 mmol), Pd(PPh$_3$)$_4$ (0.041 g, 0.045 mmol), and DMF (6 mL) before being irradiated with microwaves (P$_{MAX}$=300 W) for 5 minutes at a constant temperature of 120° C. Upon cooling, an orange precipitate was collected by filtration, washed with methanol (10 mL), and dried in vacuo at 120° C. The solid was purified by column chromatography on silica gel with a mixture of diethyl ether (30%) and hexane (70%) as the eluent. Orange needle-like crystals (0.153 g) were obtained upon concentration of the main fractions. The crystals were further purified by sublimation under vacuum to give orange needle-like crystals (0.111 g, 26% yield) suitable for single crystal diffraction. Anal. Calcd. for (C$_{24}$H$_{21}$NO$_2$S$_4$)$_n$: C, 59.60; H, 4.38. Found: C, 59.53; H, 4.34; $^1$H NMR (CDCl$_3$): 7.81 (s, 2H), 7.34 (d, 4.5 Hz, 2H), 7.26 (d, 4.0 Hz, 2H), 4.21 (t, J=8.0 Hz, 2H), 1.72 (m, 2H), 1.43 (m, 2H), 1.36 (b, 6H), 0.91 (t, J=7.0 Hz, 3H); m.p. 190-193° C.; MS (EI): m/z (%) 483.1 (100) [M$^+$].

EXAMPLE 1V

Synthesis of N-(2-ethylhexyl)-2,2':5',2":5",2'''-quaterthiophene-4',3"-dicarboximide (M2)

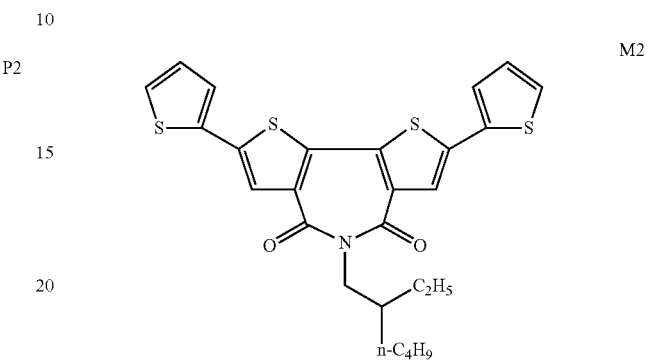

A dry 8 mL microwave reaction tube was charged with a micro-stirbar, imide (18) (0.445 g, 0.871 mmol), 2-(tributylstannyl)thiophene (0.650 g. 1.74 mmol), Pd(PPh$_3$)$_4$ (0.041 g, 0.045 mmol), and DMF (6 mL) before being irradiated with microwaves (P$_{MAX}$=300 W) for 5 minutes at a constant temperature of 120° C. Upon cooling an orange precipitate was collected by filtration, washed with methanol (10 mL), and dried in vacuo at 120° C. The solid was purified by column chromatography on silica gel with a mixture of diethyl ether (30%) and hexane (70%) as the eluent to yield 0.153 g of an orange needle-like crystal upon concentration of the main fractions. The crystals were further purified by sublimation under vacuum to give orange needle-like crystals (0.136 g, 22% yield). Anal. Calcd. for C$_{26}$H$_{25}$NO$_2$S$_4$: C, 61.02; H, 4.92. Found: C, 60.89; H, 4.78; $^1$H NMR (CDCl$_3$): 7.82 (s, 2H), 7.35 (d, 4.5 Hz, 2H), 7.26 (b, 2H), 4.27 (m, 2H), 1.87 (m, 1H), 1.38-1.26 (m, 8H), 0.92 (m, 6H); m.p. 181-184° C.; MS (EI): m/z (%) 511.2 (100) [M$^+$].

EXAMPLE 2

Synthesis of Additional Monomers and Polymers

EXAMPLE 2a

Preparation of 5,5'-(bistrimethylstannyl)-2,2'-dithiazole

A solution of n-BuLi in hexane (2.5 M, 1.0 mL, 2.5 mmol) was added dropwise to a mixture of 5,5'-dibromo-2,2'-dithiazole (350.3 mg, 1.07 mmol) in THF (8 mL) at −78° C. under nitrogen. After stirring at this temperature for 2 hours, a solution of Me$_3$SnCl (0.5 g, 2.51 mmol) in THF (5 mL) was added slowly. This resulting mixture was stirred at −78° C. for 1 hour, and then allowed to warm to room temperature and stirred overnight. The reaction was quenched by an addition of water (20 mL), and the reaction mixture was extracted with ethyl ether. The organic layer was separated, washed with water, dried over Na$_2$SO$_4$, and concentrated using a rotary evaporator. The residue was recrystalllized from hexane, leading to colorless crystals (484 mg, 91.2% yield). $^1$H NMR (CDCl$_3$, 500 MHz): δ: 7.81 (s, 2H), 0.46 (s, 18H).

EXAMPLE 2b

Preparation of 5,5'-(bistrimethylstannyl)-3,3'-dimethoxy-2,2'-dithiophene

To a solution of of 3,3'-dimethoxy-2,2'-bithiophene (0.50 g, 2.21 mmol) in 10 mL of THF was added a solution of n-BuLi (2.5 M in hexanes, 1.94 mL, 4.86 mmol) dropwise at −78° C. The mixture was stirred at −78° C. for 45 minutes, then at ambient temperature for 1 hour. The mixture was cooled to −78° C. and treated with a solution of Me$_3$SnCl in 3 mL of THF. The mixture was stirred at ambient temperature for 90 minutes then diluted with 50 mL of ethyl acetate. The solution was washed successively with water (2×20 mL) and brine (20 mL). The organic layer was separated, dried over MgSO$_4$, filtered, and concentrated in vacuo. The resulting oily solid was dissolved in 100 mL of boiling hexanes and cooled slowly to room temperature. The suspension was filtered and the filter cake was washed with hexanes (2×10 mL) and dried in vacuo to give 0.90 g (74% yield) of the distannane as thin, off-white plates. $^1$H NMR (CDCl$_3$): 6.91 (s, 2H), 3.97 (s, 6H), 0.37 (s, 18H). mp 207-208° C.

EXAMPLE 2c

Preparation of 2,1,3-benzothiadiazole-4,7-bis(boronic acid pinacol ester)

A mixture of 4,7-dibromo-2,1,3-benzothiadiazole (1.0 g, 3.4 mmol), bis(pinacolato)diboron (2.0 g, 7.9 mmol), PdCl$_2$(dppf).CH$_2$Cl$_2$ (0.5 g, 0.6 mmol), and potassium acetate (2.0 g, 20.4 mmol) in degassed 1,4-dioxane (10 mL) was stirred at 80° C. under nitrogen for 21 hours. After cooling to room temperature, the reaction mixture was quenched by an addition of water (9 mL), and the resulting mixture was extracted with ethyl acetate (30 mL×3). The organic layers were combined, washed with brine, and dried over anhydrous Na$_2$SO$_4$. The solvent was removed in vacuo and the solid residue was purified by a column chromatography on silica gel with ethyl acetate:hexane (1:9, slowly up to 3:9), affording a slightly yellow solid as the product (0.92 g, 70% yield). Further purification involved recrystallization from hexane.

EXAMPLE 2d

Preparation of poly{[N-(2-octyldodecyl)-2,2'-bithiophene-3,3'-dicarboximide-5,5'diyl]poly{[N,N'-bis(2-octyldodecyl)-1,4,5,8-naphthalene diimide-2,6-diyl]-alt-vinylene)} (P3)

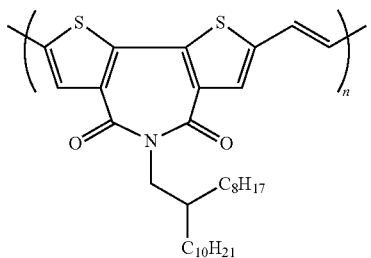

P3

Imide (13) (0.674 g, 1.00 mmol), trans-bis(tri-n-butylstannyl)-ethylene (605.7 mg, 1.00 mmol), and Pd(PPh$_3$)$_4$ (0.045 g, 0.050 mmol) in anhydrous DMF (20 mL) were heated at 90° C. under nitrogen for 36 hours. The reaction mixture was then allowed to cool to room temperature, poured into 300 mL of methanol, and the precipitate was collected by filtration to give 0.384 g of a black solid. The crude material was placed in a microscale Soxhlet extractor and extracted for 48 hours with methanol, 24 hours with hexane, and recovered by extraction with chlorobenzene. The chlorobenzene solution was passed through a 0.22 μm filter and the polymer was precipitated with 300 mL of methanol to give the polymer as a red-purple solid (0.095 g, 17% yield) after drying in vacuo at 120° C. Anal. Calcd. for (C$_{32}$H$_{45}$NO$_2$S$_2$)$_n$: C, 71.20; H, 8.40; N, 2.59. Found: C, 70.95; H, 8.56; N, 2.59; $^1$H NMR (C$_2$D$_4$Cl$_4$): 8.09 (b, 2H), 7.15-7.30 (m, br, 2H), 4.32 (b, 2H), 2.05 (b, 1H), 1.35 (b, 32H), 0.96 (b, 6H); GPC (150° C., TCB vs. PS): M$_w$=7.2×10$^3$; PDI=1.98.

EXAMPLE 2e

Preparation of poly{[N-(2-octyldodecyl)-2,2'-bithiophene-3,3'-dicarboximide-5,5'diyl]poly{[N,N'-bis(2-octyldodecyl)-1,4,5,8-naphthalene diimide-2,6-diyl]-alt-4,7-(2,1,3-benzothiadiazole)} (P4)

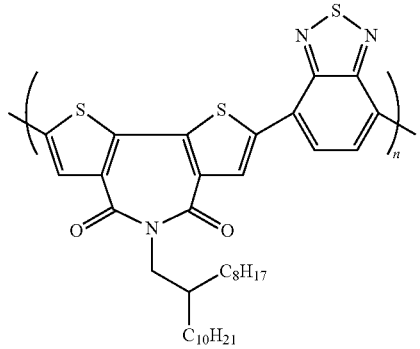

P4

Imide (13) (0.059 g, 0.088 mmol), 4,7-bis(4,4,5,5-tetramethyl-1,3,2-dioxaborolan-2-yl)-2,1,3-benzothiadiazole (34.1 mg, 0.088 mmol), potassium carbonate (97 mg, 0.702 mmol), and Pd(PPh$_3$)$_4$ (2.0 mg, 0.002 mmol) in anhydrous toluene (4 mL) and anhydrous DMF (2 mL) was stirred at 90° C. for 68 hours. The reaction mixture was then allowed to cool to room temperature, poured into 15 mL of methanol, and the precipitate was collected by filtration to give a dark solid. The crude material was washed with H$_2$O several times and then placed in a microscale Soxhlet extractor and extracted for 48 hours with methanol, 24 hours with acetone, and finally 24 hours with hexane to afford an insoluble polymer. Anal. Calcd. for (C$_{32}$H$_{45}$NO$_2$S$_2$)$_n$: C, 66.73; H, 7.00; N, 6.49. Found: C, 63.88.95; H, 6.45; N, 5.93.

EXAMPLE 2f

Preparation of poly{[N-(2-octyldodecyl)-2,2'-bithiophene-3,3'-dicarboximide-5,5'diyl]poly{[N,N'-bis(2-octyldodecyl)-1,4,5,8-naphthalene diimide-2,6-diyl]-alt-5,5'-(3,3'-dimethoxy-2,2'-dithiophene))} (P5)

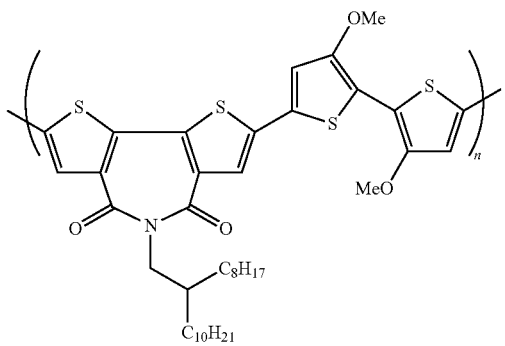

P5

Imide (13) (0.063 g, 0.093 mmol), 5,5'-bis(trimethylstannyl)-3,3'-dimethoxy-2,2'-bithiophene (51.5 mg, 0.093 mmol), and Pd(PPh$_3$)$_4$ (5 mg) in anhydrous toluene (3 mL) were heated at 90° C. under nitrogen for 36 hours. The reaction mixture was then allowed to cool to room temperature, poured into 15 mL of methanol, and the precipitate was collected by filtration to give 48 mg of a blue solid. The crude material was placed in a microscale Soxhlet extractor and extracted for 48 hours with methanol, 24 hours with hexane, 24 hours with acetone, and recovered by extraction with hot chlorobenzene. The warm chlorobenzene solution was passed through a 0.22 μm filter and the polymer was precipitated with 10 mL of methanol to give the polymer as a blue solid (34 mg, 54% yield) after drying in vacuo at 120° C. Anal. Calcd. for (C$_{38}$H$_{47}$NO$_2$S$_4$)$_n$: C, 67.31; H, 6.99; N, 2.07. Found: C, 68.06.95; H, 6.77; N, 1.85; $^1$H NMR (C$_2$D$_4$Cl$_4$): 8.09 (b, 2H), 6.90-7.20 (m, br, 2H), 3.75-4.40 (b, 8H), 2.05 (b, 1H), 1.35 (b, 32H), 0.96 (b, 6H); GPC (150° C., TCB vs. PS): M$_w$=6×10$^3$; PDI=2.6.

EXAMPLE 2g

Preparation of poly{[N-(2-octyldodecyl)-2,2'-bithiophene-3,3'-dicarboximide-5,5'diyl]poly{[N,N'-bis(2-octyldodecyl)-1,4,5,8-naphthalene diimide-2,6-diyl]-alt-5,5'-(2,2'-bithiazole)} (P6)

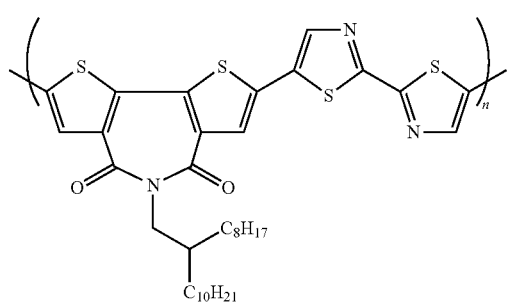

P6

Imide (13) (0.126 g, 0.186 mmol), 5,5'-bis(trimethylstannyl)-2,2'-bithiazole (91 mg, 0.186 mmol), and Pd(PPh$_3$)$_2$Cl$_2$ (10 mg) in anhydrous toluene (6 mL) were heated at 90° C. under nitrogen for 36 hours. The reaction mixture was then allowed to cool to room temperature, poured into 30 mL of methanol, and the precipitate was collected by filtration to give 76 mg of a brown solid. The crude material was placed in a microscale Soxhlet extractor and extracted for 48 hours with methanol, 24 hours with hexane, 24 hours with acetone, and recovered by extraction with hot chlorobenzene. The warm chlorobenzene solution was passed through a 0.22 μm filter and the polymer was precipitated with 10 mL of methanol to give the polymer as a nice solid (58 mg) after drying in vacuo at 120° C. Anal. Calcd. for (C$_{36}$H$_{45}$N$_3$O$_2$S$_4$)$_n$: C, 63.58; H, 6.67; N, 6.18. Found: C, 63.03; H, 6.12; N, 5.85; $^1$H NMR (C$_2$D$_4$Cl$_4$): 8.09 (b, 2H), 7.61-7.45 (m, br, 2H), 3.76-4.30 (b, 8H), 2.05 (b, 1H), 1.34 (b, 32H), 0.97 (b, 6H); GPC (RT, CHCl$_3$, vs. PS): M$_w$=6×10$^3$; PDI=2.6.

EXAMPLE 3

Characterization of Polymers

EXAMPLE 3A

Polymer Molecular Weight Determination

Gel permeation chromatography (GPC) measurements were performed on a Polymer Laboratories PL-GPC 220 instrument using 1,2,4-trichlorobenzene as the solvent (stabilized with 125 ppm BHT) at 150° C. A set of three PL-Gel® 10 μm mixed columns was used. Samples were prepared at 160° C.

Molecular weights of certain embodiments of the present teachings were determined by GPC using narrow polystyrene standards and are not corrected. P1 was found to have M$_w$=7900 D and PDI=2.2, and P2 to have M$_w$=2500 D and PDI=1.4. These data suggest a mean chain length of ~15 monomer units (~30 thiophene rings) for polymer P1 and ~4 monomer units (~16 thiophene rings) for polymer P2. P3 was found to have M$_w$=7200 D and PDI=2.0, P5 was found to have M$_w$=6000 D and PDI=2.6, and P6 was found to have M$_w$=6000 D and PDI=2.6.

EXAMPLE 3B

Thermal Characterization

Polymers were dried under vacuum for 3 days at 120° C. before thermal analysis. Thermogravimetric analysis (TGA) was performed on a TA instruments Q50 at a ramp rate of 5° C./min under nitrogen at atmospheric pressure in an aluminum oxide crucible. Differential scanning calorimetry (DSC) was performed using a Mettler Toledo DSC823e instrument at a ramp rate of 10° C./min using aluminum pans under nitrogen.

TGA was used to evaluate the thermal stability of purified polymers P1 and P2. A mass loss of 5% is defined as the threshold for thermal decomposition. Both materials demonstrate good thermal stability with the onset of decomposition at 401° C. for P1 and 424° C. for P2.

DSC was used to characterize the thermal transitions in the polymers. Homopolymer P1 exhibits a glass transition-like feature at 201° C. and a broad endothermic transition at 295° C. on the forward sweep of the first DSC cycle. Because no thermal transitions were observed on the reverse sweep or in any of the subsequent cycles, these features indicate irreversible P1 relaxation phenomena. Copolymer P2 underwent two reversible endothermic transitions at 127° C. and 196° C. Both of these transitions were reversible with exotherms at 197° C. and 120° C. in the reverse sweeps over four cycles.

EXAMPLE 3C

Optical Characterization

UV-visible spectra were recorded on a Cary Model 1 UV-visible spectrophotometer. Optical spectroscopic data obtained from solution and thin-film UV-visible absorption spectra of the present monomers and the corresponding polymers are summarized in Table 1. In chlorobenzene solution, molecules M1 and M2 exhibit absorption maxima at 348 nm and 432 nm, respectively, with a shoulder on the red side of the band ~20 nm from the peak maximum. Thin films of M1 exhibit a maximum absorption at 351 nm and a shoulder at 371 nm (similar to that in solution), while thin films of M2 have a maximum at 455 nm and shoulders at 428 nm and 489 nm. UV-vis spectra in solution were recorded in dichlorobenzene, chlorobenzene, $CHCl_3$, THF, dioxane, xylene, or toluene in a temperature range between 25° C. and 110° C. For instance, homopolymer P1 exhibits an absorption maximum at 535 nm in chlorobenzene with shoulders at 503 nm and 578 nm at room temperatuer. The thin-film spectrum of The other polymers have absorptions between 350 nm and 900 nm depending on the solvent and concentration.

TABLE 1

Summary of optical absorption data for monomers M1, M2, P1, P2, P3, P4, P5, and P6.

| Compound | $\lambda_{max}$ (nm) | $E_{gap}{}^a$ (eV) | HOMO$^b$ (eV) | LUMO$^c$ (eV) |
|---|---|---|---|---|
| M1 | 348, 367 | 3.2 | $-6.43^d$ | $-3.23$ |
| M2 | 432, 454 | 2.5 | $-5.94$ | $-3.11$ |
| P1 | 503, 535, 578 | 2.0 | $-6.28$ | $-3.47$ |
| P2 | 366, 517, 553, 607 | 1.9 | $-5.88$ | $-3.04$ |
| P3 | 315, 507 | 2.4 | | |
| P4 | 357, 423 | 2.7 | | |
| P5 | 437, 715, 902 | 1.3 | | |
| P6 | 340, 513 | 2.2 | | |

$^a$Optical band gap calculated from the red edge of the $S_0$-$S_1$ absorbtion band at 1/10 of the maximum intensity.
$^b$HOMO energy estimated by subtracting the optical gap from LUMO energy.
$^c$Estimated from the onset of the first reduction using the correction factor −4.4 V to convert SCE reference to vacuum (Agrwal, A.K. et al., Chem. Mater. 8:579-589 (1996)).
$^d$Corrected with the HOMO/LUMO energies of sexithiophene estimated from solution electrochemistry (Facchetti, A. et al., Abstr. Pap. Am. Chem. Soc., 227: U448-U448 (2004)).

EXAMPLE 3D

Thin-Film Characterization

Thin films were analyzed by wide-angle X-ray film diffractometry (WAXRD) on a Rikagu ATX-G instrument using standard θ-2θ techniques, with Cu K$α_1$ radiation. Atomic force microscopy was performed on a Jeol 5200 SPM instrument. Scanning electron microscopy was performed on a Hitachi 4800 SEM with samples having a 2 nm Au/Pd sputtered film.

Thin-film wide angle X-ray diffraction (XRD) θ-2θ scans of homopolymer P1 and copolymer P2 were performed to investigate the degree of film crystallinity and the polymer chain orientation with respect to the substrate surface. Films were cast on the same substrates (p$^{++}$-Si/300 nm $SiO_2$, untreated or HMDS treated) used to fabricate TFTs (vide infra) then dried, and then annealed between 120° C. and 300° C. as specified. P1 films exhibit several strong Bragg reflections on the HMDS treated substrates, while less intense reflections are observed from films on the untreated substrates. XRD intensities increase and higher-order peaks are observed in all films when the annealing time and/or the temperature is increased. In all films of the homopolymer, a single family of Bragg peaks is observed corresponding to a d-spacing of 25.1±0.6 Å with up to $5^{th}$ order reflections observed from films on hydrophobic substrates. This d-spacing corresponds to P1 chains angled at ~69.0° relative to the substrate plane if the chains are not interdigitated from one layer to the next. Laue oscillations are observed at low angles for films cast from TCB.

Films of copolymer P2 also exhibit strong Bragg reflections. Copolymer films on untreated $SiO_2$ substrates exhibit broad first- and second-order reflections with the intensities increasing with annealing temperature. Films on HMDS treated substrates exhibit more intense diffraction features, having narrower peaks and reflections up to third-order for films annealed at higher temperatures. The Bragg reflections observed in all films indicate highly crystalline films with a d spacing of 21.7±0.1 Å along the substrate normal. This d-spacing corresponds to the polymer chains angled at ~53.5° relative to the substrate plane if the chains are not interdigitated from one layer to the next. The estimated tilt angle relative to the plane will be less if the chains are interdigitated between layers.

Scanning electron microscopy (SEM) and tapping-mode atomic force microscopy (AFM) were employed to evaluate the polymer film continuity, surface morphology, and roughness. Films of P1 cast from all solvents on HMDS treated substrates are continuous with the roughness and surface morphology being highly dependent on the casting solvent. Casting from TCB solutions yields films with 2.6 nm rms roughness (after drying at 120° C.). Additional annealing results in a slightly decreased 1.8 nm rms roughness and the appearance of terracing in the polymer films with a step height of 2.5 nm as determined from AFM height histograms. Films cast from chloroform solutions contain large circular holes in otherwise featureless films after drying (17 nm rms roughness). The holes disappear with annealing and SEM and AFM images reveal smooth, continuous, polycrystalline films with rms roughness increasing with annealing temperature from 1.8 nm at 240° C. to 4.4 nm at 300° C. Films cast from THF exhibit the greatest rms roughnesses (29 nm) with irregularly-shaped solvent pockets in samples dried at 120° C. that decrease in size with annealing to yield a highly textured film when annealed at 240° C. for 2 hours or 300° C. for 30 minutes. All homopolymer films cast on untreated $SiO_2$ substrates are featureless without evidence of solvent bubbles or crystallization.

Films of P2 were spin-cast from DCB solutions at 0° C. and evidence continuous surface coverage upon drying. Those cast on untreated $SiO_2$ surfaces have an initial rms roughness of 1.2 nm which decreases with annealing to 1.0 nm. Films cast onto HMDS treated substrates exhibit a greater initial rms roughness of 4.0 nm, which increases with annealing to 5.8 nm (180° C.) and 8.4 nm (240° C.). This increase in roughness corresponds to melting of the polymer followed by dewetting from the hydrophobic surface as evidenced by large gaps appearing in the film when annealed at 180° C. Only islands of polymer are present once the sample is annealed at 240° C. Cross-polarized hot-stage optical microscopy of P2 films cast on untreated glass reveal a crystalline phase at temperatures below a liquid crystalline transition at 127° C., the liquid crystalline phase, and finally the melting transition of the P2 film at 196° C.

EXAMPLE 3E

Electrochemistry

Cyclic voltammetry measurements were performed with a 0.1 M tetrabutylammonium hexafluorophosphate electrolyte in dry acetonitrile, THF, or DME for polymer films and in THF for molecules in solution. Platinum electrodes were used as both working and counter electrodes, and an Ag wire was used as the pseudo-reference electrode. A ferrocene/ferrocenium redox couple was used as an internal standard and potentials obtained in reference to the silver electrode were converted to the saturated calomel electrode (SCE) scale. Thin films of the polymers were coated onto the Pt working electrode by drop casting from ~0.1 wt % THF or 1,2-dichlorobenzene solutions and dried under vacuum at 80° C. for 2 hours.

The redox behavior of M1, M2, P1, P2, P3, P4, P5, and P6 was investigated using cyclic voltammetry (Table 2). All potentials are reported vs. SCE with the ferrocene/ferrocenium couple used as an internal standard. M1 exhibits the onset of reduction at −1.17 V with a reversible reduction wave at −1.65 V. A significant oxidation wave is not observed for this material. Thiophene-substituted molecule M2 shows the onset of reduction at −1.29 V with a reversible reduction wave at −1.65 V. The onset of oxidation is found to be at 1.39 V with two partially reversible events at 1.54 V and 1.77 V. Homopolymer P1 films on Pt exhibit multiple reversible reduction waves with onset at −0.93 V and half-wave potentials of −1.11 V and −1.32 V. Oxidation of the homopolymer occurs with an onset of 1.42 V with two irreversible events at 1.88 V and 1.97 V. Copolymer P2 thin-films exhibit two reversible reduction events with onset at −1.36 V and half-wave potentials at −1.34 V and −1.54V. Oxidation of the homopolymer thin-films occurs with an onset at 1.19 V and three irreversible oxidations with half-wave potentials at 1.39 V, 1.48 V, and 1.92 V. The electrochemical behaviour of the other polymers is similar, with irreversable oxidation waves and reversible reductions.

TABLE 2

Anodic ($E_a$), cathodic ($E_c$), and half-wave ($E^{1/2}$) potentials (V vs SCE) from cyclic voltammetry of M1, M2, P1, P2, P3, P4, P5, and P6.

| compound | Oxidation[a] | | | Reduction | |
| --- | --- | --- | --- | --- | --- |
| | $E_{c1}$ | $E_{c2}$ | $E_{c3}$ | $E_1^{1/2}$ | $E_2^{1/2}$ |
| M1[b] | | | | −1.65 | |
| M2[b] | 1.54 | 1.77 | | −1.38 | |
| P1[c] | 1.71 | 1.88 | 1.97 | −1.11 | −1.32 |
| P2[c] | 1.48 | 1.67 | 2.00 | −1.34 | −1.54 |
| P3[c] | 1.67 | | | −1.05 | −1.37 |
| P4[c] | 1.52 | 1.73 | | −1.30 | −1.65 |
| P5[c] | 1.22 | 1.57 | | −1.37 | −1.65 |
| P6[c] | 1.73 | | | −1.23 | −1.51 |

[a]Oxidation cathodic events are irreversible.
[b]Electrochemistry performed in THF solution.
[c]Electrochemistry performed on films on Pt electrode using $CH_3CN$, THF, or DME as electrolyte solvent.

EXAMPLE 4

Device Fabrication and Measurement

Prime grade p-doped silicon wafers (100) having 300 nm thermally grown oxide (Process Specialties Inc.) were used as device substrates. These were sonicated in methanol, acetone, propanol, and oxygen plasma cleaned before film deposition. Trimethylsilyl functionalization of the $SiO_2$ surface was carried out by exposing the cleaned silicon wafers to hexamethyldisilazane (HMDS) vapor under nitrogen at room temperature for 4 days. Films of P1 were spin-coated from 0.5% (w/v) THF, $CHCl_3$, or 1,2,4-trichlorobenzene solutions and films of P2 were spin-coated from 0.5% (w/v) 1,2-dichlorobenzene solutions at 50° C. All films were dried at 120° C. in vacuo for 12 hours and, if annealed, heated under nitrogen at various temperatures from 180° C. to 300° C. for 30 minutes or 2 hours, as specified. Spin-coated polymer films were 20-37 nm-thick as determined by profilometry. For FET device fabrication, top-contact gold electrodes (500 Å) were deposited by thermal evaporation through a shadow mask to define channels with dimensions of 100 μm (L) by 2.00 mm (W). The capacitance of the 300 nm $SiO_2$ insulator is $1×10^{-8}$ F/cm$^2$ and mobilities were calculated in the saturation regime. TFT device measurements were carried out at 21° C.-23° C. in a customized high-vacuum probe station ($1×10^{-6}$ Ton) or in air. Coaxial and/or triaxial shielding was incorporated into Signaton probes to minimize noise levels. TFT characterization was performed with a Keithley 6430 sub-femtoampmeter (drain) and a Keithley 2400 (gate) source meter, operated by a locally written Labview program and GPIB communication.

Thin film transistors were fabricated with spin-cast and drop-cast films of polymers P1, P2, P3, P4, P5, and P6 as the semiconducting component. FETs fabricated with these materials were initially evaluated under vacuum. Homopolymer P1 exhibits exclusively n-type transport in this geometry, while copolymer P2 exhibits only p-type behavior under vacuum (FIG. 3). When the devices were measured under air, the homopolymer did not exhibit FET activity and the copolymer accumulation regime p-channel FET behavior was unchanged. Semiconductors cast onto HMDS treated substrates exhibit superior performance, while those on untreated $SiO_2$ substrates exhibit diminished performance in the case of P2 or negligible FET activity in the case of P1. Polymer P3 exhibits n-type transport whereas polymer P5 exhibits exclusively p-channel activity. Polymer P4 is insufficiently soluble for device fabrication using current procedures and awaits optimization. Polymer P6 exhibits week ambipolarity.

For P1 and P2, their polymer film microstructure was adjusted to optimize device performance by casting from various solvents ($CHCl_3$, THF, TCB or DCB), employing different substrate functionalizations and thermal annealing protocols to enhance crystallinity Annealing temperatures were optimized from the thermal transitions observed in the DSC. Homopolymer P1 was spin-cast from $CHCl_3$, THF, and TCB onto both HMDS treated and untreated substrates. Films cast on the hydrophilic untreated substrates did not exhibit FET activity, while those cast onto hydrophobic substrates exhibited prototypical n-channel FET behavior (Table 3). Film electron mobilities ($\mu_e$) after the initial drying at 120° C. varied from ~$5×10^{-4}$ cm$^2$V$^{-1}$s$^{-1}$ for films from TCB and THF to $2×10^{-3}$ cm$^2$V$^{-1}$s$^{-1}$ for films from $CHCl_3$. Upon annealing, $\mu_e$ and $I_{on:off}$ increased, with the highest $\mu_e$ of 0.011±0.003 cm$^2$V$^{-1}$s$^{-1}$ observed in films cast from $CHCl_3$ and annealed at 240° C. for 2 hours ($I_{on:off}$=$2×10^7$, $V_T$=+75 V). Device performance decreased in all samples when films were annealed at 300° C. Drop-cast films exhibited performance similar to that of spin-cast films with mobilities of 0.003 cm$^2$V$^{-1}$s$^{-1}$ when cast from $CHCl_3$ and annealed at 120° C.

All films of P2 cast on hydrophobic HMDS treated substrates exhibited hole mobilities two orders of magnitude greater than those on untreated hydrophilic $SiO_2$ (Table 4). When samples were annealed at 180° C., the mobility increased on both substrates up to 0.008 cm$^2$V$^{-1}$s$^{-1}$ ($I_{on:off}$=$10^7$, $V_T$=−12 V) for films on HMDS treated substrates. Upon annealing at 240° C. however, the response of devices on hydrophobic substrates decreased significantly.

TABLE 3

FET performance measured under vacuum for homopolymer P1 films spin-cast or drop-cast (DC) from the indicated solvents onto HMDS treated substrates. Standard deviations are given in parentheses.

| Anneal (°C)[a] | Chloroform $\mu_e$ (cm²V⁻¹s⁻¹) | $V_T$ (V) | $I_{on:off}$ | Tetrahydrofuran $\mu_e$ (cm²V⁻¹s⁻¹) | $V_T$ (V) | $I_{on:off}$ | 1,2,4-Trichlorobenzene $\mu_e$ (cm²V⁻¹s⁻¹) | $V_T$ (V) | $I_{on:off}$ |
|---|---|---|---|---|---|---|---|---|---|
| 120 | 1.7 (1) × 10⁻³ | 77 (6) | 4 (4) × 10⁶ | 5 (2) × 10⁻⁴ | 87 (6) | 2 (1) × 10⁶ | 5 (2) × 10⁴ | 90 (11) | 2 (2) × 10⁴ |
| 240 | 7.8 (8) × 10⁻³ | 80 (5) | 4 (1) × 10⁷ | 8 (2) × 10⁻⁴ | 80 (11) | 8 (5) × 10⁶ | 5.8 (2) × 10⁻³ | 88 (8) | 2 (1) × 10⁷ |
| 240 (2 h) | 1.1 (3) × 10⁻² | 75 (4) | 2 (2) × 10⁷ | 6 (1) × 10⁻³ | 71 (3) | 2 (1) × 10⁷ | 7.2 (1) × 10⁻³ | 78 (1) | 2 (1) × 10⁷ |
| 300 | 1.8 (1) × 10⁻⁴ | 95 (2) | 2 (1) × 10³ | 8 (2) × 10⁻⁵ | 90 (1) | 3 (1) × 10⁵ | 1.7 (4) × 10⁻⁵ | 115 (2) | 5 (1) × 10¹ |
| DC | 3.2 (5) × 10⁻³ | 70 (7) | 2 (1) × 10⁷ | | | | 6 (3) × 10⁻⁴ | 60 (32) | 2 (3) × 10⁶ |

[a]Films annealed for 30 minutes unless otherwise noted.

TABLE 4

FET performance values measured under vacuum and under air for copolymer P2 films spin-cast or drop-cast (DC) from 1,2-dichlorobenzene onto either HMDS treated or untreated SiO₂ substrates. Standard deviations are given in parentheses.

| Anneal[a] (°C) | HMDS $\mu_h$ (cm²V⁻¹s⁻¹) | $V_T$(V) | $I_{on:off}$ | SiO₂ $\mu_h$ (cm²V⁻¹s⁻¹) | $V_T$(V) | $I_{on:off}$ |
|---|---|---|---|---|---|---|
| Vacuum | | | | | | |
| 120 | 6 (1) × 10⁻³ | −28 (2) | 9 (8) × 10⁶ | 4 (1) × 10⁻⁶ | −34 (4) | 1 (1) × 10⁴ |
| 180 | 8 (2) × 10⁻³ | −12 (7) | 2 (3) × 10⁷ | 2 (1) × 10⁻⁵ | −11 (1) | 3 (4) × 10⁴ |
| 240 | 3 (2) × 10⁻⁵ | −70 (15) | 7 (3) × 10³ | 9 (1) × 10⁻⁶ | −4 (5) | 5 (3) × 10³ |
| DC | 4 (3) × 10⁻³ | −27 (13) | 6 (5) × 10⁶ | 2 (1) × 10⁻⁵ | −18 (2) | 7 (6) × 10⁴ |
| Air[b] | | | | | | |
| 120 | 4 (1) × 10⁻³ | −40 (6) | 1 (1) × 10⁷ | 3 (2) × 10⁻⁶ | −33 (7) | 2 (1) × 10⁴ |
| 180 | 6 (1) × 10⁻³ | −18 (4) | 1 (2) × 10⁷ | 2 (1) × 10⁻⁵ | −26 (17) | 3 (3) × 10⁴ |
| 240 | 7 (1) × 10⁻⁶ | −82 (4) | 3 (2) × 10³ | 6 (1) × 10⁻⁶ | −1 (3) | 6 (1) × 10⁴ |
| DC | 2 (1) × 10⁻³ | −40 (6) | 8 (1) × 10⁶ | 2 (1) × 10⁻⁵ | −34 (21) | 7 (3) × 10⁴ |

[a]Films annealed for 30 minutes unless otherwise noted.
[b]Devices mearured after 1 week in air.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

We claim:

1. A polymeric compound comprising in its backbone 4 to 10,000 identical or different bithiophene-3,3'dicarboximide-2,2'-diyl groups.

2. A polymeric compound comprising in its backbone 4 to 10,000 identical or different repeating units of the formula:

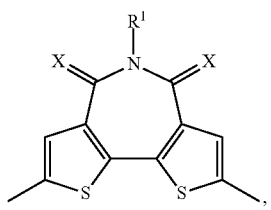

wherein:

X is selected from O, S, and Se; and $R^1$ is selected from H, a $C_{1-40}$ alkyl group, a $C_{2-40}$ alkenyl group, a $C_{1-40}$ haloalkyl group, and an organic group comprising 1-4 cyclic moieties, wherein:

each of the $C_{1-40}$ alkyl group, the $C_{2-40}$ alkenyl group, and the $C_{1-40}$ haloalkyl group optionally is substituted with 1-10 substituents independently selected from a halogen, —CN, NO₂, OH, —NH₂, —NH($C_{1-40}$ alkyl), —N($C_{1-40}$ alkyl)₂, —S(O)₂OH, —CHO, —C(O)—$C_{1-40}$ alkyl, —C(O)OH, —C(O)—O$C_{1-40}$ alkyl, —C(O)NH₂, —C(O)NH—$C_{1-40}$ alkyl, —C(O)N($C_{1-40}$ alkyl)₂, —O$C_{1-40}$ alkyl, —SiH₃, —SiH($C_{1-40}$ alkyl)₂, —SiH₂($C_{1-40}$ alkyl), and —Si($C_{1-40}$ alkyl)₃;

each of the $C_{1-40}$ alkyl group, the $C_{2-40}$ alkenyl group, and the $C_{1-40}$ haloalkyl group is bonded covalently either directly to the imide nitrogen atom or via linker; and each of the 1-4 cyclic moieties of the organic group is the same or different, is bonded covalently to each other or the imide nitrogen via an optional linker, and optionally is substituted with 1-5 substituents independently selected from a halogen, oxo, —CN, NO₂, OH, =C(CN)₂, —NH₂, —NH($C_{1-40}$ alkyl), —N($C_{1-40}$ alkyl)₂, —S(O)₂OH, —CHO, —C(O)OH, —C(O)—$C_{1-40}$ alkyl, —C(O)—O$C_{1-40}$ alkyl, —C(O)NH$_2$, —C(O)NH—C$_{1-40}$ alkyl, —C(O)N(C$_{1-40}$ alkyl)$_2$, —SiH$_3$, —SiH(C$_{1-40}$ alkyl)$_2$, —SiH$_2$(C$_{1-40}$ alkyl), —Si(C$_{1-40}$ alkyl)$_3$, —O—C$_{1-40}$ alkyl, —O—C$_{1-40}$ alkenyl, —O—C$_{1-40}$ haloalkyl, a C$_{1-40}$ alkyl group, a C$_{1-40}$ alkenyl group, and a C$_{1-40}$ haloalkyl group.

3. The polymeric compound of claim 2 comprising at least one other repeating unit, wherein the other repeating unit comprises:

an electron-rich conjugated system selected from:

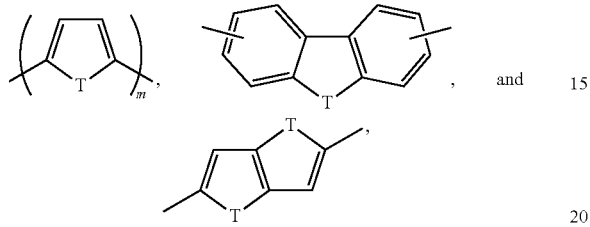

wherein each group optionally is substituted with 1-6 electron-donating groups;

an electron-poor conjugated system selected from:

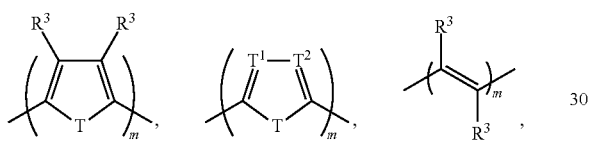

and a polycyclic group comprising 1-6 electron-withdrawing groups; or an electron-neutral conjugated system selected from:

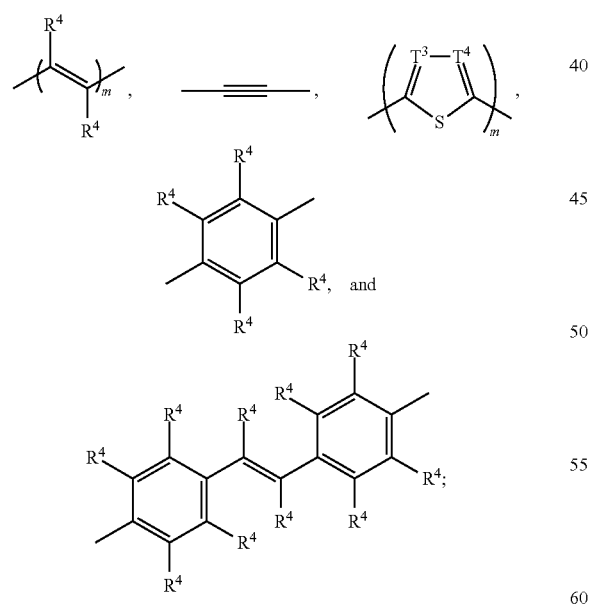

wherein:
T is selected from O, S, and NR$^2$;
T$^1$ and T$^2$ independently are selected from N and CR$^3$, provided that at least one of T$^1$ and T$^2$ is N;
T$^3$ and T$^4$ independently are selected from N and CR$^4$, provided that at least one of T$^3$ and T$^4$ is N;
R$^2$ is H or an electron-donating group;
R$^3$, at each occurrence, independently is an electron-withdrawing group;
R$^4$, at each occurrence, independently is H or an electron-donating group; and
m is 1, 2, 3, 4, 5 or 6.

4. The polymeric compound of claim 2 having the formula:

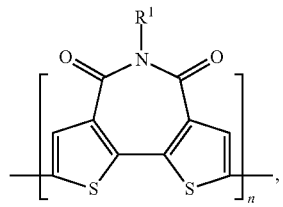

wherein R$^1$ is a C$_{1-20}$ alkyl group and n is an integer between 4 and 5,000.

5. The polymeric compound of claim 2 having the formula:

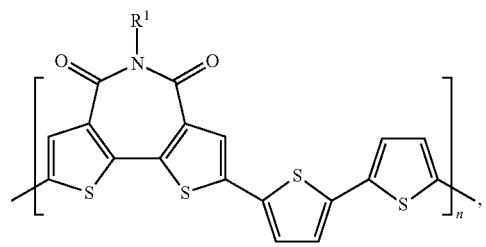

wherein R$^1$ is a C$_{1-20}$ alkyl group and n is an integer between 4 and 5,000.

6. The polymeric compound of claim 2 having the formula:

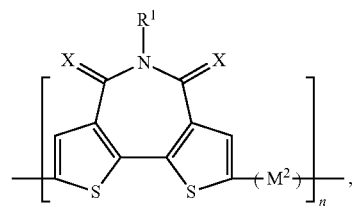

wherein:
M$^2$ is

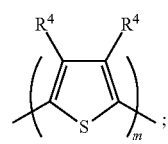

R$^4$, at each occurrence, independently is selected from H, a C$_{1-10}$ alkyl group, and a C$_{1-10}$ alkoxyl group, provided that at least one R$^4$ is not H;
m is 1, 2, 3, 4, 5 or 6;
n is an integer between 4 and 5,000; and
R$^1$ and X are as defined in claim 2.

7. The polymeric compound of claim 2 having the formula:

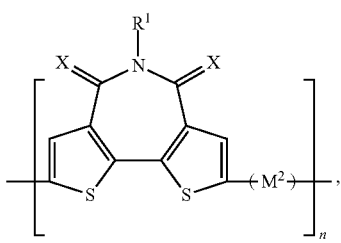

wherein:

$M^2$ is

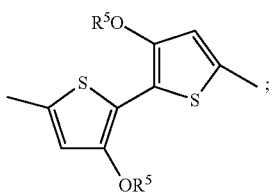

$R^5$, at each occurrence, independently is a $C_{1-10}$ alkyl group;

n is an integer between 4 and 5,000; and $R^1$ and X are as defined in claim 2.

8. The polymeric compound of claim 2 having the formula:

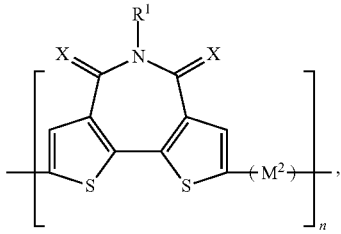

wherein:

$M^2$ is

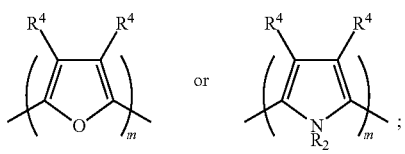

$R^2$ is H or a $C_{1-10}$ alkyl group;

$R^4$, at each occurrence, independently is selected from H, a $C_{1-10}$ alkyl group, and a $C_{1-10}$ alkoxyl group;

m is 1, 2, 3, 4, 5 or 6;

n is an integer between 4 and 5,000; and $R^1$ and X are as defined in claim 2.

9. The polymeric compound of claim 2 having the formula:

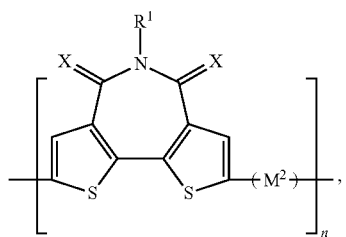

wherein:

$M^2$ is

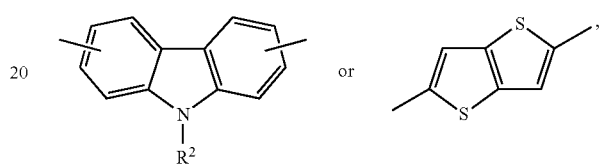

wherein either group optionally is substituted with 1-6 groups independently selected from a $C_{1-10}$ alkyl group and a $C_{1-10}$ alkoxyl group;

$R^2$ is H or a $C_{1-10}$ alkyl group;

n is an integer between 4 and 5,000; and $R^1$ and X are as defined in claim 2.

10. The polymeric compound of claim 2 having the formula:

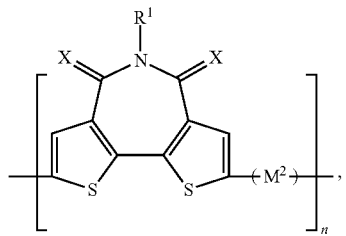

wherein:

$M^2$ is selected from:

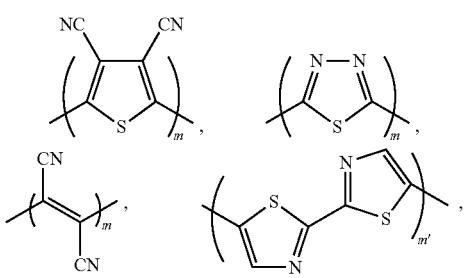

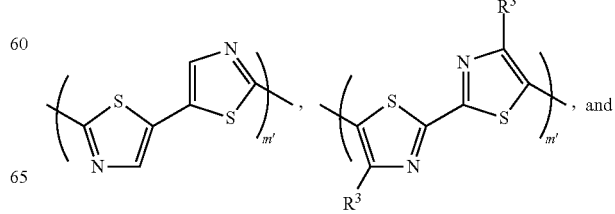

and

-continued

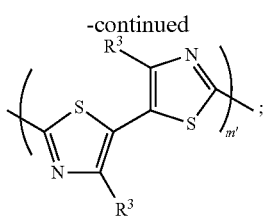

wherein:

R³, at each occurrence, independently is selected from F and CN;

m is 1, 2, 3, 4, 5 or 6;

m' is 1, 2 or 3;

n is an integer between 4 and 5,000; and

R¹ and X are as defined in claim 2.

11. The polymeric compound of claim 2 having the formula:

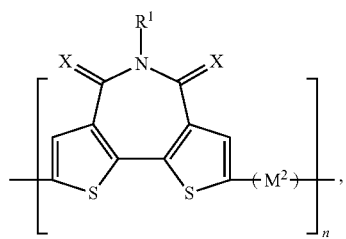

wherein:

M² is a polycyclic group comprising 1-6 electron-withdrawing groups independently selected from oxo, F, CN, and =C(CN)₂;

n is an integer between 4 and 5,000; and

R¹ and X are as defined in claim 2.

12. The polymeric compound of claim 2 having the formula:

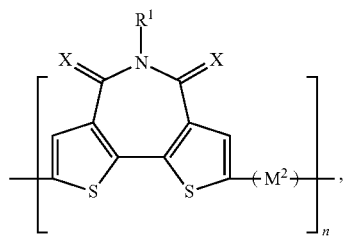

wherein:

M² is selected from:

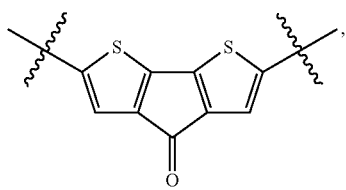

-continued

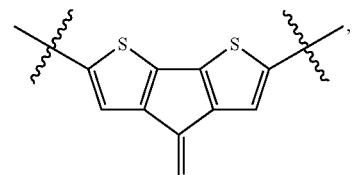

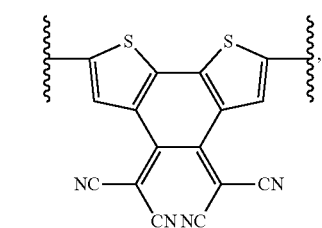

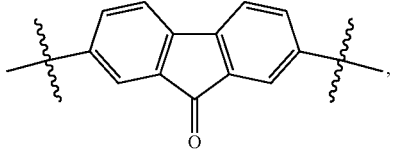

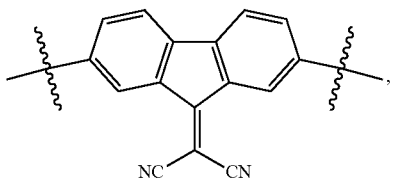

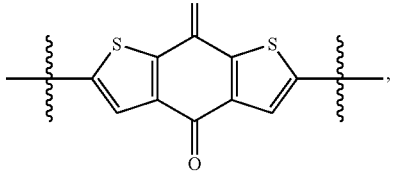

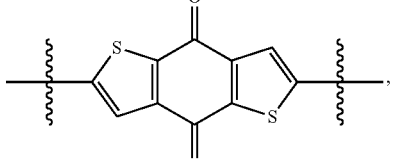

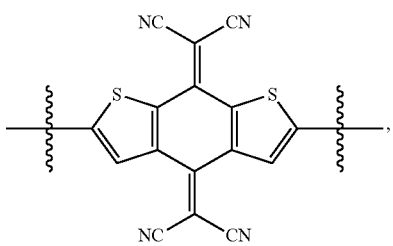

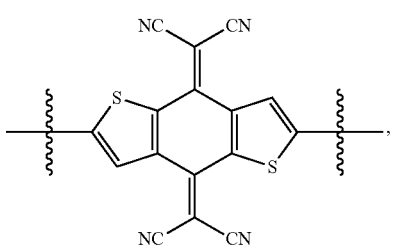

-continued
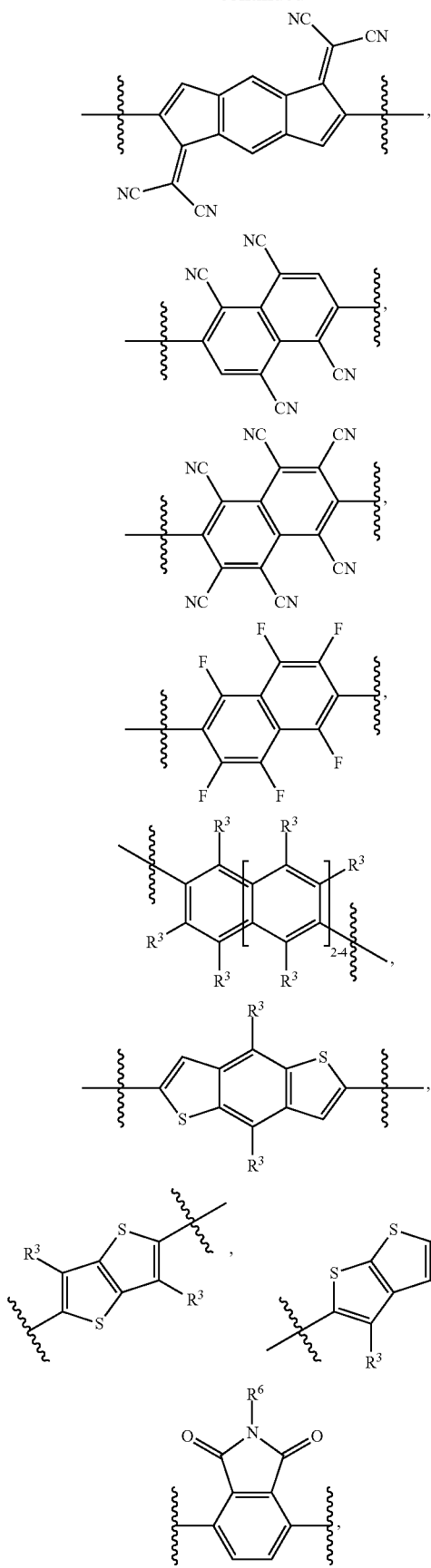
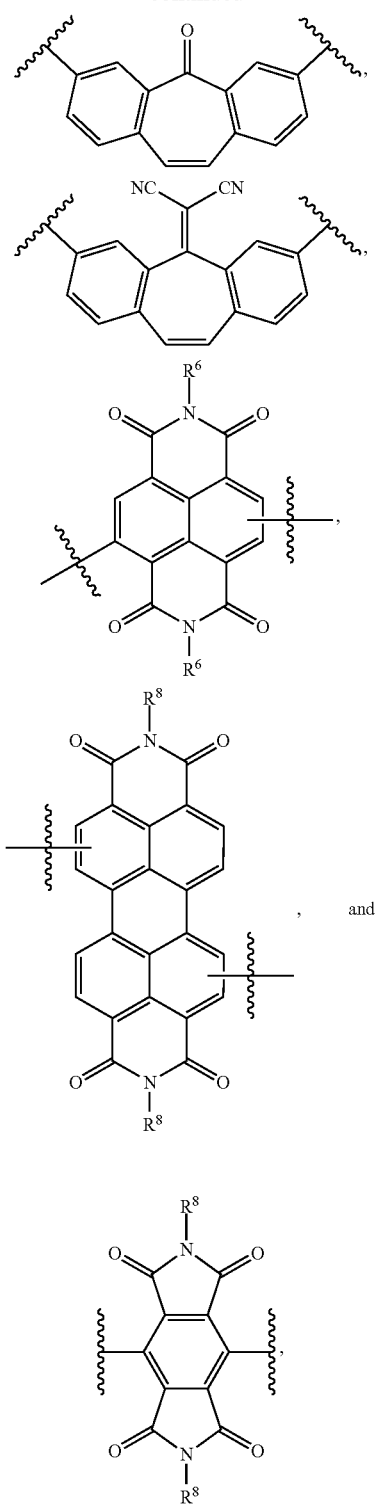
wherein:
$R^3$, at each occurrence, independently is selected from F and CN;
$R^6$ is a $C_{1-20}$ alkyl group;
n is an integer between 4 and 5,000; and
$R^1$ and X are as defined in claim 2.

13. The polymeric compound of claim 2 having the formula:

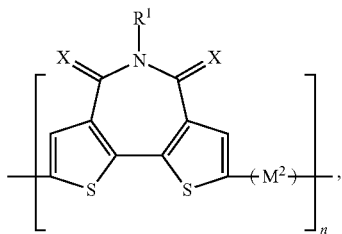

wherein:
M² is selected from:

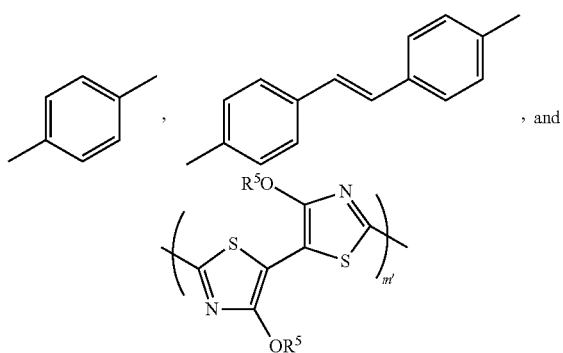

$R^5$, at each occurrence, independently is a $C_{1-10}$ alkyl group;
m' is 1, 2 or 3;
n is an integer between 4 and 5,000; and
$R^1$ and X are as defined in claim 2.

14. The polymeric compound of claim 2, wherein X is O.

15. The polymeric compound of claim 2, wherein $R^1$ is selected from H, -L-$R^a$, -L'-$Cy^1$, -L'-$Cy^1$-L'-$Cy^2$, -L'-$Cy^1$-L'-$Cy^2$-$Cy^2$, -L'-$Cy^1$-$Cy^1$, -L'-$Cy^1$-$Cy^1$-L'-$Cy^2$, -L'-$Cy^1$-$Cy^1$-L'-$Cy^2$-$Cy^2$, -L'-$Cy^1$-L-$R^a$, -L'-$Cy^1$-L'-$Cy^2$-L-$R^a$, -L'-$Cy^1$-L'-$Cy^2$-$Cy^2$-L-$R^a$, -L'-$cy^1$-$Cy^1$-L-$R^a$, and -L'-$Cy^1$-$Cy^1$-L'-$Cy^2$-L-$R^a$;
wherein:
$Cy^1$ and $Cy^2$ independently are selected from a $C_{6-14}$ aryl group, a 5-14 membered heteroaryl group, a $C_{3-14}$ cycloalkyl group, and a 3-14 membered cycloheteroalkyl group, each of which optionally is substituted with 1-5 substituents independently selected from a halogen, —CN, oxo, =C(CN)$_2$, a $C_{1-6}$ alkyl group, a $C_{1-6}$ alkoxy group, and a $C_{1-6}$ haloalkyl group;
L, at each occurrence, independently is a covalent bond or a linker selected from —Y—O—Y—, —Y—[S(O)$_w$]—Y—, —Y—C(O)—Y—, —Y—[NR$^c$C(O)]—Y—, —Y—[C(O)NR$^c$]—, —Y—NR$^c$—, —Y—[SiR$^c_2$]—Y—, a divalent $C_{1-40}$ alkyl group, a divalent $C_{2-40}$ alkenyl group, and a divalent $C_{1-40}$ haloalkyl group;
L', at each occurrence, independently is a covalent bond or a linker selected from —Y—O—Y—, —Y—[S(O)$_w$]—Y—, —Y—C(O)—Y—, —Y—[NR$^c$C(O)]—Y—, —Y—[C(O)NR$^c$]—, —Y—NR$^c$—, —Y—[SiR$^c_2$]—Y—, a divalent $C_{1-40}$ alkyl group, a divalent $C_{2-40}$ alkenyl group, and a divalent $C_{1-40}$ haloalkyl group;

wherein:
Y, at each occurrence, independently is selected from a divalent $C_{1-40}$ alkyl group, a divalent $C_{2-40}$ alkenyl group, a divalent $C_{1-40}$ haloalkyl group, and a covalent bond;
$R^c$ is selected from H, a $C_{1-6}$ alkyl group, a $C_{6-14}$ aryl group, and a —$C_{1-6}$ alkyl-$C_{6-14}$ aryl group; and
w is 0, 1, or 2; and
$R^a$ is selected from a $C_{1-40}$ alkyl group, a $C_{2-40}$ alkenyl group, a $C_{2-40}$ alkynyl group, and a $C_{1-40}$ haloalkyl group, each of which optionally is substituted with 1-10 substituents independently selected from a halogen, —CN, NO$_2$, OH, —NH$_2$, —NH($C_{1-20}$ alkyl), —N($C_{1-20}$ alkyl)$_2$, —S(O)$_2$OH, —CHO, —C(O)—$C_{1-20}$ alkyl, —C(O)OH, —C(O)—O$C_{1-20}$ alkyl, —C(O)NH$_2$, —C(O)NH—$C_{1-20}$ alkyl, —C(O)N($C_{1-20}$ alkyl)$_2$, —O$C_{1-20}$ alkyl, —SiH$_3$, —SiH($C_{1-20}$ alkyl)$_2$, —SiH$_2$($C_{1-20}$ alkyl), and —Si($C_{1-20}$ alkyl)$_3$.

16. The polymeric compound of claim 2, wherein $R^1$ is selected from:

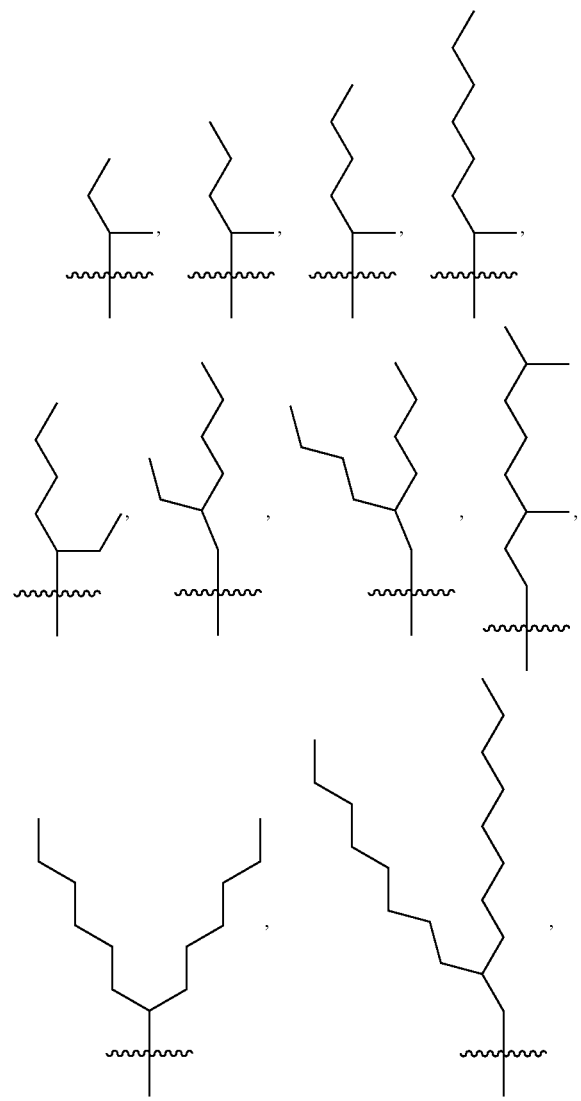

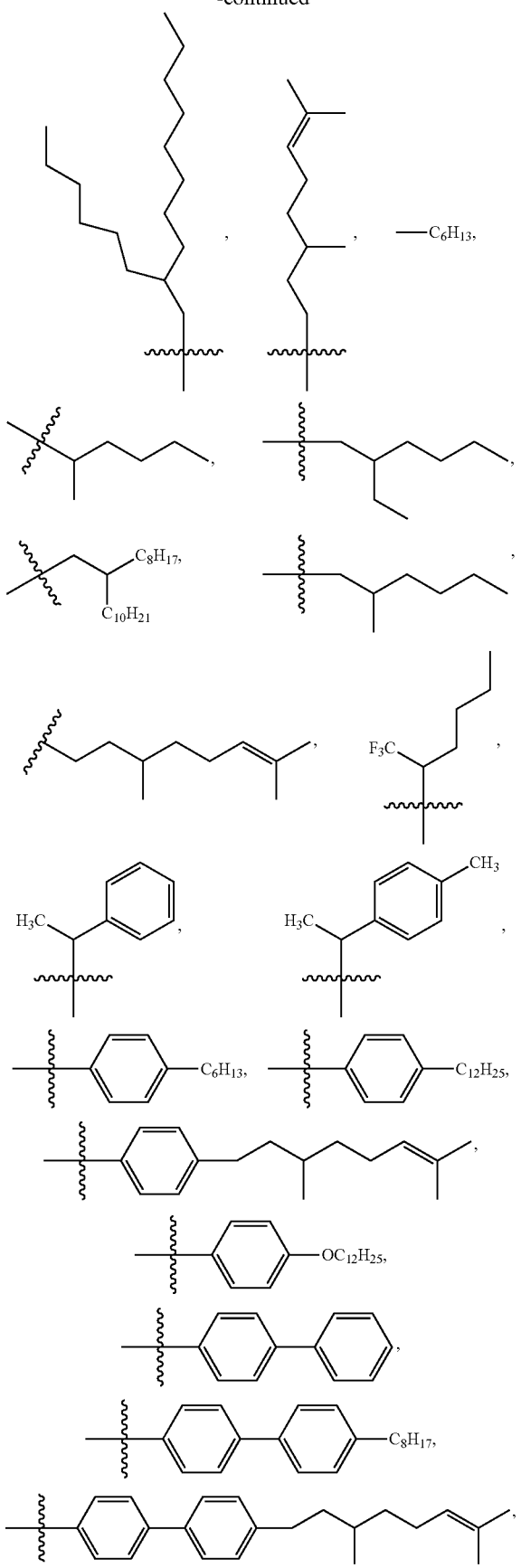
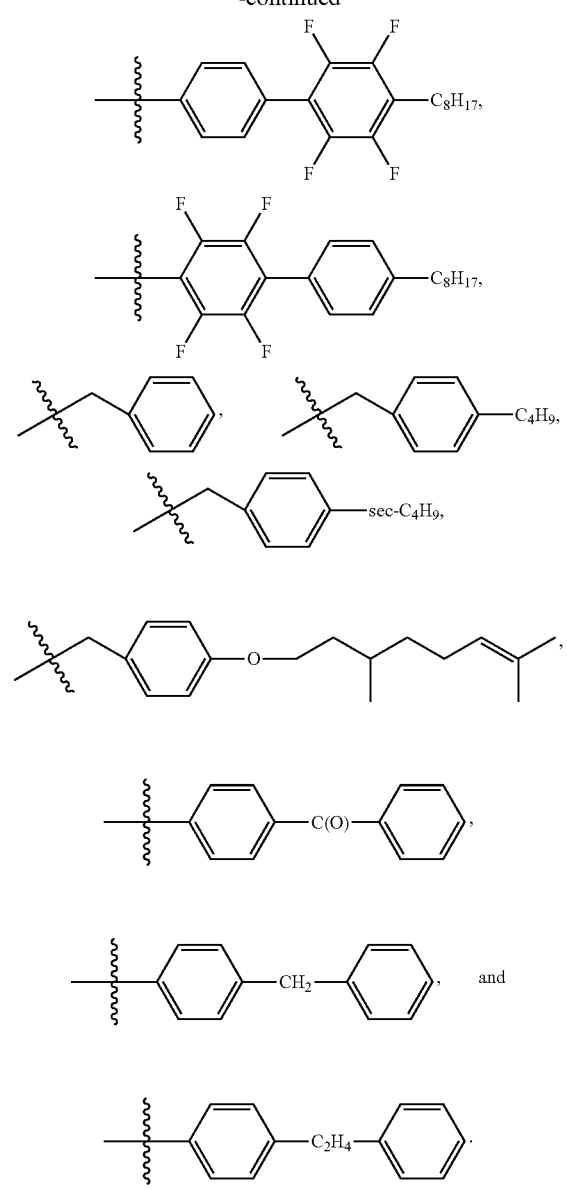
17. The polymeric compound of claim 2, wherein $R^1$ is a linear or branched $C_{3-40}$ alkyl or $C_{3-40}$ alkenyl group.
18. The polymeric compound of claim 2, wherein $R^1$ is selected from:
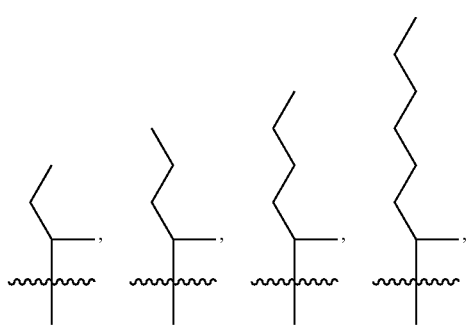

-continued

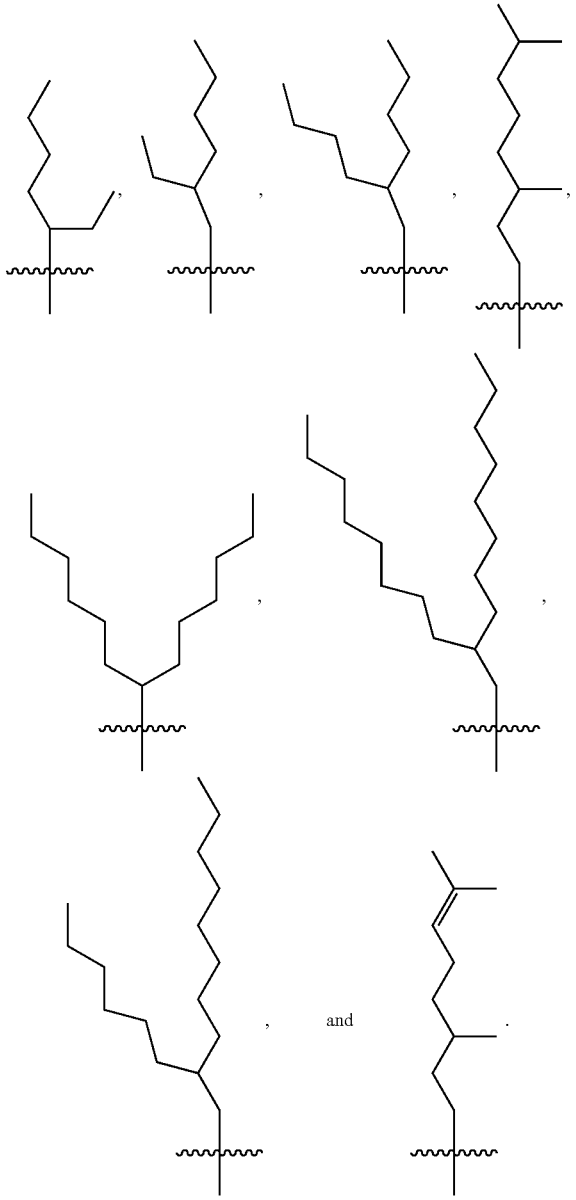

19. The polymeric compound of 2 having the formula:

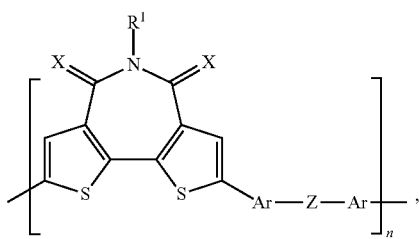

wherein:
Ar, at each occurrence, independently comprises 1-6 optionally substituted monocyclic aryl or heteroaryl moieties;
X is O, S, or Se;
Z is a linear or cyclic linker;

$R^1$ is selected from H, -L-$R^a$, -L'-$Cy^1$, -L'-$Cy^1$-L'-$Cy^2$, -L'-$Cy^1$-L'-$Cy^2$-$Cy^2$, -L'-$Cy^1$-$Cy^1$, -L'-$Cy^1$-$Cy^1$-L'-$Cy^2$, -L'-$Cy^1$-$Cy^1$-L'-$Cy^2$-$Cy^2$, -L'-$Cy^1$-L-$R^a$, -L'-$Cy^1$-L'-$Cy^2$-L-$R^a$, -L'-$Cy^1$-L'-$Cy^2$-$Cy^2$-L-$R^a$, -L'-$cy^1$-$Cy^1$-L-$R^a$, and -L'-$Cy^1$-$Cy^1$-L'-$Cy^2$-L-$R^a$;

wherein:
$Cy^1$ and $Cy^2$ independently are selected from a $C_{6-14}$ aryl group, a 5-14 membered heteroaryl group, a $C_{3-14}$ cycloalkyl group, and a 3-14 membered cycloheteroalkyl group, each of which optionally is substituted with 1-5 substituents independently selected from a halogen, —CN, oxo, =C(CN)$_2$, a $C_{1-6}$ alkyl group, a $C_{1-6}$ alkoxy group, and a $C_{1-6}$ haloalkyl group;

L, at each occurrence, independently is a covalent bond or a linker selected from —Y—O—Y—, —Y—[S(O)$_w$]—Y—, —Y—C(O)—Y—, —Y—[NR$^c$C(O)]—Y—, —Y—[C(O)NR$^c$]—, —Y—NR$^c$—, —Y—[SiR$^c{}_2$]—Y—, a divalent $C_{1-40}$ alkyl group, a divalent $C_{2-40}$ alkenyl group, and a divalent $C_{1-40}$ haloalkyl group;

L', at each occurrence, independently is a covalent bond or a linker selected from —Y—O—Y—, —Y—[S(O)$_w$]—Y—, —Y—C(O)—Y—, —Y—[NR$^c$C(O)]—Y—, —Y—[C(O)NR$^c$]—, —Y—NR$^c$—, —Y—[SiR$^c{}_2$]—Y—, a divalent $C_{1-40}$ alkyl group, a divalent $C_{2-40}$ alkenyl group, and a divalent $C_{1-40}$ haloalkyl group;

wherein:
Y, at each occurrence, independently is selected from a divalent $C_{1-40}$ alkyl group, a divalent $C_{2-40}$ alkenyl group, a divalent $C_{1-40}$ haloalkyl group, and a covalent bond;

$R^c$ is selected from H, a $C_{1-6}$ alkyl group, a $C_{6-14}$ aryl group, and a —$C_{1-6}$ alkyl-$C_{6-14}$ aryl group; and w is 0, 1, or 2; and $R^a$ is selected from a $C_{1-40}$ alkyl group, a $C_{2-40}$ alkenyl group, a $C_{2-40}$ alkynyl group, and a $C_{1-40}$ haloalkyl group, each of which optionally is substituted with 1-10 substituents independently selected from a halogen, —CN, NO$_2$, OH, —NH$_2$, —NH($C_{1-20}$ alkyl), —N($C_{1-20}$ alkyl)$_2$, —S(O)$_2$OH, —CHO, —C(O)—$C_{1-20}$ alkyl, —C(O)OH, —C(O)—OC$_{1-20}$ alkyl, —C(O)NH$_2$, —C(O)NH—$C_{1-20}$ alkyl, —C(O)N($C_{1-20}$ alkyl)$_2$, —OC$_{1-20}$ alkyl, —SiH$_3$, —SiH($C_{1-20}$ alkyl)$_2$, —SiH$_2$($C_{1-20}$ alkyl), and —Si($C_{1-20}$ alkyl)$_3$; and n is an integer greater than 2.

20. An electronic, opto-electronic, or optical device comprising a semiconductor material, the semiconductor material comprising one or more polymeric compounds of claim 2, wherein the electronic, opto-electronic, or optical device optionally is selected from a field effect transistor, an organic light-emitting transistor, and an organic photovoltaic device.

21. The polymeric compound of claim 19 having a formula selected from:

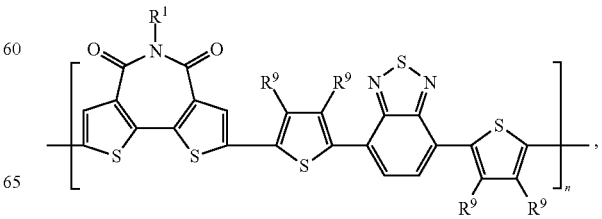

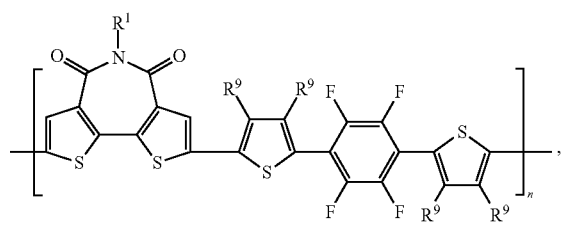
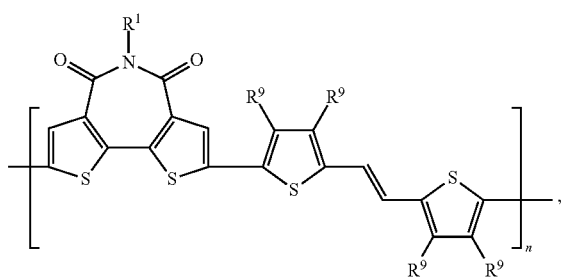
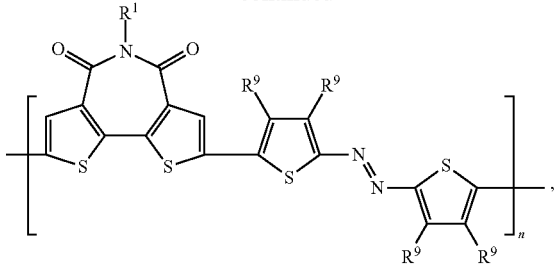
and
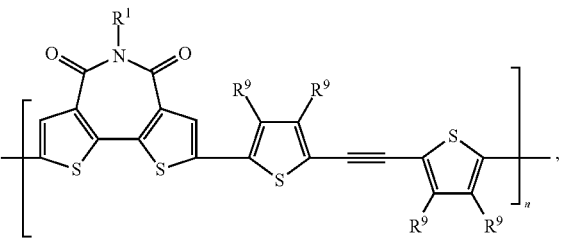
wherein:
R⁹, at each occurrence, independently is selected from H, halogen, a $C_{1-10}$ alkyl group, a $C_{1-10}$ alkoxy group, and a $C_{1-10}$ haloalkyl group; and
R¹ and n are as defined in claim 19.
* * * * *